United States Patent [19]

Leung et al.

[11] Patent Number: 5,548,755
[45] Date of Patent: Aug. 20, 1996

[54] SYSTEM FOR OPTIMIZING CORRELATED SQL QUERIES IN A RELATIONAL DATABASE USING MAGIC DECORRELATION

[75] Inventors: Ting Y. Leung; Mir H. Pirahesh, both of San Jose, Calif.; Praveen Seshadri, Madison, Wis.

[73] Assignee: International Business Machines Corporation, Armonk, N.Y.

[21] Appl. No.: 390,832

[22] Filed: Feb. 17, 1995

[51] Int. Cl.⁶ .................................................. G06F 17/30
[52] U.S. Cl. .................................. 395/600; 364/DIG. 1; 364/282.1; 364/283.4
[58] Field of Search ................................................ 395/600

[56] References Cited

U.S. PATENT DOCUMENTS

| | | | |
|---|---|---|---|
| 4,769,772 | 9/1988 | Dwyer | 395/600 |
| 5,043,872 | 8/1991 | Cheng et al. | 395/600 |
| 5,067,166 | 11/1991 | Ito | 382/215 |
| 5,241,648 | 8/1993 | Cheng et al. | 395/600 |
| 5,301,317 | 4/1994 | Lohman et al. | 395/600 |
| 5,345,585 | 9/1994 | Iyer et al. | 395/600 |
| 5,367,675 | 11/1994 | Cheng et al. | 395/600 |

FOREIGN PATENT DOCUMENTS

WO92/15066  9/1992  WIPO.

OTHER PUBLICATIONS

P. Selinger et al., "Access Path Selection in a Relational Database Management System", *Proc. of the 1979 Assoc. of Comp. Mach.(ACM) SIGMOD Intl Conf. on Management of Data*, 1979, pp. 1–59.

Kim, "On Optimizing an SQL–Like Nested Query", *ACM Transactions on Database Systems*, Sep. 7, 1982, pp. 443–469.

A. Chen et al., "Properties of Optimal Semi–join Programs for Distributed Query Processing", *Proc. of the IEEE Comp. Soc., 7th Intl. Comp. Sofware and Appls. Conf.*, Chicago, Ill. Nov. 1983, pp. 476–483.

Jiawei Han et al., "Efficient Evaluation of Multiple Linear Recursions, IEEE Transactions on Software Engineering, "vol. 17 No. 12, Dec. 1991, pp. 1241–1252.

Mumick et al., "Implementation of Magic–sets in a Relational Database System", *Proc. of the 1994 ACM Sigmod, International Conference on Management of Data*, Minneapolis, MN, 1994, pp. 103–114.

Dayal, "Of Nests and Trees: A Unified Approach to Processing Queries that Contain Nested Subqueries, Aggregates and Quantifiers", *Proceedings of the Eighteenth International Conference on Very Large Databases (VLDB)*, pp. 197–208, 1987.

Ganski et al., "Optimization of Nested SQL Queries Revisited", *Proceedings of ACM SIGMOD '87, International Conference on Management of Data*, San Francisco, CA, 1987 pp. 23–33.

Y. Ioannidis et al., "Query Optimization by Simulated Annealing", *Proc. of the 1987 ACM–SIGMOD Conf. on Management of Data*, San Francisco, CA, May 1987, pp. 9–22.

(List continued on next page.)

*Primary Examiner*—Paul V. Kulik
*Attorney, Agent, or Firm*—Baker, Maxham, Jester & Meador

[57] ABSTRACT

A system for optimizing SQL queries in a relational database management system using magic decorrelation. After representing an assembly of multiple SQL queries in computer memory using data structures configured in the query box representation ("QBR") format, queries amenable to decorrelation are identified, and FEED and ABSORB stages are applied to rewrite the QBR in decorrelated form. The FEED stage generates a set of correlation values that the subquery can use to decorrelate. The ABSORB stage decorrelates the subquery using the correlation values prepared by the FEED stage, resulting in the correlation bindings being absorbed into the subquery. The invention thereby takes full advantage of set-at-a-time, rather than tuple-at-a-time, processing.

39 Claims, 34 Drawing Sheets

OTHER PUBLICATIONS

S. Chi et al., "Recursive Query Answering with Non–Horn Clauses", *Proc. of the 9th Intl. Conf. on Automated Deduction,* Argonne, ILL, May 1988, pp. 294–313.

G. M. Lohman, "Grammar–like Functional Rules for Representing Query Optimization Alternatives", IBM Almaden Research Center, San Jose, CA 95120, Jun. 1988, pp. 18–27.

S. Pramanik et al., "Optimizing Join Queries in Distributed Databases", *IEEE Trans. on Software Engr.,* vol. 14, No. 9, pp. 1319–1326, Sep. 1988.

E. Omiecinski, "Heuristics for Join Processing Using Non-clustered Indexes", *IEEE Trans. on Software Engineering,* vol. 15, No. 1, Jan. 1989, pp. 18–25.

A. Swami, "Optimization of Large Join Queries: Combining Heuristics and Combinatorial Techniques", *Proc. of 1989 ACM–SIGMOD Intl Conf. of Management of Data,* Portland, Oregon, Jun. 1989, pp. 367–376.

D. Cornell et al., "Integrated Site Assignment for Relations and Join Operations in Distributed Transaction Processing", *IBM Technical Disclosure Bulletin,* vol. 32, No. 4A, Sep. 1989, pp. 306–314.

L. Haas, et al., "Extensible Query Processing in Starburst", *Proc. of the 1989 ACM Sigmod,* International Conf. on the Management of Data, Portland, OR, 1989, pp. 377–388.

Mumick et al. "Magic is Relevant", *Proceedings of ADM SIGMOD '90,* International Conference on Management of Data, Atlantic City, NJ, 1990, pp. 1–23.

Haas et al., "STARBURST Mid–flight: As the Dust Clears," *IEEE Transactions on Knowledge and Data Engineering,* Mar. 1990, pp. 143–160.

Y. Ioannidis et al., "Randomized Algorithms Large Join Queries", *Proc. of the 1990 ACM–SIGMOD Intl Conf. on Management of Data,* Atlantic City, NJ, May 1990, pp. 312–321.

D. Cornell et al., "Integrated Buffer Management and Query Optimization Strategy for Relational Databases", *IBM Technical Disclosure Bulletin,* vol. 32, No. 12, May 1990, pp. 253–257.

M. Chen et al., "Using Join Operations as Reducers in Distributed Query Processing", *Proc. 2nd Intl. Sym. on Databases in Parallel and Distributed Systems,* Dublin, Ireland, Jul. 1990, (Abstract only).

K. Ono et al., "Measuring the Complexity of Join Enumeration in Query Optimization", *Proceedings of the 16th VLDB Conference,* Brisbane, Australia, Aug. 1990, pp. 314–325.

Beeri et al., "On the Power of Magic", *Proc. of the Sixth ACM SIGACT–SIGMOD–SIGART Symposium on Principles of Database* Systems, San Diego, CA, 1987, pp. 269–283.

S. Lee et al., "Semantic Query Reformulation in Deductive Databases", *IEEE Proc. of the 7th Intl Conf. on Data Engr.,* Koby, Japan, Apr. 1991, pp. 232–239.

Muralikrishna, "Improved Unnesting Algorithms for Join Aggregate SQL Queries", Proceedings of the Eighteenth International Conference on Very large Databases VLDB, pp. 91–102, 1992.

A. Shibamiya et al., "DB2 Cost Formula", *IBM Technical Disclosure Bulletin,* vol. 34, No. 12, May 1992, pp. 389–394.

H. Pirahesh et al., "Extensible/Rule Based Query Rewrite Optimization in Starburst", Proc. of 1992 ACM SIGMOD, Jun. 1992, pp. 39–48.

R. Kabler et al., "Performance Evaluation of Algorithms for Transitive Closure", *Information Systems,* vol. 17, No. 5, Sep. 1992, pp. 415–441.

W. Hong et al., "Optimization of Parallel Query Execution Plans in XPRS", *Distributed and Parallel Databases,* vol. 1, No. 1, pp. 9–32, Jan. 1993.

Raab, TPC Benchmark ™D (Decision Support) Working Draft 9.0, 1995 (Transaction Processing Performance Council), pp. 1–124.

SYSTEM FOR OPTIMIZING CORRELATED SQL QUERIES IN A RELATIONAL DATABASE USING MAGIC DECORRELATION

BACKGROUND OF THE INVENTION

1. Field of the Invention

The present invention relates to database management systems for computers. More particularly, the invention concerns a query optimizer for optimizing Structured Query Language ("SQL") queries in a relational database management system using "magic decorrelation."

2. Description of the Related Art

Structured Query Language

Computer systems incorporating Relational database Management System ("RDBMS") software using a SQL interface are well known in the art. The SQL interface has evolved into a standard language for RDBMS software and has been adopted as such by both the American National Standards Organization and the International Standards Organization.

In a relational database, all data is externally structured into tables. The SQL interface allows users to formulate relational operations on the tables either interactively, in batch files, or embedded in host languages such as C, COBOL, etc. SQL provides operators that allow the user to manipulate the data by operating on one or two tables to produce a new table. The power of SQL lies chiefly in its ability to link information from multiple tables or views to perform complex sets of procedures, with a single statement.

In SQL, a "select" statement is used to retrieve data, and generally comprises the format: "SELECT <clause> FROM <clause> WHERE <clause>". Although the statement generally must follow this syntax, only the SELECT and FROM clauses are required. The SELECT clause retrieves a subset of data from one or more existing tables or views stored in the relational database, and the FROM clause identifies the table or view from which data is being selected. The items specified in the SELECT clause determine the columns that will be returned in the result table from the table(s) identified in the FROM clause.

The WHERE clause determines which rows should be returned in the result table. Generally, the WHERE clause contains a search condition that must be satisfied by each row returned to the result table. The rows that meet the search condition form an intermediate set, which is then processed further according to specifications in the SELECT clause. The search condition typically comprises one or more "predicates", each of which specify a comparison between two values comprising columns, constants, or correlated values. Multiple predicates may be present in the WHERE clause, typically connected by Boolean operators.

In SQL, a "join" operation combines rows from one table or view with those from another table or view. The rows, or portions of rows, from the different tables or views are concatenated horizontally. The join operation is implied, for example, by naming more than one table or view in the FROM clause of a SELECT statement. Although not required, join operations normally include a WHERE clause that identifies the columns selected from each table.

In SQL, a DISTINCT specification may be used in the SELECT clause to eliminate duplicate rows in the result table. DISTINCT may be specified only in the SELECT clause, and it affects only the rows that are returned, not the columns. DISTINCT acts upon the intermediate result set, so that each row of the result table is unique. Opposite in effect to DISTINCT, the ALL specification returns all rows including duplicates.

Optimization

To optimize performance when processing queries, it is desirable to select a method or "plan" to execute the query with the lowest estimated computational cost. Database users typically seek to retrieve data in the least possible amount of time, to minimize the "cost" of the query in terms of the required personnel and the processing time. When the database is large, data retrieval time can even be critical to the operability of the database. There are many ways in which a query can be processed, each requiring different amounts of the computer's time and memory. One consideration, for example, is the order in which the query elements are processed and data is retrieved.

Query Box Representation

A number of known SQL optimizers employing various types of Query Box Representation (QBR") to facilitate their optimization. QBR provides a powerful and manageable representation of queries to reduce the complexity of query compilation and optimization procedures. Additionally, the QBR provides a tool for optimizing queries by facilitating rewriting the QBR components in efficient arrangements.

Generally, a QBR representation employs hierarchically arranged "boxes" to represent subquery operations such as SELECT and GROUP BY, for instance. The interconnections between the boxes define the relationship between different items of data from different subquery operations.

Various techniques may be used to store a complex query in computer memory in accordance with a QBR format. Specifically, multiple data structures in the memory are used to represent the QBR boxes and interrelationships. These data structures may comprise, for example, records and associated pointers, strings, stack arrangements, double linked lists, hashing arrangements, or another suitable format. Preferably, records and pointers are used, where each record represents a QBR box, and the pointers represent the relationships between the boxes. Each record also includes a listing of various properties associated with the corresponding QBR box.

A number of different types of QBR are known in the art. One of the more popular types of QBR is known as the "query graph model." The query graph model is well known in the art, and is described in the following reference, which is incorporated by reference in its entirety: Pirahesh et al., "Extensible/Rule Based Query Rewrite Optimization in Starburst," *Proceedings of ACM SIGMOD '92 International Conference on Management of Data,* San Diego, Calif., 1992.

The query graph model supports arbitrary table operations where the inputs are tables and outputs are tables, such as the SELECT, GROUP BY, UNION, INTERSECT, and EXCEPT operations defined in the SQL standard, and the restriction, projection and join operations performed by the SELECT operation.

When a query is represented by the query graph model, each operation of the query may be graphically represented by a box having a head and body. The body of a query graph model box may include "quantifiers", comprising table references or derived tables. Quantifiers have different types.

Type "F" (For Each) quantifiers correspond to the table references in the FROM clause of the SQL query. Type "A" (Universal) quantifiers correspond to the ALL subquery in the WHERE clause. Type "E" (Existential) quantifiers correspond to the subquery associated with SQL's predicates EXISTS, IN, ANY and SOME. Type "ES" (Existential Single) quantifier corresponds to scalar quantifier in that the database system has to enforce that fact that at most one tuple can be returned from the subquery.

The query graph model boxes are coupled to each other by quantifier "edges", also called "arcs". The head of a box describes the output data stream or table produced by the operation, and the body specifies the operation required to compute the output table from records flowing into the body. The head specifies each output column, such as those specified in the SELECT clause of a query, an includes column names, types, and output ordering information. The head, body, and quantifiers of a box may each have a separate attribute called "distinct", to manage the production of duplicate tuples.

To explain the query graph model in greater detail, FIG. 1 illustrates an exemplary query graph model corresponding to the SQL query depicted in Table 1 (below).

TABLE 1

SELECT Distinct q1.partno, q1.descr, q2.suppno
FROM inventory q1, quotations q2
WHERE q1.partno = q2.partno AND q1.descr = 'engine'
  AND q2.price ≦ ALL
    (SELECT q3.price
    FROM quotations q3
    WHERE q2.partno = q3.partno);

The query of Table 1 provides information about suppliers and parts for which the supplier price is less than that of all other suppliers. The corresponding query graph model (FIG. 1) contains four boxes 100–103. The boxes 100 and 101 are associated with the tables INVENTORY and QUOTATIONS. The box 102 is a SELECT box representing the main part of the query, and the box 103 is a SELECT box representing the subquery.

In accordance with query graph model convention, each of the boxes 100–103 has a head and a body, where each head describes the output columns produced by the associated box, and the body specifies the operation required to compute the output. "Base" tables, exemplified by boxes 100–101, are considered to have empty or non-existent bodies because they do not perform any operations.

Referring in greater detail to the box 102, a head 105 is shown, specifying output columns PARTNO, DESCR, and SUPPNO; these correspond to the SELECT clause of the main query. The specification of these columns includes column names, types, and output ordering information. The head 105 includes a distinct attribute 106, which indicates that the associated table contains only distinct tuples.

The body of each non-base table box contains a graph, the vertices of which represent quantified tuple variables, called quantifiers. The vertices are also called "nodes." In the box 102, for example, vertices 108–110 correspond to quantifiers q1, q2, and q4. Quantifiers q1 and q2 range over the INVENTORY and QUOTATIONS base tables respectively, and correspond to the table references in the FROM clause of the SQL query.

As stated above, arcs connect quantifiers to other boxes or to each other. For example, the q1 and q2 quantifiers (nodes 108–109) are connected via arcs 112–113 to the heads of the boxes 100–101, respectively. Arcs may also inter connect quantifiers of the same box where each inter-quantifier arc represents a predicate of the WHERE clause in the query block. Such predicates are represented by labelled rectangles along the corresponding edge. For example, the q1 and q2 quantifiers are interconnected by an edge 116 that represents a join predicate. A looped edge 118 attached to the q1 (node 108) represents a local predicate on the quantifier q1. In the head 105 of box 102, each output column may have an associated expression corresponding to expressions allowed in the SELECT clause of the query. In FIG. 1, all of these expressions are simple identity functions over the referenced quantifier columns.

The output of a box can be used multiple times to create common sub-expressions. For example, a view may be used multiple times in the same query. Recursive queries, however, create cycles in query graph model. And, as the size of the graph grows, the cost of optimization also grows.

Correlated Queries

SQL permits users to express queries using correlation between a query and its subqueries. Correlation refers to the use of values from an outer query block in the computation of an inner subquery block. More specifically, correlation refers to the condition where a subquery receives bindings from its ancestors. A QBR box is directly correlated if it contains a column reference from an ancestor box. The referenced column is called the correlation column. The ancestor is the source of correlation, and the box containing the correlation column is the destination of correlation.

A QBR box is recursively correlated to one of its ancestors if it is directly correlated to the ancestor, or if one of its descendants is directly correlated to one of its ancestors. The height of correlation of a correlation predicate is the number of quantifier edges that must be traversed to get from the source of correlation to the destination of correlation. A correlation is remote if the height of correlation is greater than one.

For a correlated subquery, correlation column references provide bindings during every execution of the subquery, although the values may be different depending on the execution of its ancestor query block. Bindings available via correlation column references are called correlation bindings. To illustrate correlation in greater detail, reference is made to the box 103, which represents the subquery of Table 1. The box 103 contains an F type quantifier q3 (node 120) over the quotations table, and its body 122 contains a predicate that refers to q2 and q3. Since the predicate of the body 122 refers to q2, which originates from a higher box (the box 102), this predicate is said to be "correlated," and the relationship is called a "correlation." For a number of reasons, it is essential that a query optimizer efficiently handle correlated subqueries such as this.

1. Many SQL programs and programmers use correlated subqueries;
2. The semantics of SQL prohibit certain queries from being expressed without the use of correlation;
3. Query generation modules, which are being used more frequently, often have the effect of producing large and complex correlated queries; and
4. Correlated queries can cause especially acute performance degradations in parallel, distributed database environments.

One approach to processing correlated subqueries is "nested iteration". Nested iteration, which was introduced in the first-generation relational database systems such as System R, adopted a tuple-at-a-time approach to subquery execution in literal compliance with the semantics of SQL. To discuss nested iteration in greater detail, a sample SQL query is provided in Table 2, below.

Additionally, the queries transformed by Kim may be semantically different from the original query, possibly resulting in incorrect transformed queries. More specifically,

TABLE 2

SELECT DEPT.name FROM DEPT
WHERE DEPT.budget < 10000 AND DEPT.work_stations > (SELECT COUNT(*)
                                                                   FROM EMP
                                                                   WHERE DEPT.building =
                                                                   EMP.building If the query of Table 2 is evaluated using nested iteration, the subquery is invoked once for every DEPT tuple in the outer block, where the budget of that DEPT is less than 10000.

Although nested iteration may be adequate for some applications, it can be expensive since it repeats subquery invocation costs. Additionally, if the subquery involves expensive computations such as table scan and joins, added overhead may result from repeating such computations on each invocation. For instance, in the example of Table 2, table EMP may not have an index on the building column, thereby forcing a computationally expensive table scan access for every low-budget department tuple. Moreover, if there are duplicate values of DEPT.building, the subquery invocations may perform redundant work.

A number of approaches have been developed to "decorrelate" queries to increase the set-oriented nature of the resultant query. Decorrelation is the process of transforming a subquery to remove any correlations that may be present. Some QBR box types can be decorrelated, where as other types cannot.

One decorrelation approach is described in Kim, "On Optimizing an SQL-Like Nested Query", *ACM Transactions on Database Systems*, 7 September 1982. Kim's method transforms complex queries by recognizing certain fixed forms of queries and rewriting the queries. If Kim's method is applied to decorrelate the query of Table 2, this results in the query of Table 3, below.

the semantics of SQL dictate that if the WHERE clause in the subquery is not satisfied for a particular DEPT.building, the subquery should return a count of zero. In query of Table 2, if a department D with one work station is in building B to which no employees are assigned, this department D's name will be output as an answer to the query. The transformed query is incorrect since, in the same situation, the TEMP table expressions will not have a tuple in it corresponding to (B,0), and consequently D will not be generated as an answer to the query. This phenomena is an example of the well known "COUNT" bug, discussed in Ganski et al., referenced below. The COUNT bug occurs because a failure in the subquery may result in success in the outer query. If the COUNT in the subquery were replaced by some other aggregate function like MAX, MIN, AVG, or SUM, the SQL failure semantics specifies that the subquery should return a null value. If the subquery is involved in a predicate such as IS NULL then the same problem arises.

Additionally, the Kim transformation only works if the correlated predicate is a simple equality predicate. Moreover, Kim's transformation does not extend to queries with arbitrarily structured nesting, multiple correlations, and general existential and universal quantification in general Boolean expressions.

Still another known decorrelation technique is addressed in Dayal, "Of Nests and Trees: A Unified Approach to Processing Queries that Contain Nested Subqueries, Aggregates and Quantifiers", *Proceedings of the Eighteenth Inter-*

TABLE 3

SELECT DEPT.name FROM DEPT, TEMP(bldg, empcount) AS
                                            (SELECT EMP.building, COUNT(*)
                                            FROM EMP
                                            GROUPBY EMP.building)
WHERE DEPT.work_stations > TEMP.empcount AND DEPT.building = TEMP.building AND DEPT.budget <
    10000

Although Kim's method has certain benefits for some applications, in certain applications Kim's method may be somewhat limited. For example, Kim's method may lead to excessive computations and undesirable levels of performance. In the example of Table 3, the computation in the subquery is not longer restricted by the correlated predicate. In this example, the grouping computation must be done for all employees, not only the ones that satisfy the predicate on the "building" column.

*national Conference on Very large Databases (VLDB)*, pp. 197–208, 1987. Dayal concerns a decorrelation method based upon a query transformation technique that attempts to solve the count bug by using a strategically-placed outer join construct, so that missing subquery answers to not result in missing answers. In the case of Table 2, Dayal's modification combines the two query blocks along with the left outer-join operator to produce a transformed query as shown in Table 4, below.

TABLE 4

SELECT DEPT.name FROM DEPT, EMP
WHERE DEPT.budget < 1000 AND DEPT.building = EMP.building (Left OuterJoin)
GROUPBY DEPT.[key], DEPT.work_stations
HAVING DEPT.work_stations > COUNT(EMP.*)

Dayal's method may be generalized to apply to any linearly structured nesting of query blocks. All the relations involved are first joined, and then successively grouped and aggregated on the appropriate columns.

Like Kim's technique, Dayal's method may not be as particularly advantageous in some applications. For example, in some cases Dayal performs repetitive computations. Specifically, to preserve the semantics of the query, the query is GROUPED-BY some key of the DEPT relation. If there are several departments with the same value for the building column, there will be a repetition of computation.

Also, under certain circumstances Dayal might use excessively large grouping sets, leading to significant performance degradations. Since the join of all involved relations is performed first, the size of the set to be grouped might be much larger than in the case of Kim's strategy. This is contrary to the conventional strategy of performing grouping and aggregation before joins to reduce the join size and to significantly improve the performance. Another potential limitation is that Dayal's method only works for linearly structured queries with SELECT and GROUP BY constructs.

A different decorrelation approach is discussed in Ganski et al., "Optimization of Nested SQL Queries Revisited", *Proceedings of ACM SIGMOD '87*, International Conference on Management of Data, San Francisco, Calif., 1987 pp. 23–33. Ganski concerns a query transformation method that collects correlation values into a temporary table and joins the temporary table with a subquery. Instead of grouping on a key field of the outer relation, Ganski first projects a distinct collection of correlation values into a temporary relation. This temporary relation is then joined with the subquery, and the grouping is performed over each of the values in the temporary relation. Therefore, although Ganski purports to process nested queries of arbitrary complexity, Ganski's approach is apparently limited to queries with one aggregate subquery block.

Another potential problem with the above-listed approaches is that each provides specialized mechanisms to optimize restricted classes of queries, without being generally applicable to arbitrarily structured queries.

Magic Sets Rewriting

Apart from any concerns with query decorrelation, such as the schemes discussed above, some database systems optimize their queries by applying "magic sets rewriting," referred to herein as "magic." The following references address magic, each of which is hereby incorporated by reference in its entirety:

1. Beeri et al., "On the Power of Magic", ACM SIGACT-SIGMOD-SIGART "Symposium on principles of Database Systems" p. 269–283, 1987; and
2. Mumick et al., "Magic is Relevant", *Proceedings of ADM SIGMOD '90 International Conference on Management of Data,* Atlantic City, N.J., 1990.

In a general sense, magic optimizes complex queries by filtering the data set used by subqueries of the complex queries. This is accomplished by effectively "weeding out" data that is repetitive, and eliminating data that does not contribute to the results of the queries. In other words, magic is a general set-oriented mechanism for restricting a subquery computation by pushing "join bindings" into the subquery. In this respect, "join bindings" refers to data values contained in columns that are involved in join predicates. Magic involves joining the tables in the FROM clause of a subquery with magic sets bindings, allowing the computation of the subquery to be restricted in a set-oriented fashion.

The magic sets transformation is implemented as one of the rewrite rules in the rewrite phase of query optimization. With queries represented in QBR format, magic operates on one QBR box at a time, rewriting that the box if possible. In general, the rewrite phase of magic involves creating a table corresponding to the magic sets of each subquery, and adding the newly created magic table to the FROM clause of the subquery, thereby restricting the subquery's computation.

Boxes are rewritten one by one in a top-down fashion. Hence, when magic is being applied to a box, its "ancestors" in the QBR have already been processed. In this respect, "ancestor" refers to the following: a first QBR box is recursively an ancestor of a second QBR box if it is a parent of the second box, or one of its children is an ancestor of the second box; the second box is a descendant of the first if the first is an ancestor of the second.

Some boxes (e.g. non-single predicate join constructs such as GROUP BY, UNION, AND OUTER-JOIN) cannot be modified by creating additional tables to provide their inputs. For these constructs, magic cannot be directly applied. The computation of these boxes, however, can be restricted by applying the magic sets transformation to their children. Accordingly, such types of QBR boxes are given the classified as No Magic Quantifier ("NMQ"). In contrast, QBR boxes that can be modified simply by introducing additional tables as part of their inputs have the attribute "Accepts Magic Quantifier" ("AMQ").

Other than the AMQ/NMQ classification, the magic technique requires no further knowledge about the nature of the QBR box that it is rewriting. This characteristic helps to facilitate the possible extensibility of magic sets, by accommodating future additions of different varieties of query operations.

Reference is now made to FIGS. 2–8, where one embodiment of magic, called "supplementary magic sets rewriting," is illustrated in greater detail. FIG. 2 depicts an illustrative sequence of steps 200 for performing magic, and FIGS. 3–8 illustrate the resultant query in various intermediate stages of rewriting according to the QBR format.

The query to be rewritten is depicted in an initial state by the QBR of FIG. 3. The QBR includes a parent box 300, a current box ("curbox") 302 to be processed by magic, a first child 304, and a second child 306. The a column is produced by the first child 304, the d column is produced by the second child 306, and the b, c, and c columns are produced by other sources (not shown).

As shown in FIG. 2, magic begins in task 202 by dividing the predicates of the curbox 302. Next, task 204 creates a supplementary box 400 (FIG. 4), which includes all bindings from curbox 302 except the binding received from the second child 306. In the present case, the supplementary box 400 produces columns a, b, and c, since the column d was received from the second child 306.

Next, task 206 creates a magic child 500, as shown in FIG. 5. Branch 208 then asks whether the first child 306 is of type AMQ or NMQ. If the answer is AMQ, then task 210 simply routes the bindings from the magic child 500 to the second child 306 by creating a quantifier 602, a corresponding join predicate 601, and an arc 600. After task 210 is completed, the routine 200 ends in task 214.

However, if the second child 306 is type NMQ, then task 212 applies magic to the children of box 306 (e.g. box 700 of FIG. 7). In this case, the child 306 becomes the curbox, and a magic child 800 is created for the box 700. After completion of the 212, the routine 200 ends in a task 214.

To further illustrate the technique of magic sets rewriting, an example query is provided in Table 5, below.

TABLE 5

SELECT DISTINCT DEPT.name, SUBQUERY.empcount
FROM DEPT, SUBQUERY(dept_name, empcount) AS
    (SELECT EMP.dept_name, count(*)
    FROM EMP, . . .
    WHERE . . . )
WHERE DEPT.mgr = 'SNOOPY' AND DEPT.name = SUBQUERY.dept_name In the query of Table 5, the subquery need only be invoked for those values from the EMP relation whose dept_name field matches (i.e. joins with) the name of a DEPT whose manager is called "SNOOPY". Computing the entire subquery for every DEPT.name value may involve a significant amount of unnecessary computation, which can be avoided. The set of join bindings for a subquery forms a "magic set," and the tuples in this set correspond to all possible bindings with which the subquery will ever be invoked. The magic set formed to correspond to the example of Table 5 is shown in Table 6, below.

TABLE 6

CREATE VIEW BINDINGS(name) AS
    (SELECT DISTINCT name FROM DEPT
    WHERE DEPT.mgr = 'SNOOPY')

As mentioned previously, the magic sets rewriting technique involves joining the tables in the FROM clause of the subquery with the magic set bindings, thereby restricting the computation of the subquery in a set-oriented fashion. This rewriting is a superset of predicate pushdown, and is capable of pushing bindings through multiple levels of a complex query in a uniform manner. Using magic, the query of Table 5 is rewritten as shown in Table 7, below.

TABLE 7

SELECT DISTINCT BINDINGS.name, SUBQUERY.empcount
FROM BINDINGS, SUBQUERY(dept_name, empcount) AS
    (SELECT EMP.dept_name, count(*)
    FROM EMP, BINDINGS, . . .
    WHERE BINDINGS.name = EMP.deptname AND . . . )
WHERE BINDINGS.name = SUBQUERY.dept_name

Desire for Improved Efficiency

Supplementary magic sets can be useful in optimizing SQL queries. However, in certain applications that require more efficient query optimization, the magic sets technique is not completely satisfactory. Even after applying magic sets, a query may still retain significant top down data flow due to correlated queries. This requires expensive database table accesses, since the queries under these circumstances are limited to processing a single tuple at a time. This results in reduced processing speed and high utilization of computer resources such as memory, disk drives, processor, and communications.

SUMMARY OF THE INVENTION

The present invention concerns a query optimizer for optimizing SQL queries in a RDBMS using "magic decorrelation." Magic decorrelation is applied after representing a complex SQL query in QBR format, and includes FEED and ABSORB stages that rearrange the QBR representation to decorrelate QBR boxes where possible, thereby taking advantage of set-at-a-time rather than tuple-at-a-time processing.

More particularly, magic decorrelation transforms the QBR one box at a time, from the top down. When a correlation between the current box and a descendant is identified, the "correlation bindings" are examined to determine whether decorrelation is possible. In this respect, "correlation bindings" refer to the data values contained in a correlation column at the source of correlation. If decorrelation is possible, magic decorrelation is applied in accordance with the invention to remove the correlation.

In particular, the FEED stage is first applied to the child of the current box to generate a set of correlation values that the subquery can use for decorrelation. This "feeds" the bindings to the subquery and concurrently generates the magic set for the subquery. Two varieties of FEED stages are described: A "remote" FEED stage is used when a correlation is found between a descendant of the current box and an ancestor of the current box. In contrast, a "local" FEED stage is performed when a correlation is found between the current box and a descendant of the current box.

After feeding the current box's child, the current box's child is processed. If the child is AMQ type, an ABSORB stage is performed on the child, followed by a FEED stage for a child of that child. The ABSORB stage decorrelates the subquery using the correlation values prepared by the FEED stage, thereby absorbing the correlation bindings into the subquery. If the child is NMQ type, the FEED stage of its children is first performed, after which an ABSORB stage is performed on the child. After processing the child is processed in this manner, its children are then processed further.

The present invention affords its users with a number of distinct advantages. First, the invention more efficiently optimizes correlated SQL queries, taking advantage of set-oriented processing when possible to improve the execution of correlated SQL queries. Additionally, the invention is convenient since it is generally applicable to a wide range of extended relational queries, even those that include features such as table expressions and recursion.

The invention also provides flexibility, since it may be implemented in many different database systems under various hardware configurations. The invention also accommodates future addition new QBR box types that may be subsequently added to the QBR. Another advantage of the invention is that it may be applied in parallel distributed database environments. Still another benefit of the invention is that it provides sufficiently detailed granularity that the QBR remains consistent from one rewrite state to another; permitting termination of the query rewrite phase any time without losing QBR adherence, such as when the allocated query optimizer resources are exhausted.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Structure

Hardware Environment

Figure 9:
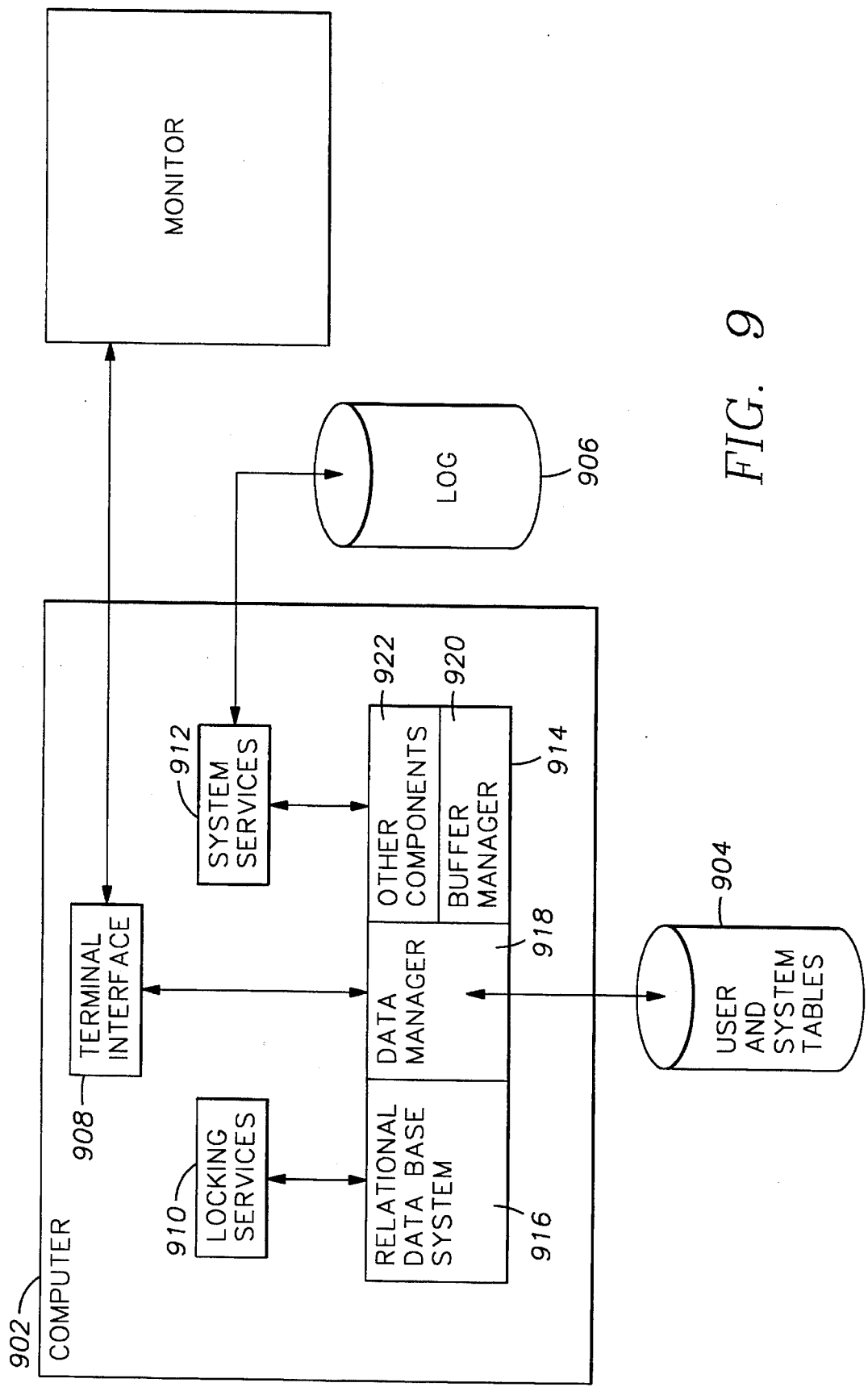
FIG. 9 is a diagram of the hardware components and interconnections of the present invention.

FIG. 9, illustrates an exemplary computer hardware environment that could be used with the present invention. In the exemplary environment, a computer system 902 is comprised of one or more processors connected to one or more electronic storage devices 904 and 906, such as disk drives, that store one or more relational databases.

Operators of the computer system 902 use a standard operator interface 908, such as IMS/DB/DC, CICS, TSO, OS/2 or other similar interface, to transmit electrical signals to and from the computer system 902 that represent commands for performing various search and retrieval functions, termed queries, against the databases. In the present invention, these queries conform to the SQL standard, and invoke functions performed by RDBMS software. In the preferred embodiment of the present invention, the RDBMS software comprises the DB2 product offered by IBM for the MVS or OS/2 operating systems, Those skilled in the art will recognize, however, that the present invention has application to any RDBMS software that uses SQL.

As illustrated in FIG. 9, the DB2 architecture for the MVS operating system includes three major components: the Resource Lock Manager ("RLM") 910, the System Services module 912, and the Database Services module 914. The RLM 910 handles locking services, because DB2 treats data as a shared resource, thereby allowing any number of users to access the same data simultaneously, and thus concurrency control is required to isolate users and to maintain data integrity. The Systems Services module 912 controls the overall DB2 execution environment, including managing log data sets 906, gathering statistics, handling startup and shutdown, and providing management support.

Figure 10:
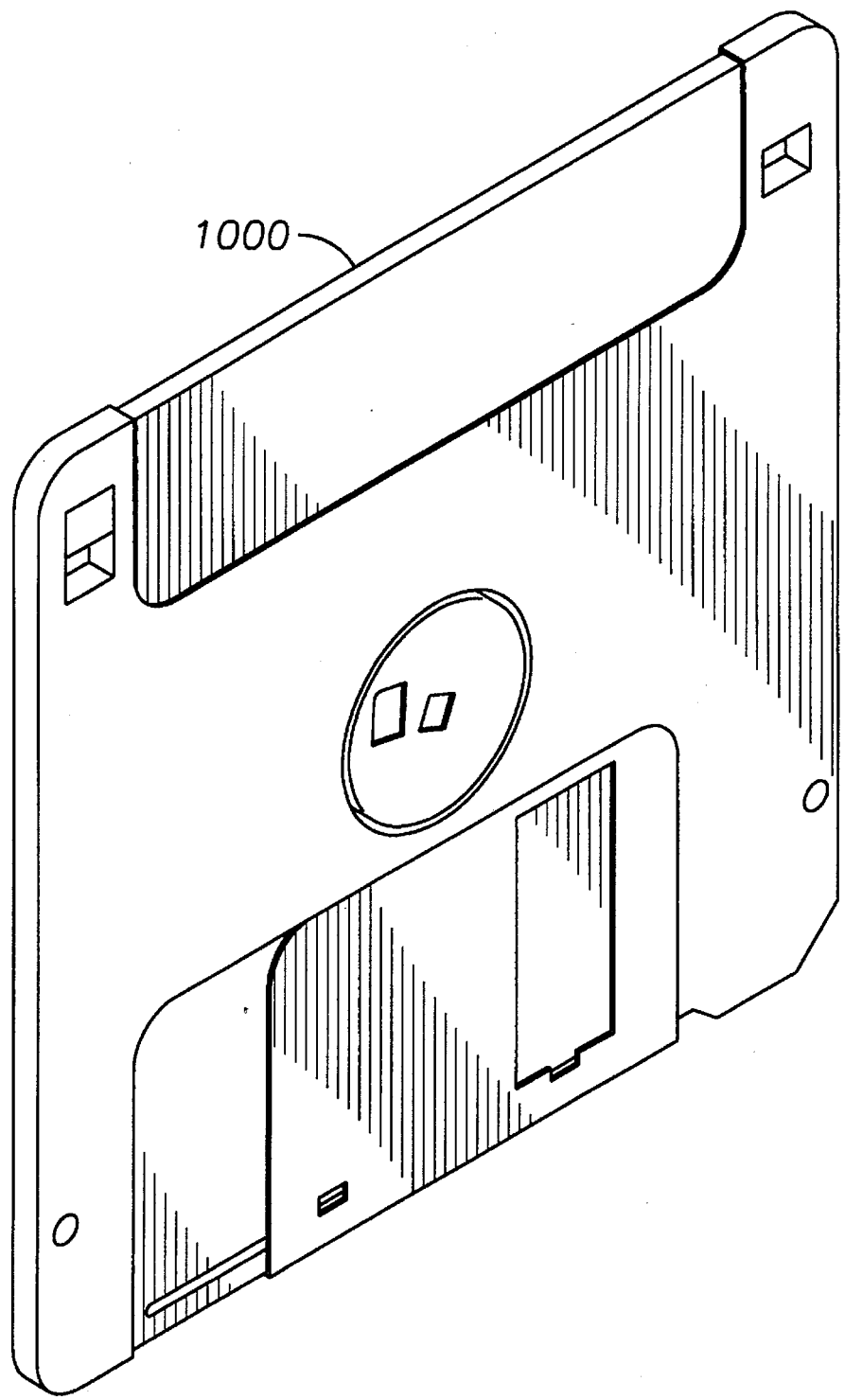
FIG. 10 is a perspective view of a computer-readable diskette 1000 for use in accordance with the present invention.

At the center of the DB2 architecture is the Database Services module 914. The database Services module 914 contains several submodules, including the Relational Database system (RDS) 916, the Data Manager 918, and Buffer Manager 920 and other components 922 such as an SQL compiler/interpreter. these submodules support the functions of the SQL language, i.e., definitions, access control, retrieval, and update of user and system data. The Database Services module 914 preferably comprises one or more processors that execute a series of computer-executable programming instructions. These programming instructions preferably reside in storage locations such as fast-access memory (not shown) of the computer 902. Alternatively, the instructions may be stored on a computer diskette 1000 (FIG. 10), direct access storage drive, magnetic tape, conventional "hard drive", electronic read-only memory, optical storage device, paper 'punch" cards, or another suitable data storage medium.

Interactive SQL Execution

Figure 11:
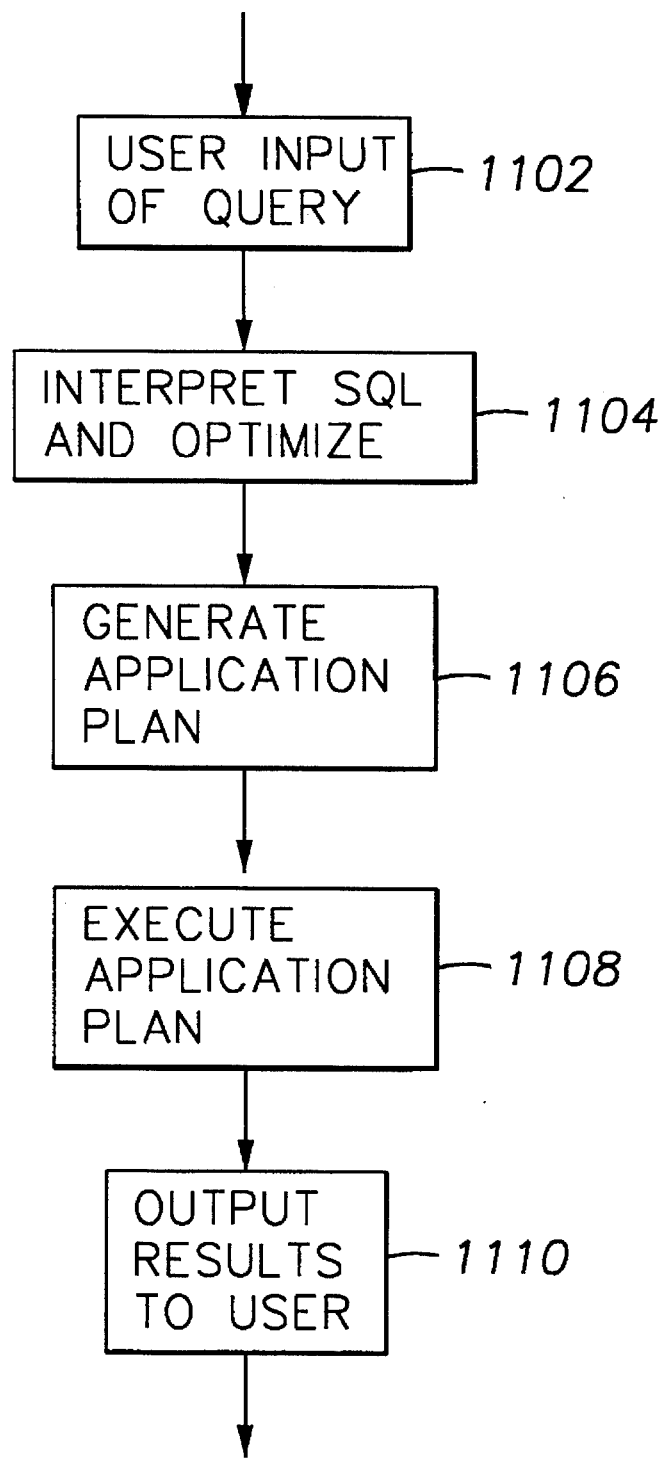
FIG. 11 is a flowchart illustrating an illustrative routine to perform an interactive mode of the method of the invention.

FIG. 11 is a flowchart illustrating the steps necessary for the interpretation and execution of SQL statements in an interactive environment according to the present invention. Block 11 represents the input of SQL statements into the computer system 902 from the user. Block 11 represents the step of compiling or interpreting the SQL statements. An optimization function within block 11 may transform the SQL query in a manner described in more detail later in this specification. Block 11 represents the step of generating a compiled set of runtime structures called an application plan from the compiled SQL statements. Generally, the SQL statements received as input from the user specify only the data that the user wants, but not how to get to it. this step considers both the available access paths (indexes, sequential reads, etc.) and system held statistics on the data to be accessed (the size of the table, the number of distinct values in a particular column, etc.), to choose what it considers to be the most efficient access path for the query. Block 11 represents the execution of the application plan, and block 11 represents the output of the results of the application plan to the user.

Embedded/Batch SQL Execution

Figure 12:
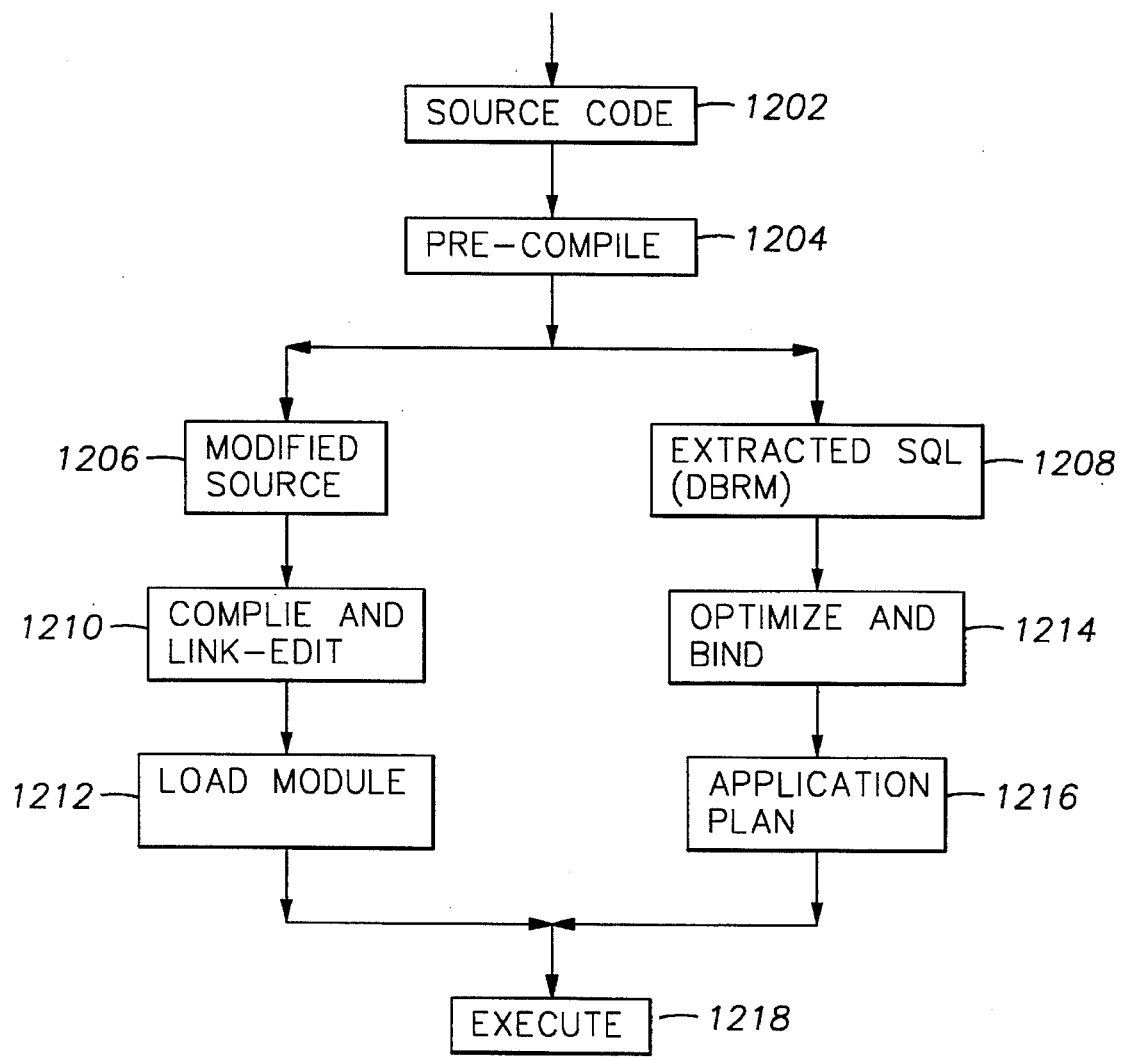
FIG. 12 is a flowchart illustrating an illustrative routine to perform a compiled mode of the method of the invention.

FIG. 12, is a flowchart illustrating the steps necessary for the interpretation and execution of SQL statements embedded in source code according to the present invention. Block 1202 represents program source code containing a host language (such as COBOL or C) and embedded SQL statements. The program source code is then input to a precompile step 1204. There are two outputs from the precompile step 1204: a modified source module 1206 and a Database Request Module ("DBRM") 1208. The modified source module 1206 contains host language calls to DB2, which the pre-compile step 1204 inserts in place of SQL statements. The DBRM 1208 consists of the SQL statements from the program source code 1202. A compile and link-edit step 1210 uses the modified source module 1206 to produce a load module 1212, while an optimize and bind step 1214 uses the DBRM 1208 to produce a compiled set of runtime structures for the application plan 1216. As indicated above in conjunction with FIG. 11, the SQL statements from the program source code 1202 specify only the data that the user wants, but not how to get to it. The optimize and bind step 1214 may reorder the SQL query in a manner described in more detail later in this specification. Thereafter, the optimize and bind step 1214 considers both the available access paths (indexes, sequential reads, etc.) and system held statistics on the data to be accessed (the size of the table, the number of distinct values in a particular column, etc.), to choose what it considers to be the most efficient access path for the query. The load module 1212 and application plan 1216 are then executed together at step 1218.

Optimization in Accordance with the Present Invention

As mentioned above, the present invention optimizes SQL query statements that are submitted to the computer 902 in interactive mode (FIG. 11) or compiled mode (FIG. 12). In either case, the SQL queries are optimized in accordance with routine that includes a sequence of tasks 1300, as shown in FIG. 13. Generally, the present invention decorrelates queries by applying magic decorrelation. The method steps of the invention are preferably applied in conjunction with other useful techniques for query optimization, which may be performed before and/or after the steps of the invention.

As mentioned above, the magic decorrelation technique of the invention, like the technique of magic sets rewriting, processes QBR boxes associated with a complex query, starting from the top and working downward. For ease of explanation, then, an imaginary pointer (not shown) is used herein to keep track of the current QBR box being processed. Only one box is processed at a time, this box being referred to as the current box ("curbox"). Accordingly, in task 1302 the pointer is set to a desired box, making that box the "curbox". Branch 1304 then asks whether a child of the curbox is correlated.

If there is no correlation, branch 1306 asks whether the pointer can be advanced. If so, control returns to branch 1304. Otherwise, the routine exits in task 1308. If, however, branch 1304 finds a correlation, task 1310 asks whether the correlated child of the curbox can be decorrelated with respect to appropriate correlation columns.

This is preferably determined by consulting the child's encapsulator. In this respect, the present invention associates each QBR box with a packet of information about that box. The query optimizer can query the box's encapsulator to obtain specific information about the properties of the box, e.g. whether the box is amenable to decorrelation. The encapsulator is considered to be a "black box", which simply returns information in response to an appropriate request. In accordance with the present invention, the encapsulator of each box provides the following information related to decorrelation:

1. a list of its ancestors;
2. a list of its descendants and the number of paths to each of them;
3. which of its ancestors it is correlated with; and
4. which descendant box caused each correlation.

Decorrelation is possible in certain situations, depending upon factors such as which columns are already output from the box, and whether the addition of correlation columns changes the output of the query. This depends primarily on the semantics of the box, and on how the outputs of the box are used. If the outputs of a GROUP BY box with a COUNT aggregate, for example, are used in a predicate "=0", simple decorrelation may lead to the count bug; therefore, decorrelation will require the introduction of an outer-join. However, if the predicate were "=1", then simple decorrelation is sufficient. As part of pre-processing, a box is provided the information about the usage of its outputs. Other factors influencing the decorrelation decision include the presence of existential or universal quantifiers, the ability of the system to index temporary relations, and the cost of possibly introducing additional joins. The amenability of a box to decorrelation is therefore preferably encapsulated for each box, to reduce the number of steps in the magic decorrelation process.

Branch 1310 also inquires about other characteristics of the curbox. For instance, branch 1310 analyzes the form of the subquery to determine which varieties of subsequent processing stages will be performed. As discussed in greater detail below, the subqueries are later processing using "FEED" and "ABSORB" stages, and branch 1310 determines whether the FEED stage should be a "remote" or "local" variety, and whether the ABSORB stage should be an "AMQ" or "NMQ" variety.

If branch 1310 determines that the curbox is not amenable to decorrelation, control advances to branch 1306, which operates as discussed above. However, if the curbox is responsive to decorrelation, task 1312 performs a FEED stage to the child of the curbox. In a general sense, the FEED stage generates a set of correlation values that the subquery can use to decorrelate. This stage "feeds" the bindings to the subquery, and concurrently generates a magic set for the subquery. The remote FEED is used when a correlation exists between subquery and an ancestor of the current box. In contrast, when a correlation exists between the current box and a descendant of the current box, a "local FEED" stage is performed.

After task 1312, branch 1314 asks whether the pointer can be advanced. If the lowest level of the QBR structure has been processed, of course, the pointer cannot be advanced and processing in accordance with the invention can end. Accordingly, if branch 1314 answers "no", the routine exits in task 1316.

If the pointer can be advanced, however, task 1316 advances the pointer to the child of the curbox, thus making that child the new curbox. Then, branch 1318 asks whether a child of the curbox is correlated. If not, control returns to branch 1314, which is discussed above. If a correlation is found, however, branch 1320 then asks whether the correlated child of the curbox can be decorrelated with respect to appropriate correlation columns. If not, control returns to branch 1314.

If decorrelation is possible, however, task 1322 performs decorrelation. The decorrelation of task 1322 includes FEED and ABSORB stages, performed in the order discussed below. The FEED stage is discussed briefly above (in conjunction with task 1312), and in greater detail below. The ABSORB stage serves to decorrelate the curbox using the correlation values prepared by the FEED stage, resulting in the correlation bindings being "absorbed" into the subquery. As discussed in greater detail below, an AMQ ABSORB stage is used when the curbox is a type AMQ box, whereas an NMQ ABSORB stage is used when the curbox is NMQ type.

In performing the decorrelation of task 1322, branch 1324 first asks whether the curbox is of type AMQ or NMQ. If the curbox is AMQ, task 1326 performs an AMQ decorrelation stage, which includes an ABSORB task 1328 and a FEED task 1330. The ABSORB task 1328 applies an ABSORB process to the curbox to decorrelate that box. The ABSORB steps result in the correlation bindings being "absorbed" into the subquery. After step 1328, the FEED step 1330 applies the FEED process to the curbox.

However, if the curbox is NMQ type, an NMQ decorrelation stage 1332 is applied, which includes a FEED step 1334 and an ABSORB step 1336. The child of the curbox is fed in task 1334, and then the decorrelation is implemented by applying the ABSORB process to the curbox in step 1336.

After completion of the decorrelation task 1322, control returns to branch 1314, which asks whether the pointer can be advanced again. If so, the routine 1300 continues with task 1316, as discussed above. Otherwise, the routine 1300 exits in task 1316.

FEED-- Local Feed

Figure 14:
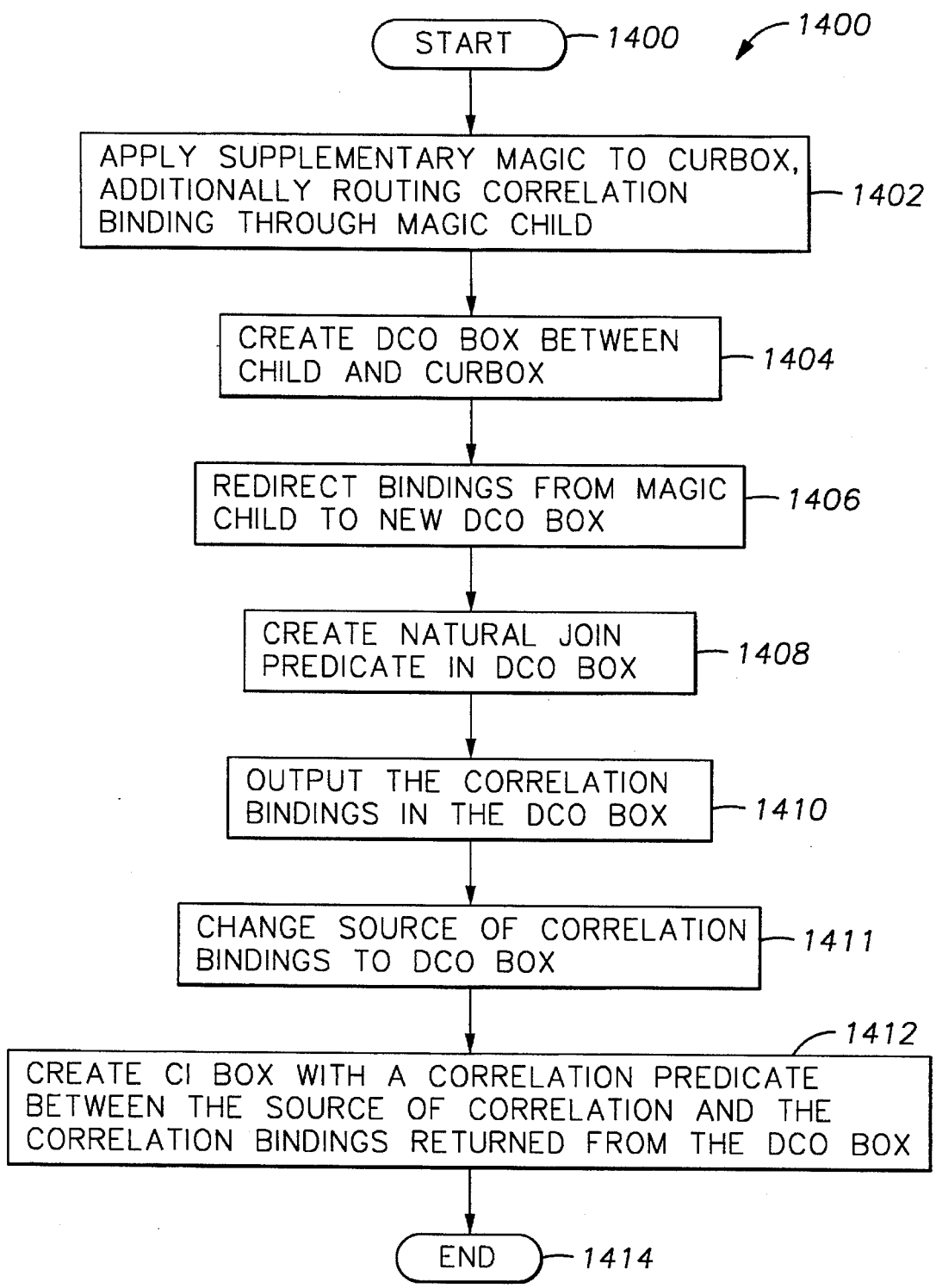
FIG. 14 is a flowchart depicting an illustrative local FEED sequence in accordance with the invention.
Figure 15:
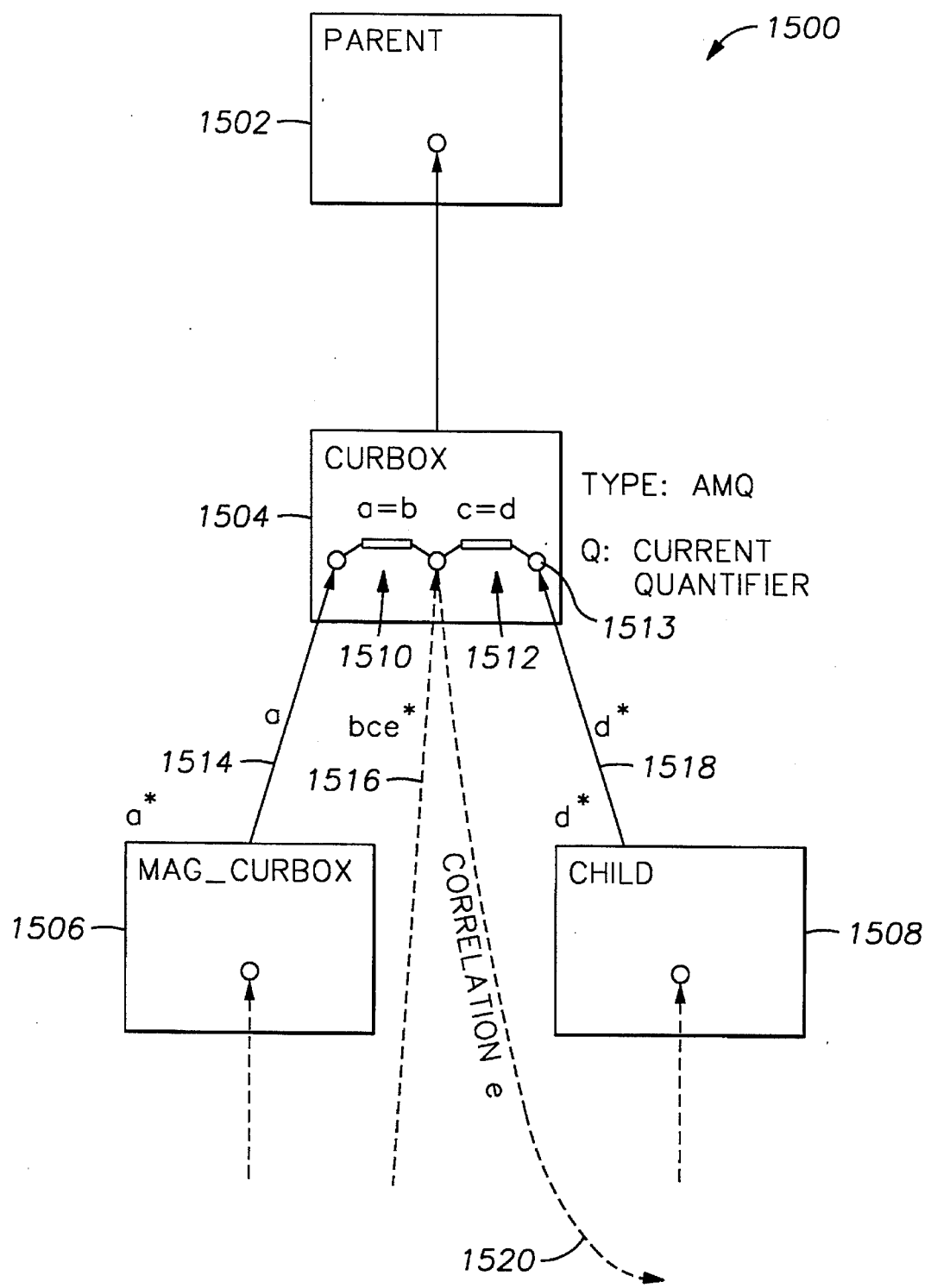
FIGS. 15–18 are diagrams of an illustrative query transformation sequence corresponding to the local FEED sequence of FIG. 14.

As mentioned above, the local FEED stage is used when a correlation exists between the current box and a descendant of the current box. As shown in FIG. 14, the local FEED stage may be embodied in a routine that comprises a sequence of tasks 1400. FIG. 15 depicts a QBR 1500 representing a starting point for the process 1400. The intermediate states of transformation corresponding to the operations of FIG. 14 are shown by the QBR 1500 in FIGS. 16-18.

FIG. 15 depicts a parent 1502 of a curbox 1504, the curbox 1504, a magic curbox 1506, and a child 1508 of the curbox 1504. As mentioned above, the magic decorrelation method of the invention is performed in a top-down fashion. Hence, it can be seen that the magic curbox 1506 was produced during magic decorrelation or magic rewriting of the parent 1502, performed previously.

The curbox 1504 includes a first predicate 1510, a second predicate 1512, and a quantifier 1513 that ranges over the child 1508 of the curbox 1504. The curbox 1504 receives bindings from arcs 1514, 1516, and 1518. There is a correlation in a descendant (not shown) of the child 1508, with the source of correlation being the curbox 1504. The correlation column is e, and the curbox 1504 passes the correlation bindings e to the descendant via an arc 1520.

Since the goal of the FEED stages in general is to change the manner in which a child ultimately receives the correlation bindings, application of a FEED stage may be referred to as "feeding the child" of the curbox. The routine 1400 begins in task 1402, which applies supplementary magic to the curbox 1504. This creates a supplementary box 1600 (FIG. 16) containing the predicate 1510, and also creates a magic child 1602 that passes join bindings c to the child 1508 via an arc 1604. Task 1402 creates a predicate 1603 duplicating the predicate 1512, by routing the correlation bindings e through the magic child 1602 and the arc 1604, as shown by 1605. The arc 1604 and predicate 1603 are shown by dotted lines because the arc 1604 is only linked to the child 1508 directly if the child 1508 is AMQ type.

Figure 16:
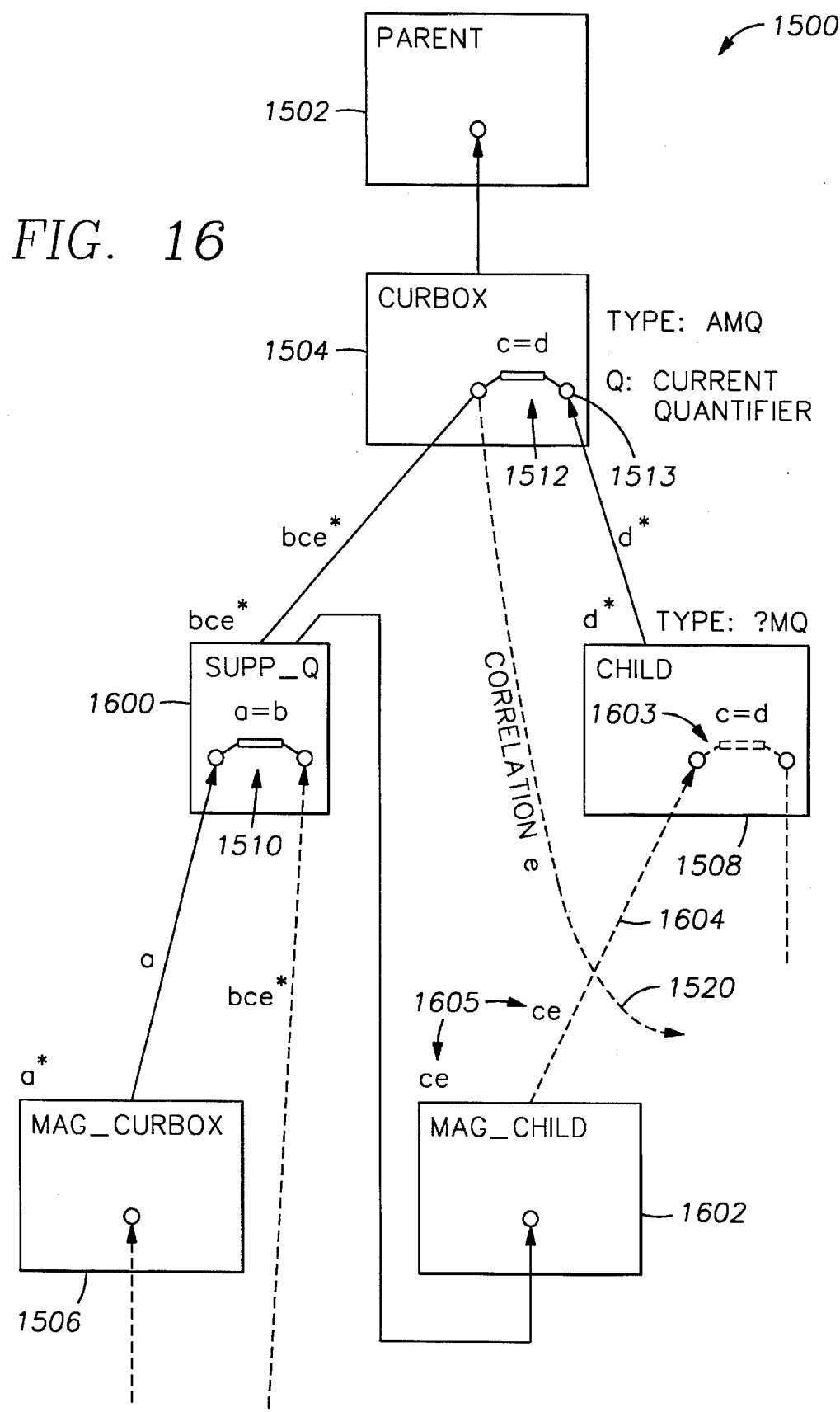
Figure 17:
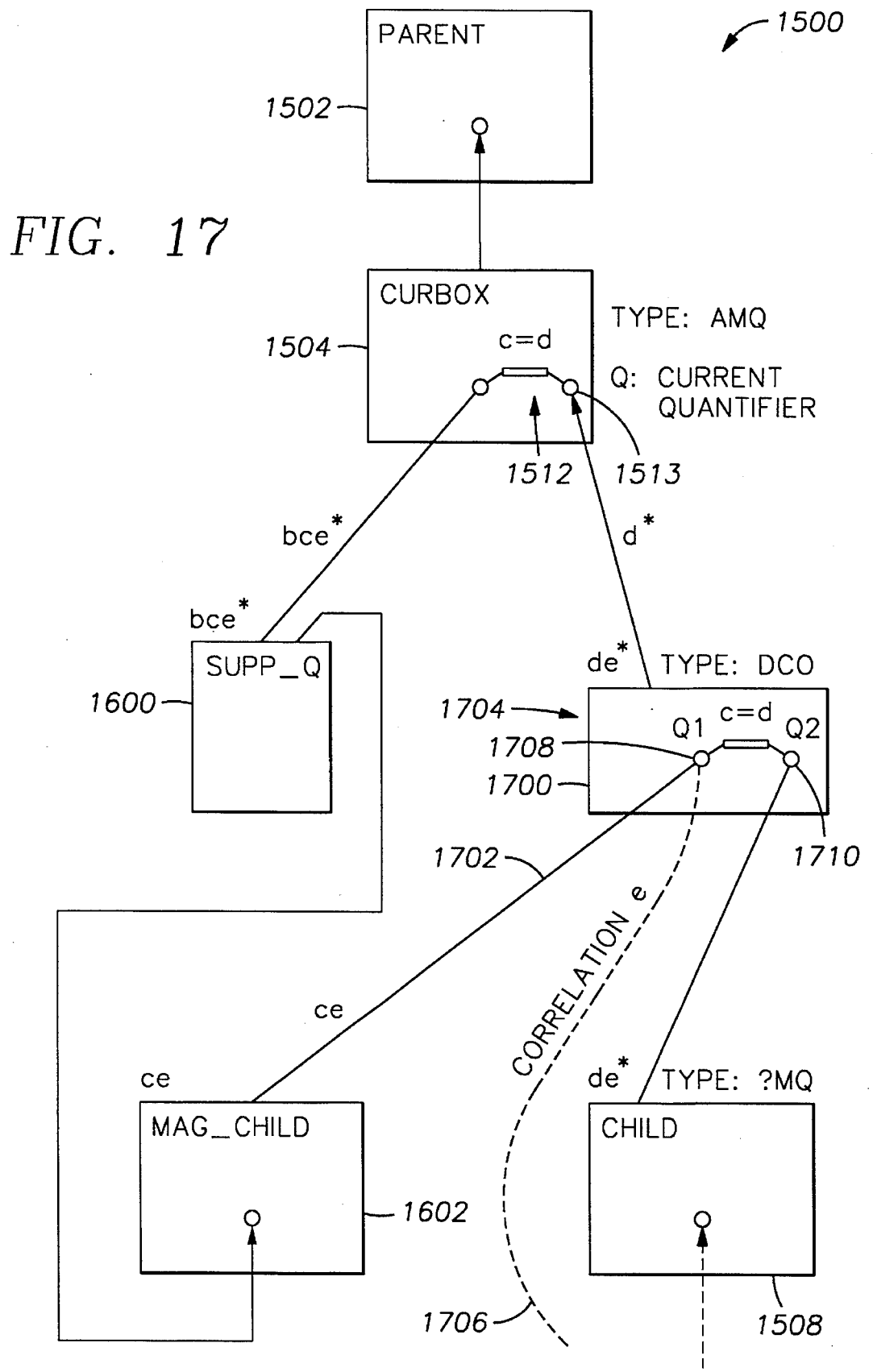

Next, as shown in FIG. 17. task 1404 creates a single join predicate box 1700 immediately above the child 1508. The box 1700 is called a decorrelation output ("DCO") box. DCO boxes generally provide decorrelated views of children to their parents. They may be removed by various means, such as merging two boxes into one. For simplicity of explanation, FIGS. 17-18 omit certain components of FIGS. 15-16 that are still considered to be present in the QBR 2000. The purpose of the DCO box 1700 is to provide a decorrelated view of the child 1508 to the curbox 1504. In task 1406, the bindings of the magic child 1602 are routed to the DCO box 1700 via an arc 1702. Task 1408 creates a natural join predicate 1704 in the DCO box 1700, comprising a "duplicate" of the predicate 1512. The DCO box 1700 includes quantifier 1708 over the magic child 1602, a quantifier 1710 over the child 1508, and natural join predicates on any common columns.

In task 1410 the DCO box 1700 outputs the correlation bindings e received from the magic child 1602. Then task 1411 changes the source of the correlation bindings from the curbox 1504 to the DCO box 1700, thereby eliminating the arc 1520 and creating a new arc 1706. This is accomplished by changing the descendant's correlation to obtain bindings from the quantifier 1708 instead of the qauantifier 1513. It can be seen that the child 1508 and its descendants (not shown) are now decorrelated from the view of the curbox 1504. However, there is still a correlation between the DCO box 1700 and the descendants of the child 1508. Therefore, a decorrelation stage still remains to be applied, i.e. the decorrelation of task 1322 (FIG. 13); the details of this decorrelation are discussed in greater detail below.

Figure 18:
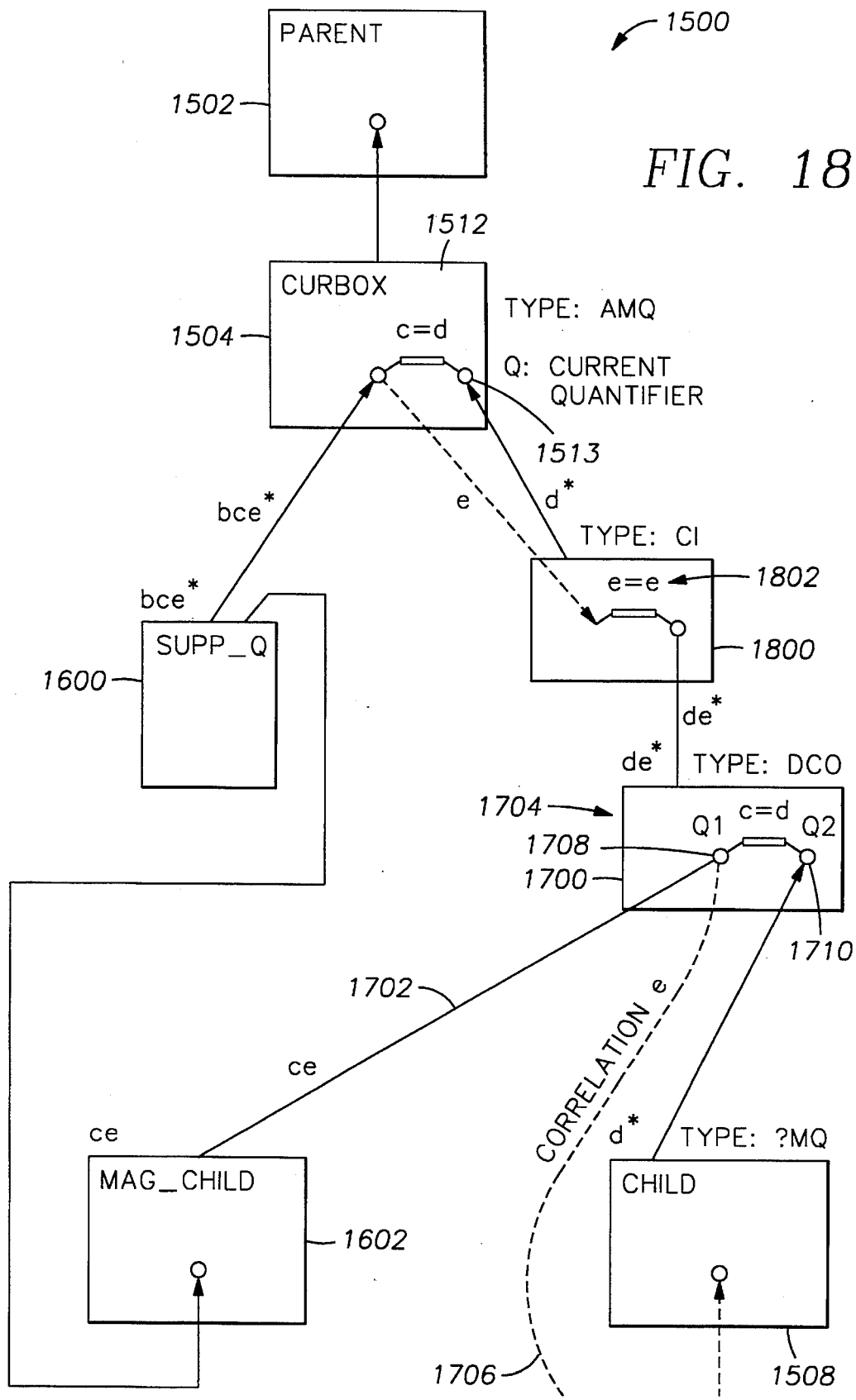

Presently, however, the QBR 1500 is not consistent because the curbox 1504 must have a correlated view of the subquery to retain the association between the correlation values and the answers from the subquery. Hence, task 1412 introduces a single predicate join box 1800 with a predicate 1802 between the source of correlation (i.e. the curbox 1504) and the correlation bindings returned from the DCO box 1700. The box 1800 is called a correlation input ("CI") box, and provides the curbox 1504 with a correlated view of the subquery to retain the association between the correlation values and the answers from the subquery. In accordance with the present invention, CI boxes can be removed through various processes, such as merging. As shown in FIG. 18, the CI box 1800 ensures that the bindings d are partitioned properly when passed to the curbox 1504. This step is essential to retain the correspondence enforced by the correlation in the original query. It is incorrect to instead introduce a join predicate in the curbox 1504, because the quantifier over the child 1508 may be universal or existential involving arbitrary Boolean expressions and may preclude the addition of any predicates to it.

If the quantifier 1513 is a ForEach quantifier, the CI box 1800 may be merged into the curbox 1504 using existing rewrite rules, whereupon the new correlation predicate becomes a join predicate in the curbox 1504. After task 1412, the local FEED routine 1400 ends in task 1414.

As shown above, the FEED stage ensures that if the child 1508 can decorrelate on some columns, then the bindings for those columns are available in its magic table. Importantly, the QBR is consistent at this stage, maintaining the incremental nature of the process.

FEED-- Remote Feed

As mentioned above, the FEED stage includes two aspects: remote FEED and local FEED. The remote FEED is performed when a correlation exists between a descendant of the current box and an ancestor of the current box. The FEED stage example of FIG. 14 (described above) demonstrates the condition where a child is amenable to decorrelation. However, if the child refuses to decorrelate, the undesired correlations will persist. A box may even agree to decorrelate on some of its correlated columns, but not others. In this case, the FEED process of FIG. 14 is applied for those columns that can be decorrelated, and the remaining columns remain correlated.

If these correlations exist because of direct correlations from the subquery box itself, then the children of the subquery box are not affected by its refusal to decorrelate. However, if the descendants of the refusing box actually contain the correlation references, then these descendants now have remote correlations. Accordingly, when the magic decorrelation process is applied to them, the source of their correlations is not the immediate parent box. This is one condition in which the remote FEED stage of FIG. 19 may be useful.

Figure 19:
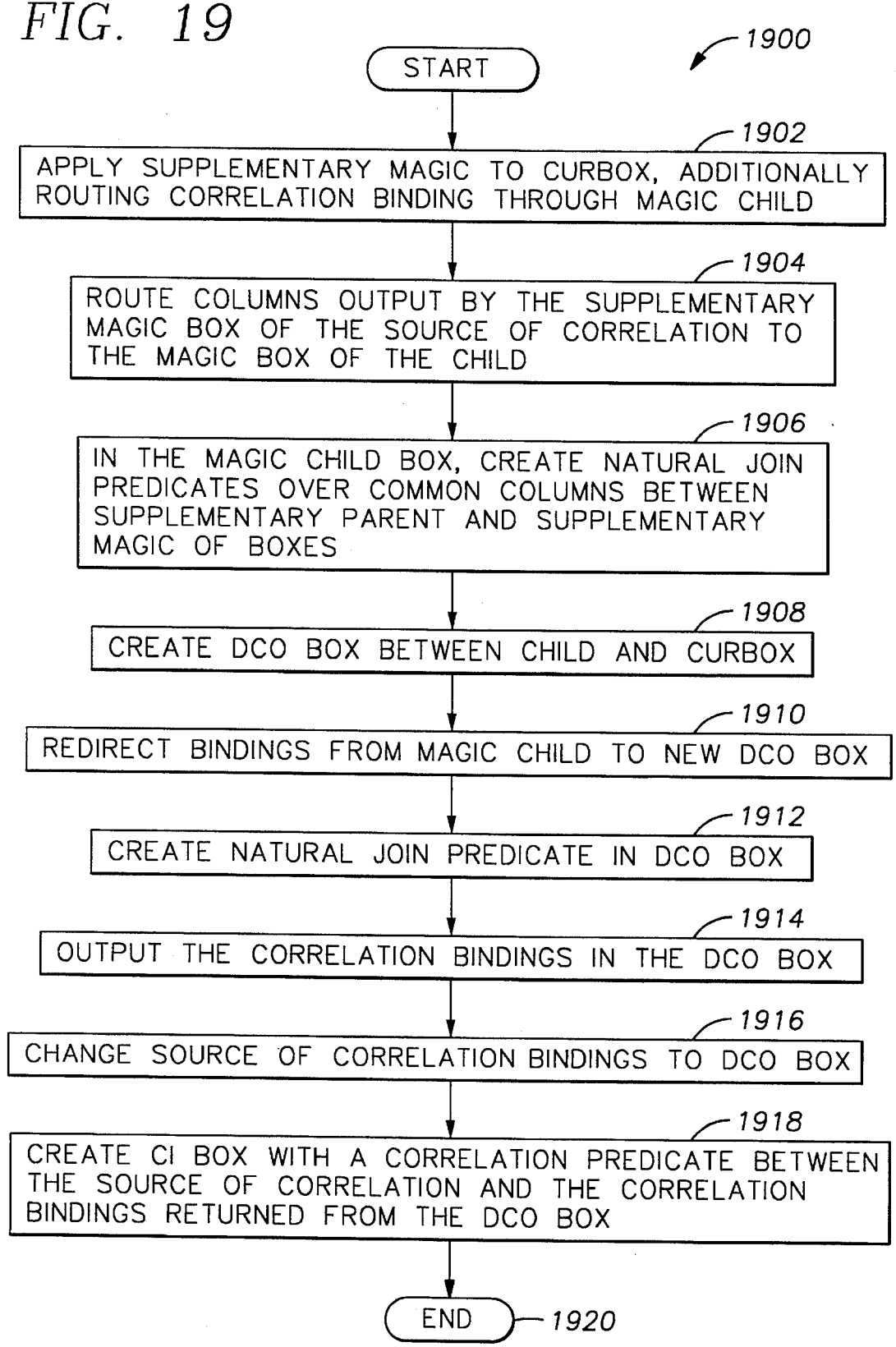
FIG. 19 is a flowchart depicting an illustrative remote FEED sequence in accordance with the invention.
Figure 20:
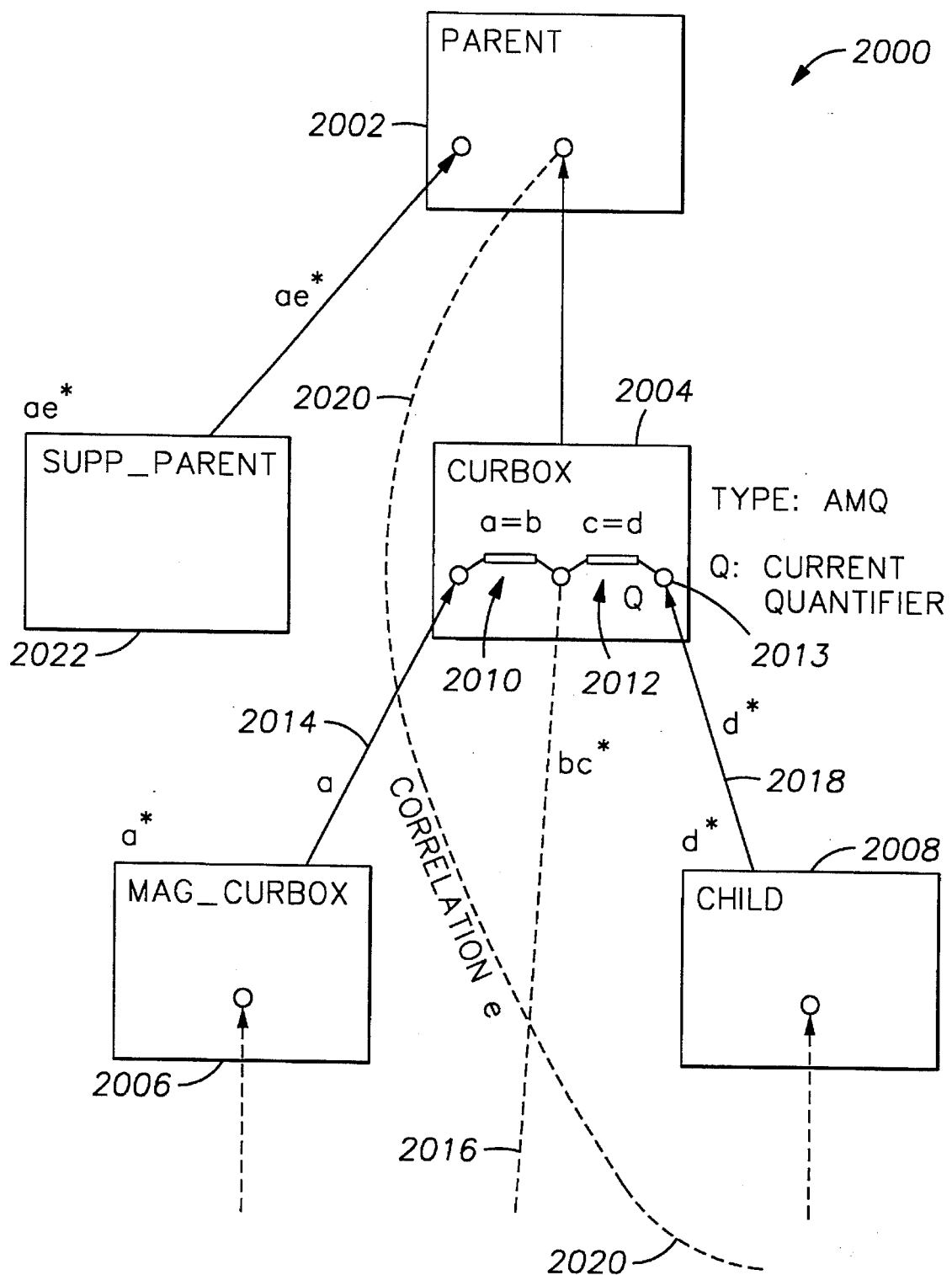
FIGS. 20–23 are diagrams of an illustrative query transformation sequence corresponding to the remote FEED sequence of FIG. 19.

As shown in FIG. 19, the remote FEED stage may be embodied in a routine that comprises a sequence of tasks 1900. FIG. 20 depicts a QBR 2000 representing a starting point for the process of tasks 1900. The intermediate states of transformation corresponding to the operations of FIG. 19 are shown by the QBR 2000 in FIGS. 21–23.

FIG. 20 depicts a parent 2002 of a curbox 2004, the curbox 2004, a magic curbox 2006, and a child 2008 of the curbox 2004. As mentioned above, the magic decorrelation method of the invention is performed in a top-down fashion. Hence, it can be seen that the magic curbox 2006 was produced during magic decorrelation or magic rewriting of the parent 2002, performed previously.

The curbox 2004 includes a first predicate 2010, a second predicate 2012, and a quantifier 2013 that ranges over a child 2008 of the curbox 2004. The curbox 2004 receives bindings from arcs 2014, 2016, and 2018. There is a correlation in a descendant (not shown) of the child 2008, with the source of correlation being the parent 2002. The correlation column is e. Hence, the parent 2002 passes the correlation bindings e to the descendant via an arc 2020. A supplementary parent box 2022 is also shown, which provides bindings a and e to the parent 2002. The supplementary parent box 2022 exists due to a previous application (not shown) of magic decorrelation or another variety of magic to the parent 2002.

Since the goal of the FEED stages in general is to change the manner in which a child ultimately receives correlation bindings, application of a FEED stage may be referred to as "feeding the child" of the curbox. The routine 1900 begins in task 1902, which applies supplementary magic to the curbox 2004. This creates a supplementary magic box 2100 (FIG. 21) containing the predicate 2010, and also creates a magic child 2102 that passes join bindings c to the child 2008 via an arc 2104. Hence, a predicate 2105 is also created, duplicative of the predicate 2012. The arc 2104 and predicate 2105 are shown by dotted lines because the arc 2104 is only linked to the child 2008 directly if the child 2008 is AMQ type.

Figure 21:
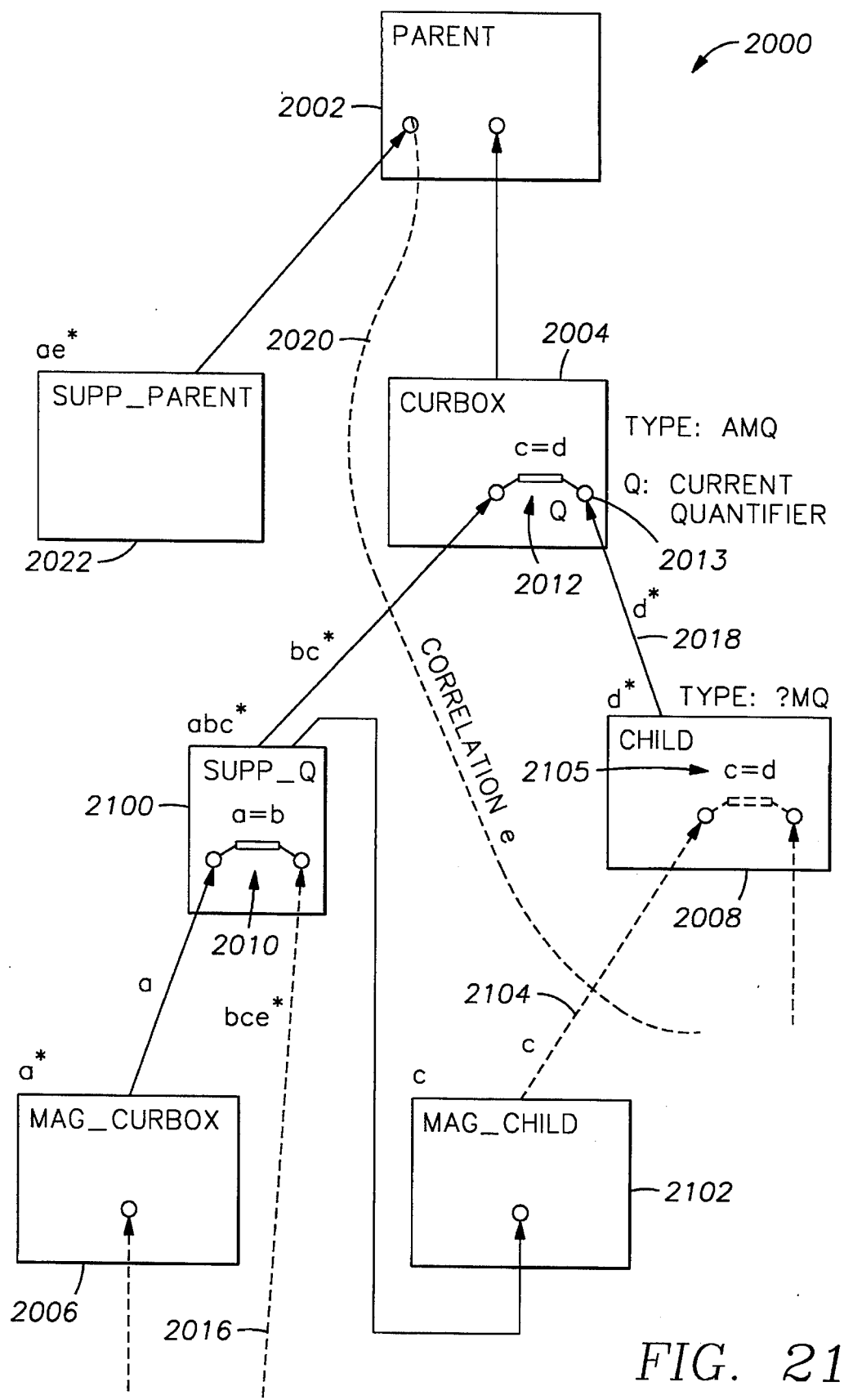
Figure 22:
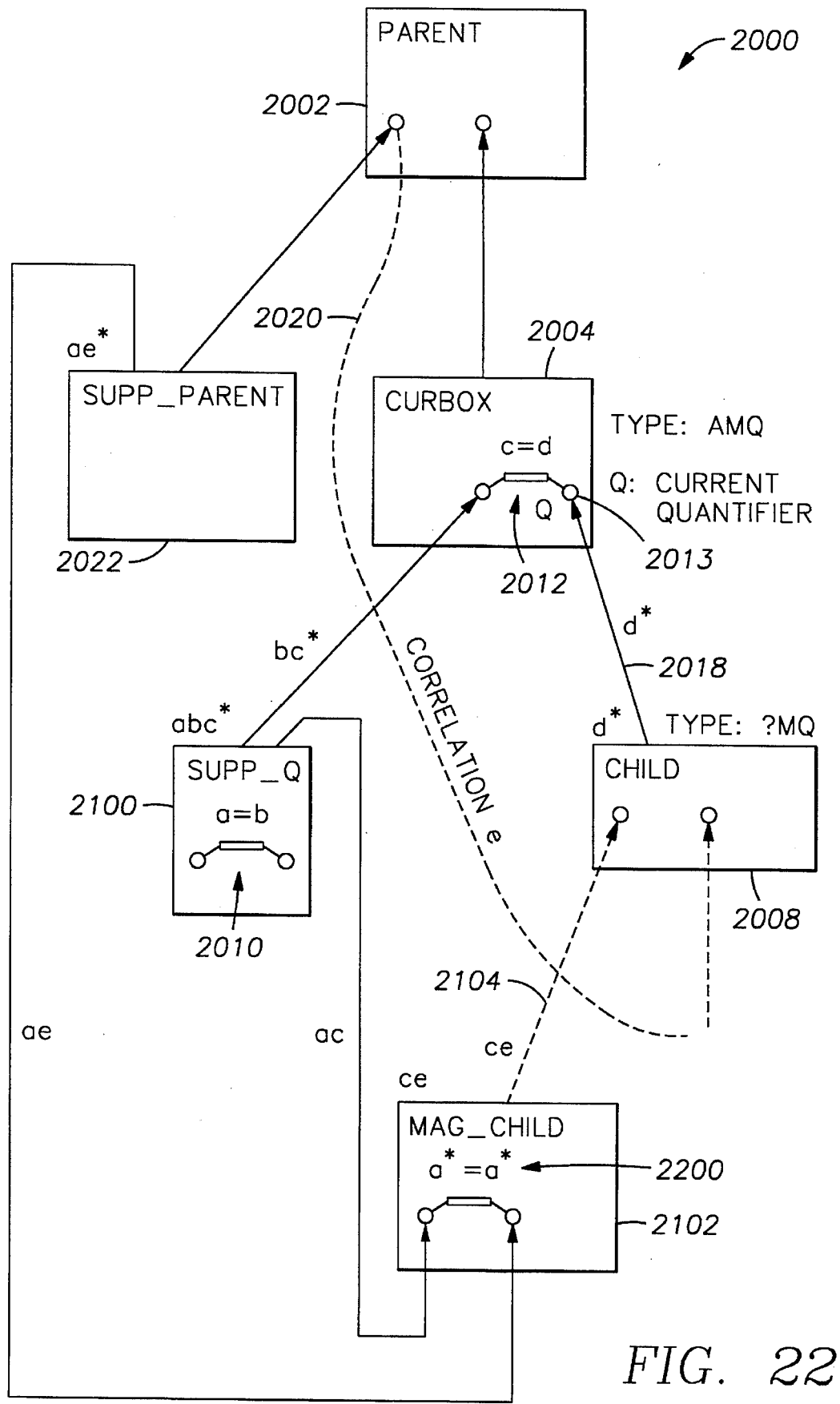

Next, as shown in FIG. 22, task 1904 routes the columns output by the supplementary parent box 2022 to the magic child 2102. In the present example, these columns comprise the columns a and e. For simplicity of explanation, FIGS. 22–23 omits certain components of FIGS. 20-21 that are still considered to be present in the QBR 2000.

Next, as shown in FIG. 22, task 1906 creates a natural join predicate 2200 in the magic child 2102, where the join predicate 2200 is created over common columns between the supplementary parent box 2022 and the supplementary magic box 2010. This is desirable since the source of the e bindings (i.e. the supplementary parent 2022) is different than the source of the correlation bindings (i.e. the parent 2002). Therefore, the natural join predicate serves to partition the columns c and e properly with respect to each other.

After task 1906, task 1908 creates a single predicate join box, shown as a DCO box 2300 (FIG. 2300), immediately above the child 2008. The purpose of the DCO box 2300 is to provide a decorrelated view of the child 2008 to the curbox 2004. In task 1910, the bindings c and e are fed from the magic child 2102 to the DCO box 2300 via an arc 2302. Task 1912 also creates a natural join predicate 2304 in the DCO box 2300, comprising a "duplicate" of the predicate 2012. The DCO box 2300 includes a quantifier 2308 over the magic child 2102, a quantifier 2310 over the child 2008, and natural join predicates on any common columns.

After the DCO box 2300 outputs the correlation bindings e received from the magic child 2102 in task 1914, task 1916 changes the source of the correlation bindings from the parent 2002 to the DCO box 2300. This eliminates the arc 2020, and creates a new arc 2312. In other words, the correlation predicate from the descendant is modified, so that it obtains its bindings from the quantifier 2308 instead of instead of a quantifier from the parent 2002. In this manner, the child 2008 and other boxes beneath the child 2008 are decorrelated from the view of the parent 2002. The subquery is not yet decorrelated, however from the view of the curbox 2004. Therefore, a decorrelation stage still remains to be applied, i.e. the decorrelation of task 1322 (FIG. 13); the details of this decorrelation are discussed in greater detail below.

Presently, however, the QBR is not consistent because the curbox 2004 requires a correlated view of the subquery to retain the association between the correlation values and the answers from the subquery. Hence, task 1918 introduces a single predicate join box (the CI box 2314) with a predicate 2316 between the source of correlation (i.e. the parent 2002) and the correlation bindings returned from the DCO box 2300. The CI box 2314 thus provides the curbox 2004 with a correlated view of the subquery to retain the association between the correlation values and the answers from the subquery.

Figure 23:
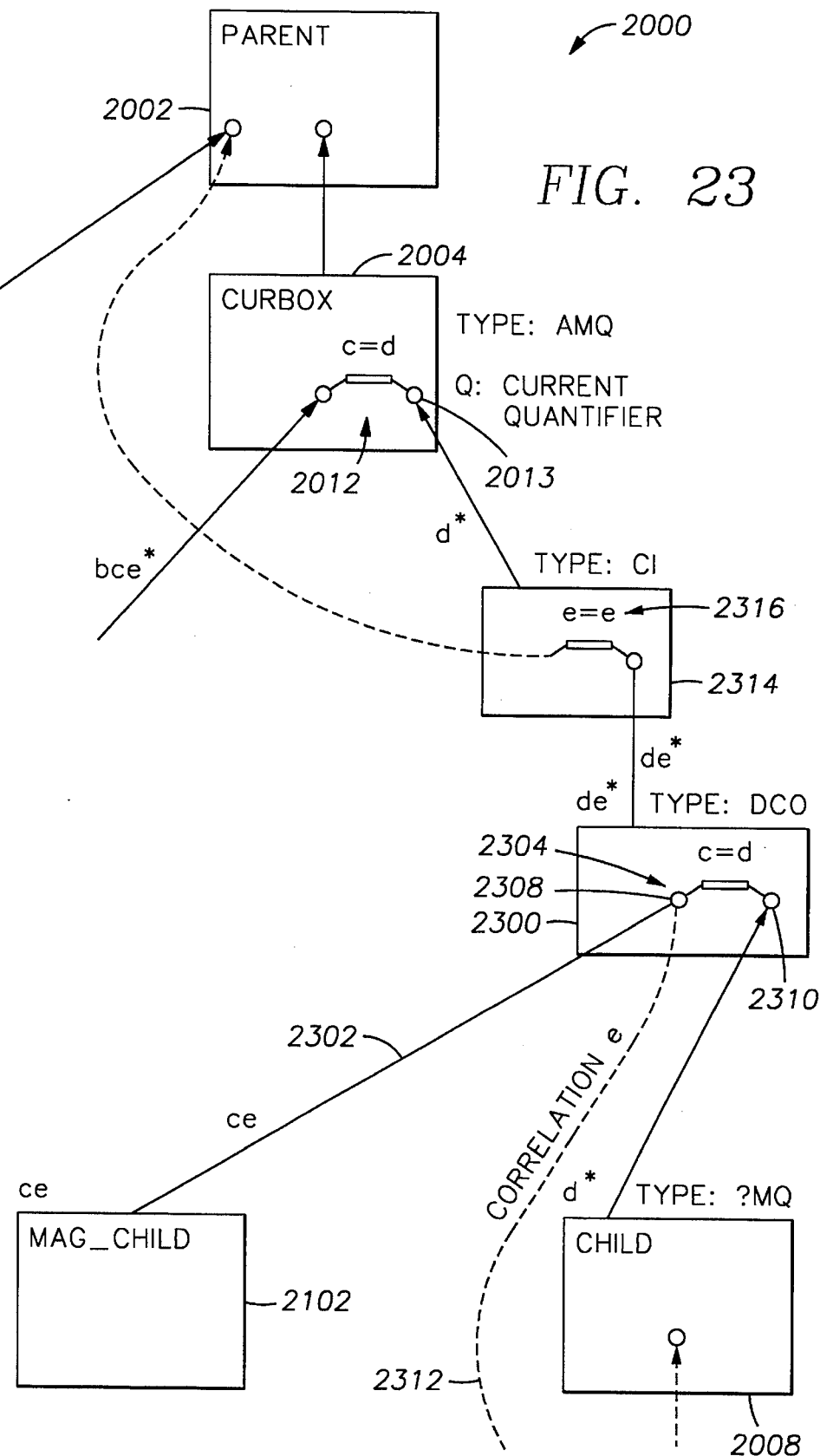

As shown in FIG. 23, the CI box 2314 ensures that the bindings d are partitioned properly when passed to the curbox 2004. This step is important to avoid losing the correspondence enforced by the correlation in the original query. It would be improper to introduce a join predicate in the curbox 2004 instead, because the quantifier over the child 2008 may be universal or existential involving arbitrary Boolean expressions, and may preclude the addition of any predicates to it.

After task 1918, the remote FEED routine 1900 ends in task 1920.

Decorrelation-- Generally

As shown above, applying the FEED stage to a current box (i.e. "feeding the child" of the current box) creates a DCO box between the current box and its child, with an quantifier over its magic box. The "decorrelation" stage of FIG. 13 task 1322 completely decorrelates the current box by absorbing the correlation bindings that are available in the magic box, and decorrelating on the corresponding columns. As described above, two approaches may be used for decorrelation, depending upon whether the box being processed is AMQ or NMQ type: the AMQ decorrelation stage, and the NMQ decorrelation stage. The starting point for decorrelation is the same as the last step of the applicable FEED stage.

AMQ Decorrelation

Figure 24:
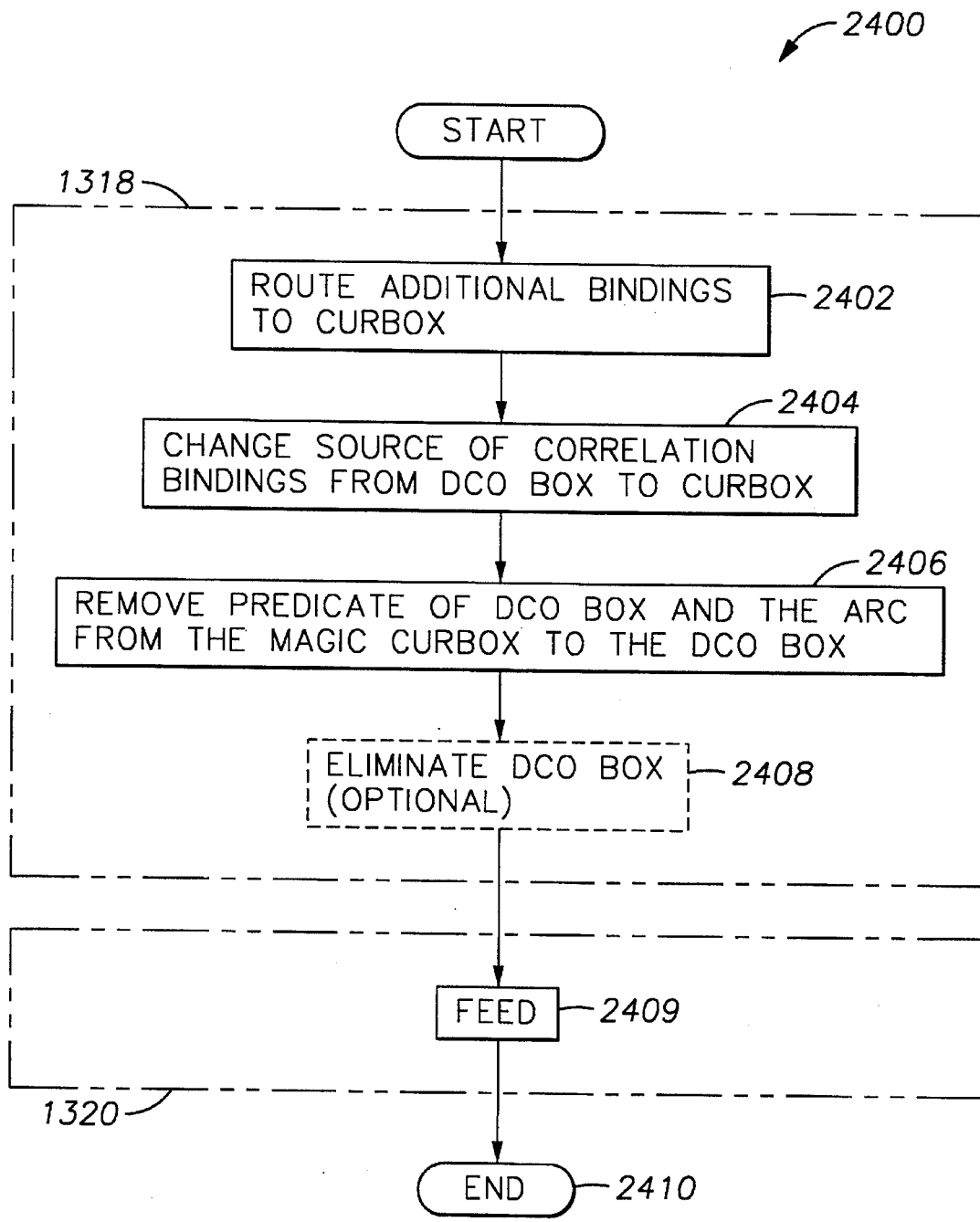
FIG. 24 is a flowchart depicting an illustrative AMQ decorrelation sequence in accordance with the invention.
Figure 25:
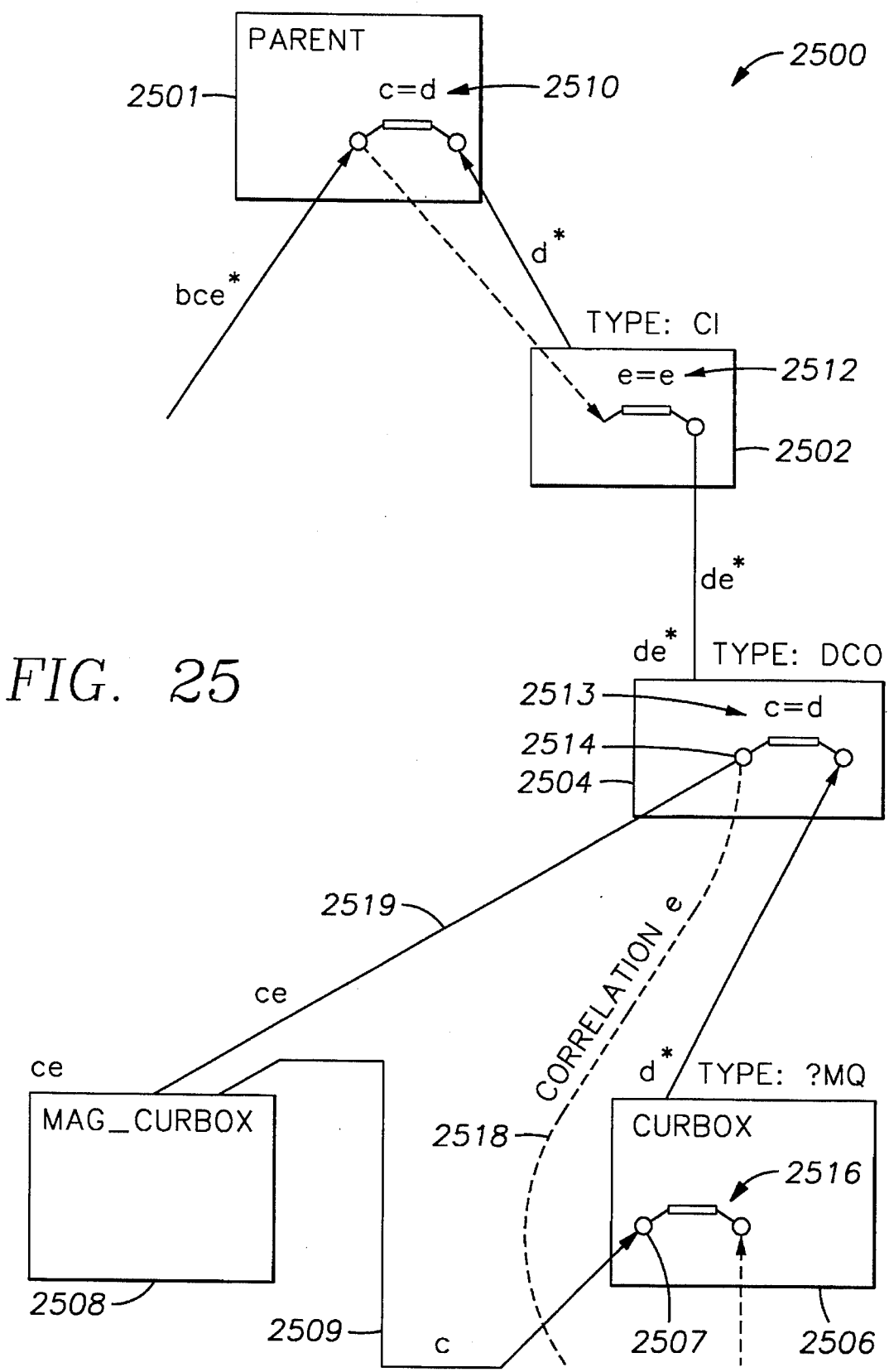
FIGS. 25–28 are diagrams of an illustrative query transformation sequence corresponding to the AMQ decorrelation sequence of FIG. 24.

As mentioned above, the AMQ decorrelation procedure is performed when current box is AMQ type. As shown in FIG. 24, the AMQ decorrelation stage may be embodied in a routine that comprises a sequence of tasks 2400, corresponding to the operation 1326 of FIG. 13. FIG. 25 depicts a QBR 2500 representing a starting point for the process of tasks 2500. The intermediate states of transformation corresponding to the operations of FIG. 24 are shown by the QBR 2500 in FIGS. 26–28.

FIG. 25 depicts a parent 2501 of an AMQ type curbox 2506, a CI box 2502, a DCO box 2504, the curbox 2506, and a magic curbox 2508. This arrangement 2500 corresponds to the final condition of a remote or local FEED stage, as shown in FIGS. 18 or 23. Accordingly, the "parent" shown in FIG. 25 corresponds to the current box of FIGS. 18 or 23. The parent 2501 includes a predicate 2510, the CI box 2502 includes a predicate 2512, the DCO box 2504 includes a predicate 2513 with a quantifier 2514, and the curbox 2506 includes a predicate 2516. The predicate 2516 was previously created during task 1312 (see item 1603, FIG. 16, or item 2105, FIG. 21). Descendants (not shown) of the curbox 2506 receive correlation bindings via a correlation arc 2518. An arc 2519 passes columns e and e from the magic curbox 2508 to the DCO box 2504. A magic arc 2509 passes join bindings c from the magic curbox 2508 to the curbox 2506.

Figure 26:
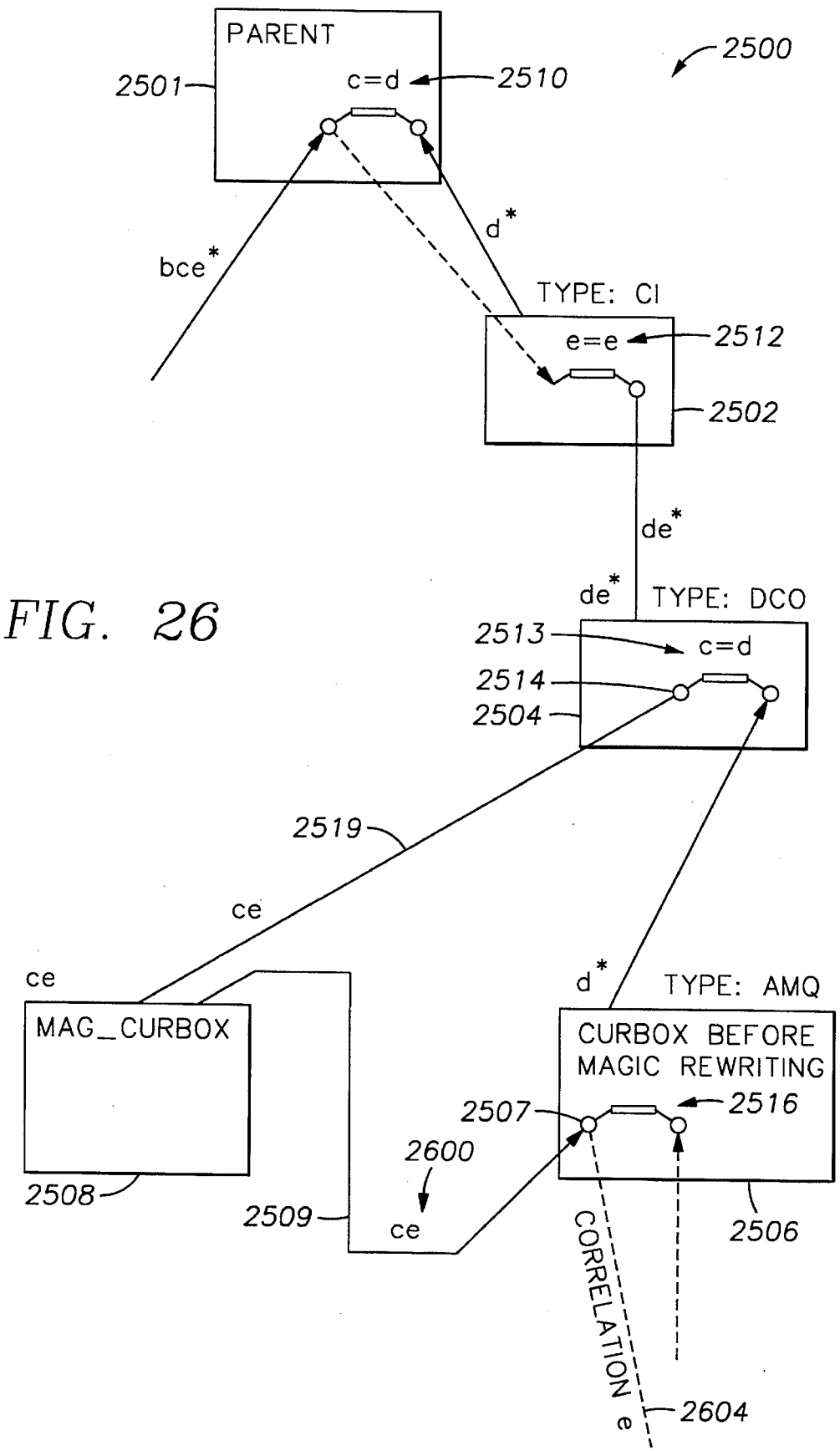
Figure 27:
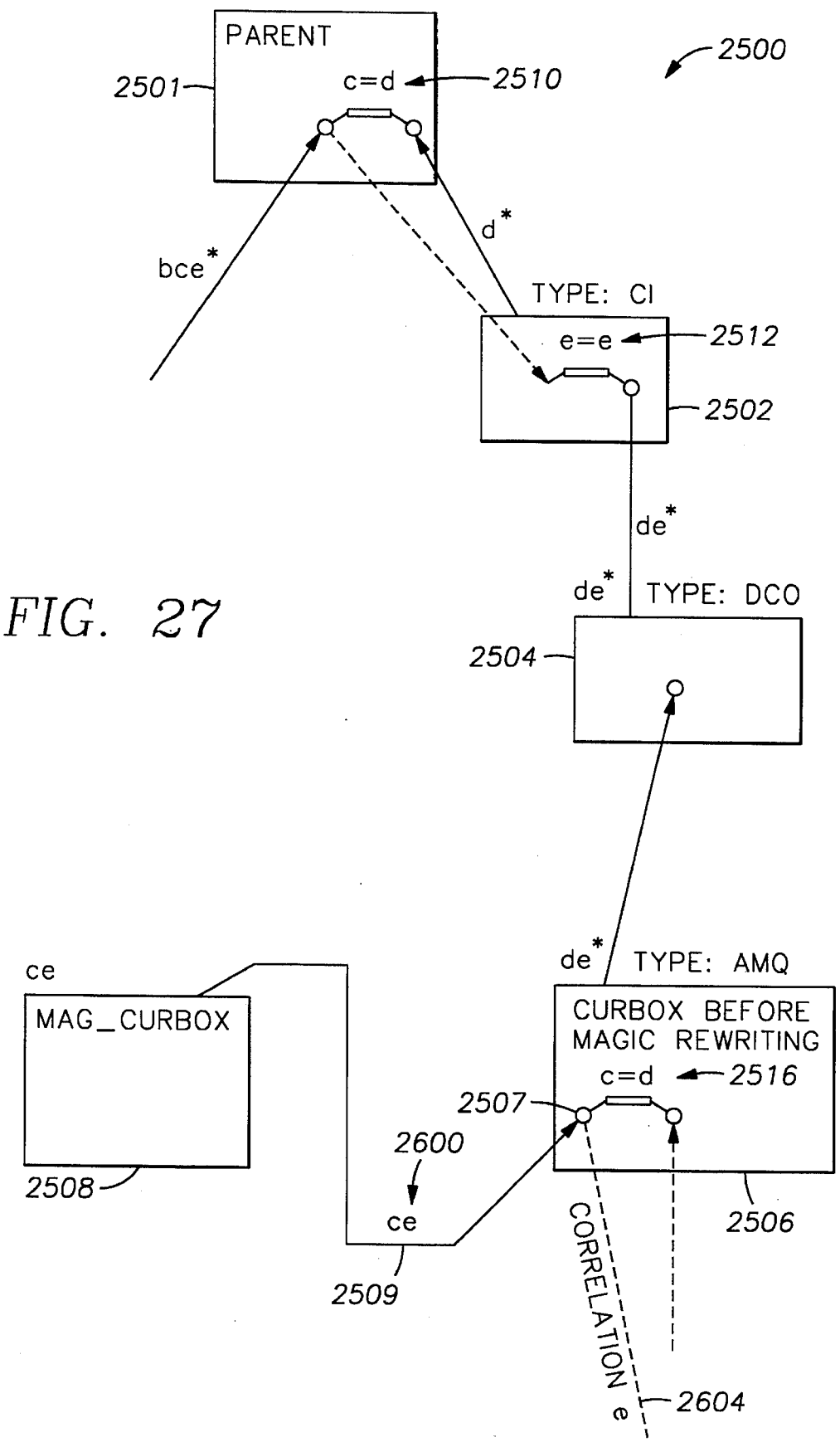

As mentioned above in conjunction with FIG. 13, the AMQ decorrelation process includes an ABSORB stage 1328 and a FEED stage 1330. The tasks of the AMQ decorrelation procedure 1326 are shown in greater detail by the routine 2400, which begins in task 2402. As shown in FIG. 25, the curbox 2506 already has a magic quantifier 2507 over its magic box (the magic curbox 2508), and it is thus capable of accessing its correlation columns via that quantifier 2507. Accordingly, task 2402 modifies the magic arc 2509 so that the curbox 2506 can additionally access the correlation bindings e. In other words, task 2402 routes the correlation bindings e from the magic curbox 2508 to the curbox 2506. Next, task 2404 changes all correlation expressions in descendants of the parent 2501 that have the DCO box 2504 as the source of their correlation, so that the source of the correlation is now the magic quantifier 2507 in the curbox 2506. This is accomplished by eliminating the correlation arc 2518 and creating a new correlation arc 2604 (FIG. 26). In this step, the curbox 2506 actually decorrelates, so that the correlation bindings from the quantifier 2507 appear in the output of the curbox 2506. In the illustrated case, the column e is added to the output of the curbox 2506, as shown in FIG. 27. Decorrelation may require the addition of outer join for GROUP BY boxes; this is determined locally in accordance with information provided by the encapsulator of each box.

Since the quantifier 2514 of the DCO box 2504 is now unnecessary, it is removed in task 2406 along with the arc 2519 an the predicate 2513, leaving the curbox 2506 fully decorrelated as shown in FIG. 27. Next, if desired, the DCO box 2504 may be eliminated in task 2408. Task 2408, however, is optional, since the DCO box 2504 may instead be eliminated during subsequent optimization processes (not shown), which may be performed in addition to magic decorrelation to remove redundant boxes, merge boxes where possible. At this point, another optional step (not shown) may be performed by merging the CI box 2502 with the parent 2501, if possible, to create a merged parent 2800 (FIG. 28) that includes the predicates 2510 and 2512. If desired, however, this step may be accomplished during other subsequent query optimization processes.

After task 2406 (or task 2408 if applicable) the FEED stage is applied in task 2409 and the routine 2400 ends in task 2410.

NMQ Decorrelation

Figure 29:
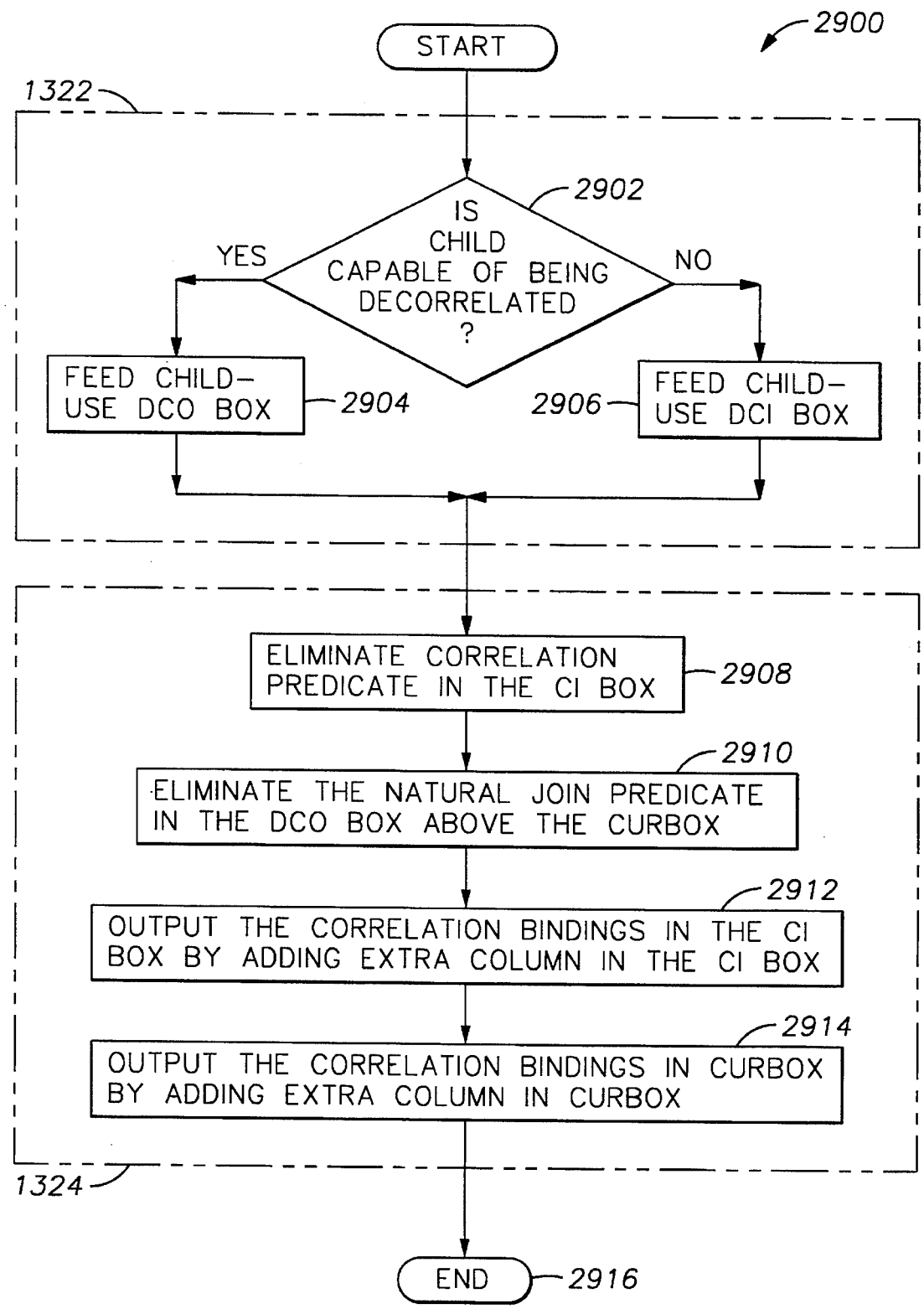
FIG. 29 is a flowchart depicting an illustrative NMQ decorrelation sequence in accordance with the invention.
Figure 30:
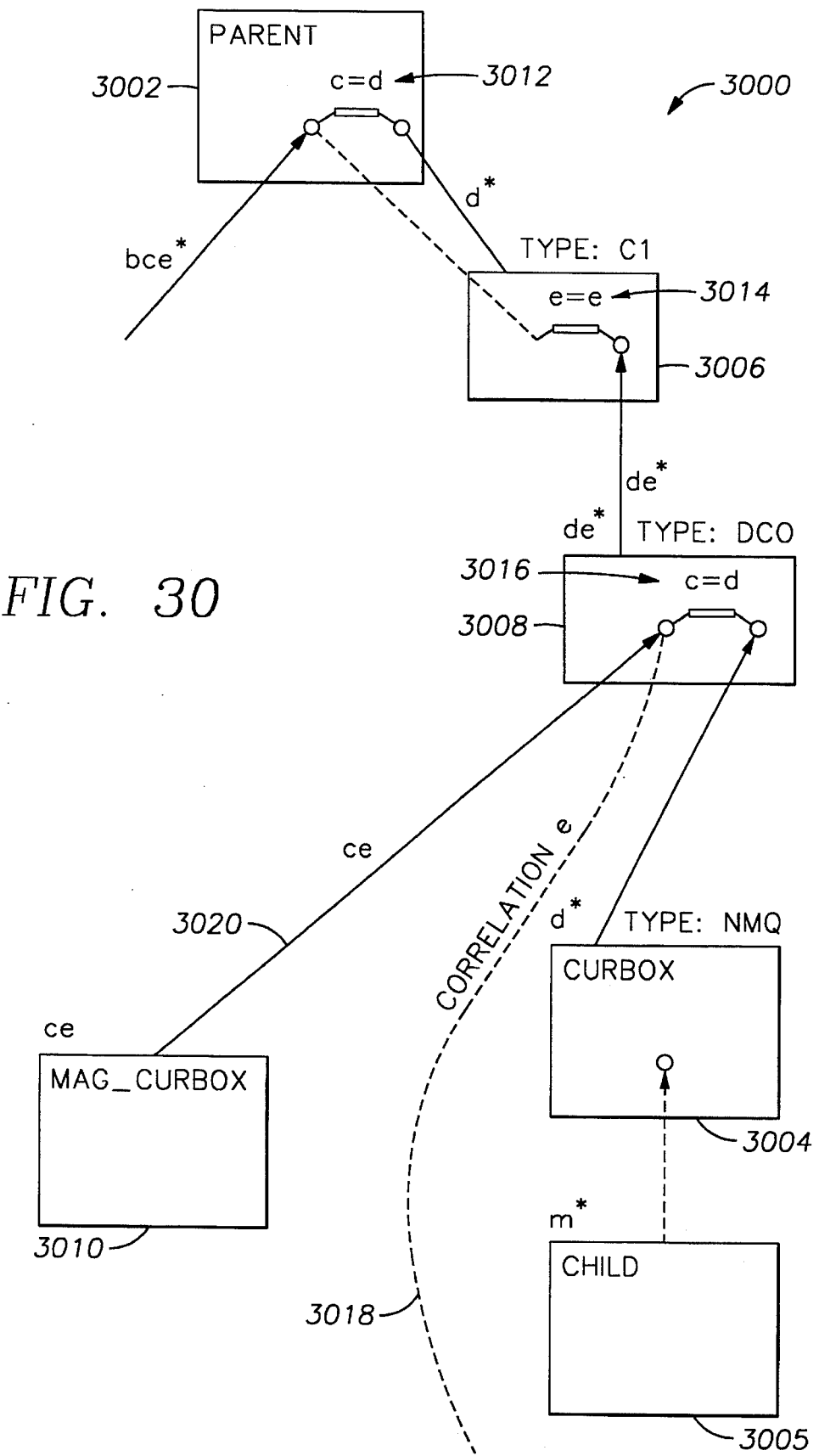
FIGS. 30–33 are diagrams of an illustrative query transformation sequence corresponding to the NMQ decorrelation sequence of FIG. 29.

The NMQ decorrelation stage is used when the current box is of the type NMQ. The NMQ decorrelation stage may be embodied in a routine that comprises a sequence of tasks 2900, corresponding to the operation 1332 of FIG. 13. FIG. 30 depicts a QBR 3000 representing a starting point for the process of tasks 2900. The intermediate states of transformation corresponding to the operations of FIG. 29 are shown by the QBR 2900 in FIGS. 31–33.

FIG. 30 depicts a parent 3002 of an NMQ type curbox 3004, a CI box 3006, a DCO box 3008, the curbox 3004, a magic curbox 3010, and a child 3005 of the curbox 3010. This arrangement 3000 corresponds to the final condition of a remote or local FEED stage, as shown in FIGS. 18 or 23. Accordingly, the "parent" of FIG. 30 corresponds to the current box of FIGS. 18 or 23. The parent 3002 includes a predicate 3012, the CI box 3006 includes a predicate 3014, and the DCO box 3008 includes a predicate 3016. Descendants (not shown) of the curbox 3004 receive correlation bindings via a correlation arc 3018. An arc 3020 passes columns c and e from the magic curbox 3010 to the DCO box 3008.

Since the curbox 3004 is an NMQ box, decorrelation is complicated because the curbox 3004 does not have a quantifier over its magic box 3010. As a result, the curbox 3004 does not have a handle on the correlation bindings. Hence, these bindings can only be obtained from children of the curbox 3004.

As mentioned above in conjunction with FIG. 13, the NMQ decorrelation procedure 1332 includes a FEED stage 1334 and an ABSORB stage 1336. The tasks of the NMQ decorrelation procedure 1332 are shown in greater detail by the routine 2900, which begins in branch 2902, by determining whether the child 3005 is capable of being decorrelated. This information is available, as discussed above, from the encapsulator of the child 3005. If the child 3005 is capable of being decorrelated, task 2904 "feeds the child", i.e. applies the FEED stage to the child. This produces the arrangement shown in FIG. 31. In particular, task 2904 introduces a CI box 3022 with a correlation predicate 3023, and a DCO box 3024. Task 2904 also creates an arc 3026 between the CI box 3022 and the DCO box 3008, and removes the correlation arc 3018. Additionally, task 2904 creates a correlation arc 3028 between the DCO box 3024 and a descendant (not shown) of the child 3005. Moreover, the feeding of task 2904 introduces a magic child 3030, with an arc 3032 to the DCO box 3024.

Figure 32:
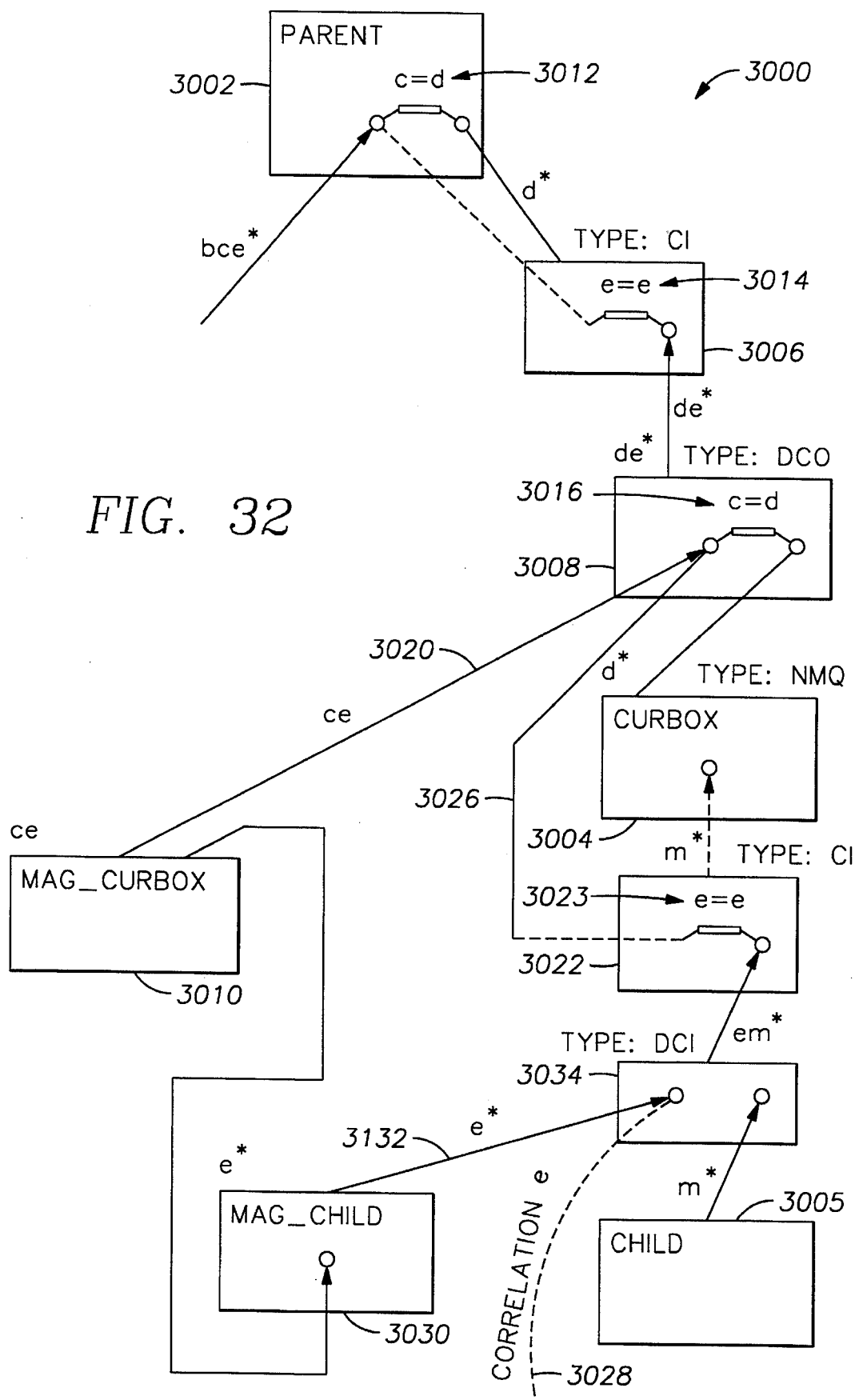

If the branch 2902 determines that the child 3005 cannot decorrelate on the desired columns, the curbox 3004 still must receive the decorrelation bindings along its quantifiers. Therefore, task 2905 feeds the child 3005, introducing a decorrelation input ("DCI") box 3034 instead of the DCO box 3024, as shown in FIG. 32. In this respect, DCI boxes of the invention generally provide decorrelated views of children to their parents, and cannot be removed.

Figure 33:
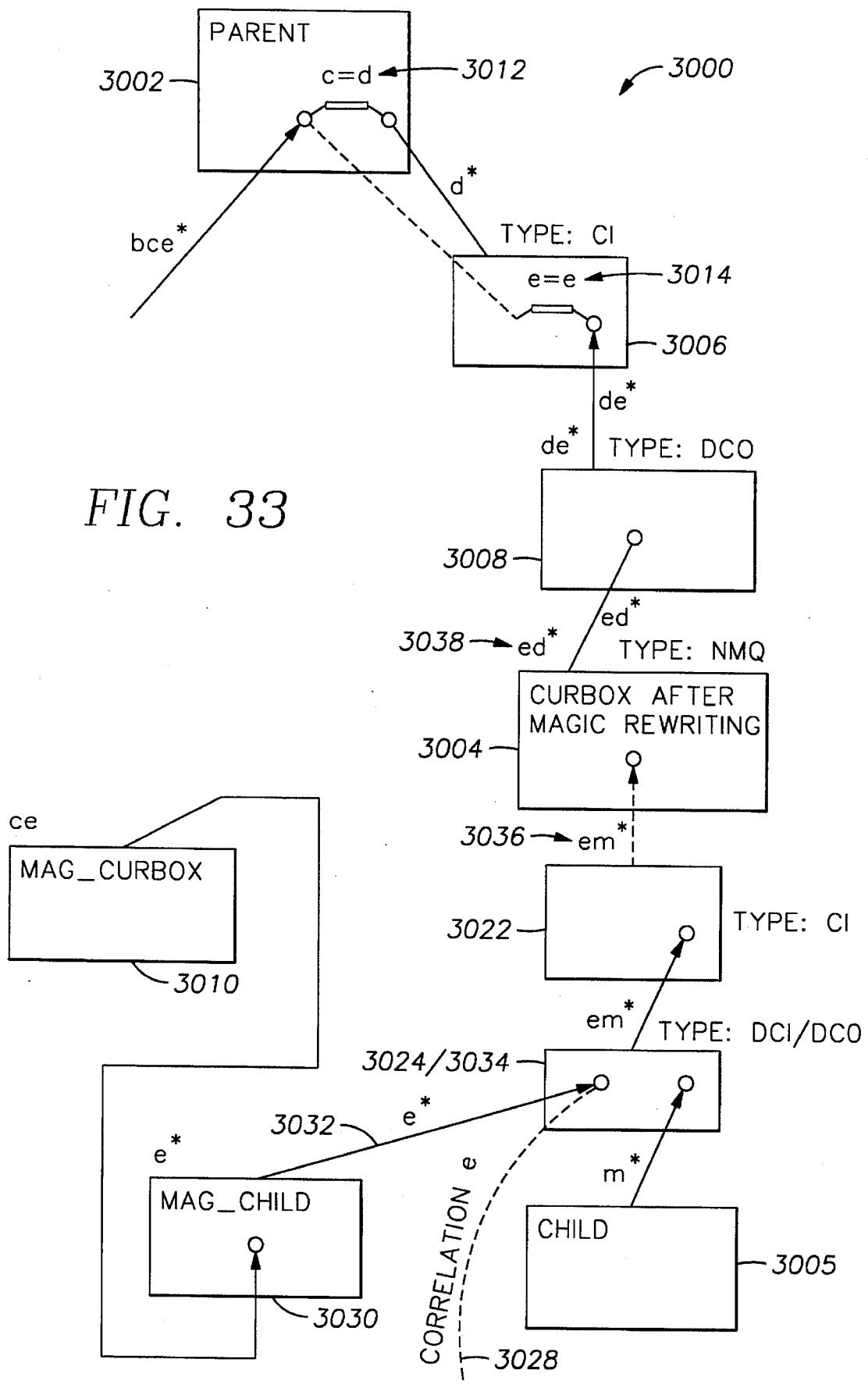

After either of tasks 2904 or 2906 are performed, a number of changes are made to the QBR 3000, the results of which are shown in FIG. 33. Specifically, task 2908 eliminates the correlation predicate 3023, and accordingly removes the correlation arc 3026. Task 2910 then eliminates the natural join predicate 3016, and task 2912 outputs the correlation bindings in the CI box 3022 by adding an extra column 3036 in the CI box 3023. The correlation bindings are then output by the curbox 3004 by adding a correlation column 3038 in the curbox 3004. After task 2914, the routine 2900 ends in task 2916.

As shown above, after all children of the curbox 3004 have been processed, the curbox 3004 is able to decorrelate because it can now access the correlation bindings along its quantifiers. In accordance with the invention, the CI, DCO and DCI boxes are not themselves processed by FEED and ABSORB stages; rather, they are skipped during top-down processing of the QBR. However, CI, DCO, and DCI boxes, where possible, may be merged or otherwise eliminated (not shown) during subsequent query optimization.

ADDITIONAL DESCRIPTION

The following description is made to illustrate the embodiments, features, and performance of the invention in greater detail, along with sample subqueries and performance results.

Magic Decorrelation

The magic decorrelation method of the invention incorporates decorrelation along with magic rewriting. The method requires three extensions to the magic processing of a QBR box:

1. Determining if a subquery is correlated, and whether decorrelation is possible. This is discussed in greater detail below.
2. For correlated subqueries that are amenable to decorrelation, generating the set of correlation values that the subquery can use to decorrelate. This stage is called the FEED stage because it feeds the bindings to the subquery. The FEED stage is performed in conjunction with the generation of the magic set for the subquery.
3. Decorrelating the subquery using the correlation values. This is called the ABSORB stage because it results in the correlation bindings being absorbed into the subquery.

As with magic sets rewriting, magic decorrelation traverses and processes the boxes in the QBR in a top-down fashion. There is only one box being processed at a time, referred to as the curbox.

Local FEED Stage

The FEED stage is similar for both AMQ and NMQ boxes, and FIGS. 15–18 illustrate the processing of an AMQ box. FIG. 15 shows the initial state of the QBR. There is a correlation predicate in some descendant of the child box, with the source of correlation being the curbox. The correlation column is "e".

The first step in magic processing determines which bindings need to be passed to the child subquery. The child box (more precisely, the encapsulator of the box) is asked if it is correlated and if so, whether it can decorrelate if provided the appropriate correlation bindings. In the example, the child box is assumed to be able to decorrelate on the correlation column "e". More detailed discussion is provided below to describe how a box encapsulator can determine whether it can decorrelate.

Figure 1:
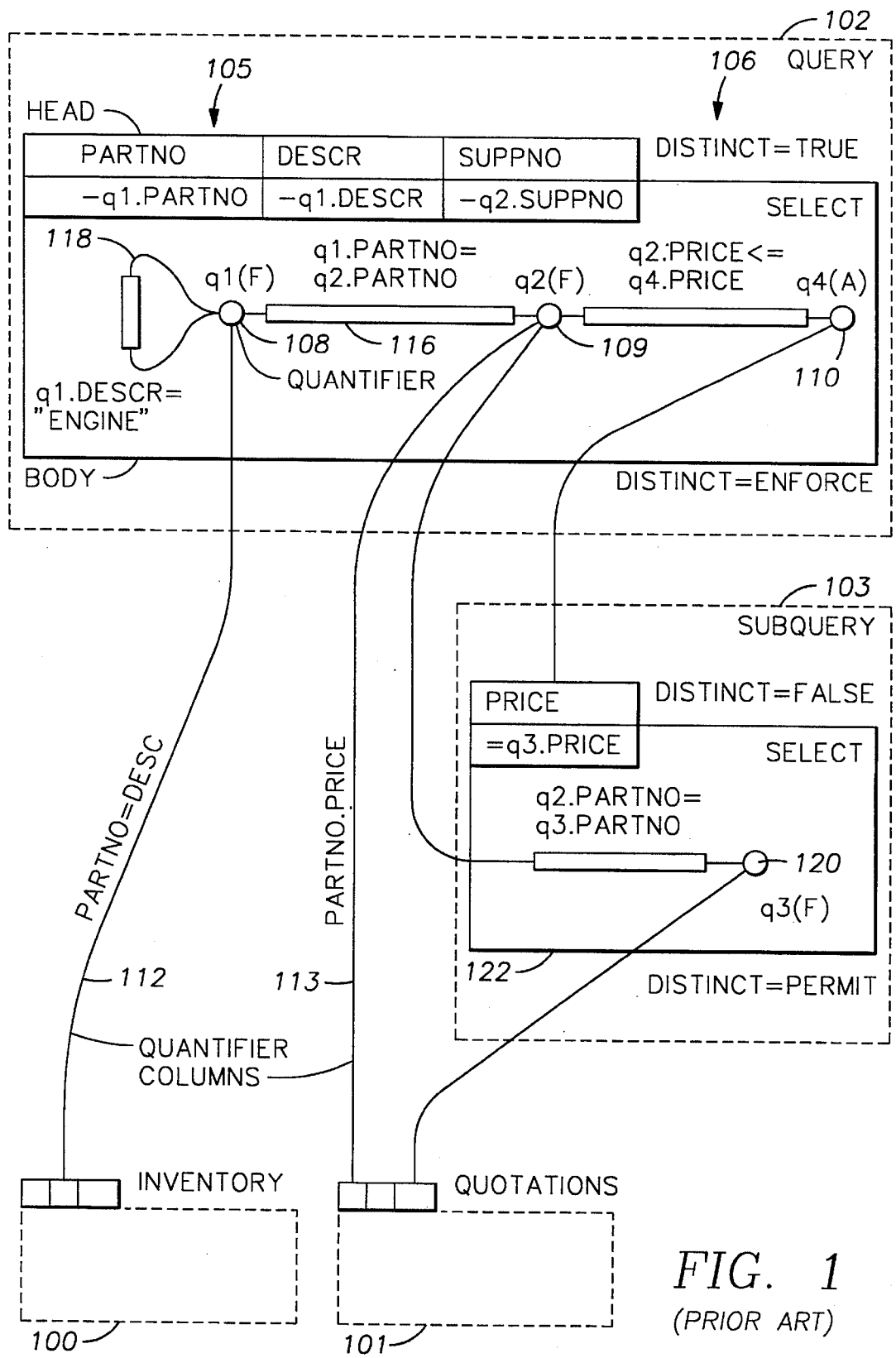
FIG. 1 is an illustrative diagram of a query in accordance with the QBR format.
Figure 2:
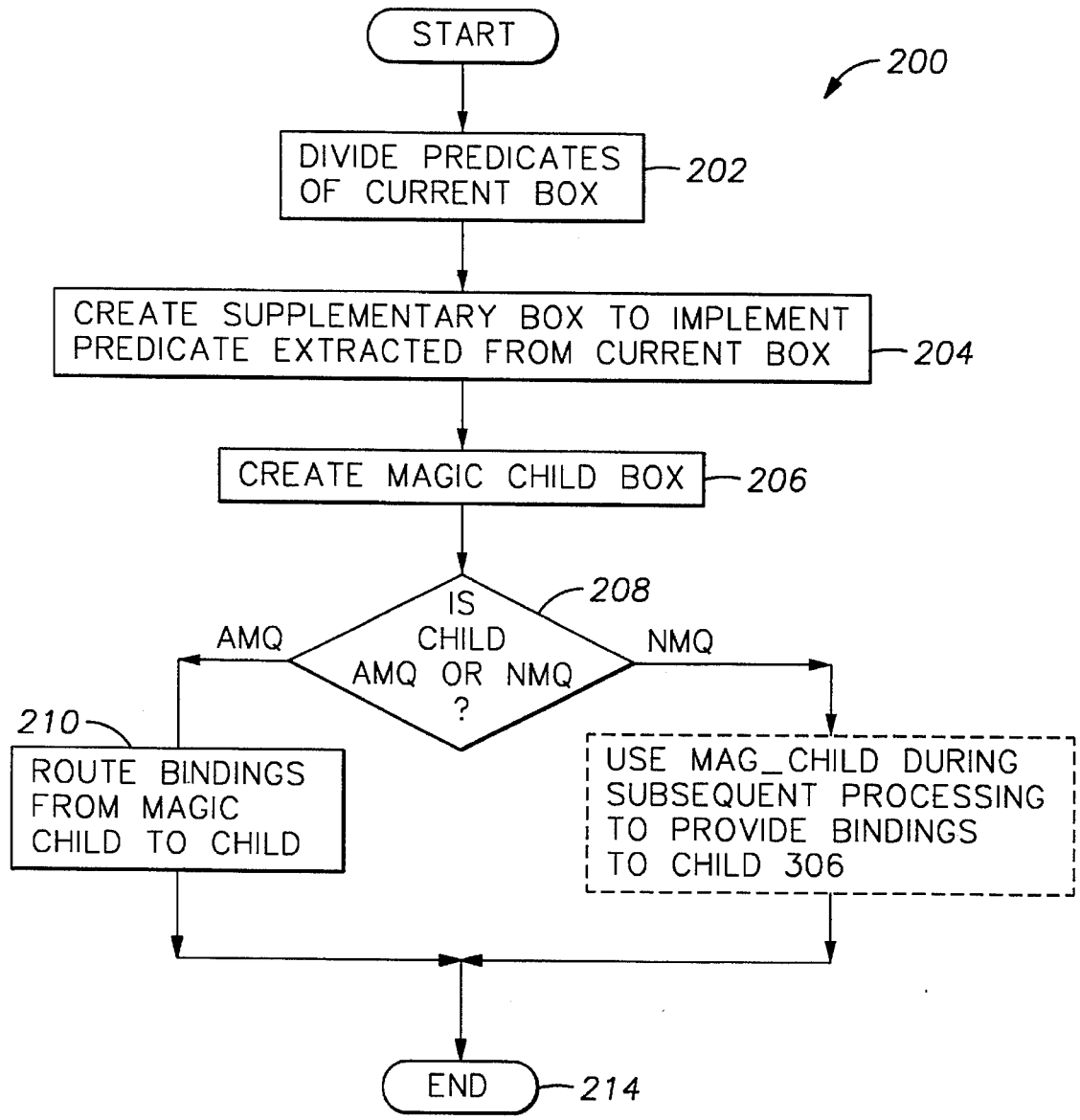
FIG. 2 is a flowchart illustrating an illustrative sequence of steps for performing magic sets rewriting of SQL queries.
Figure 3:
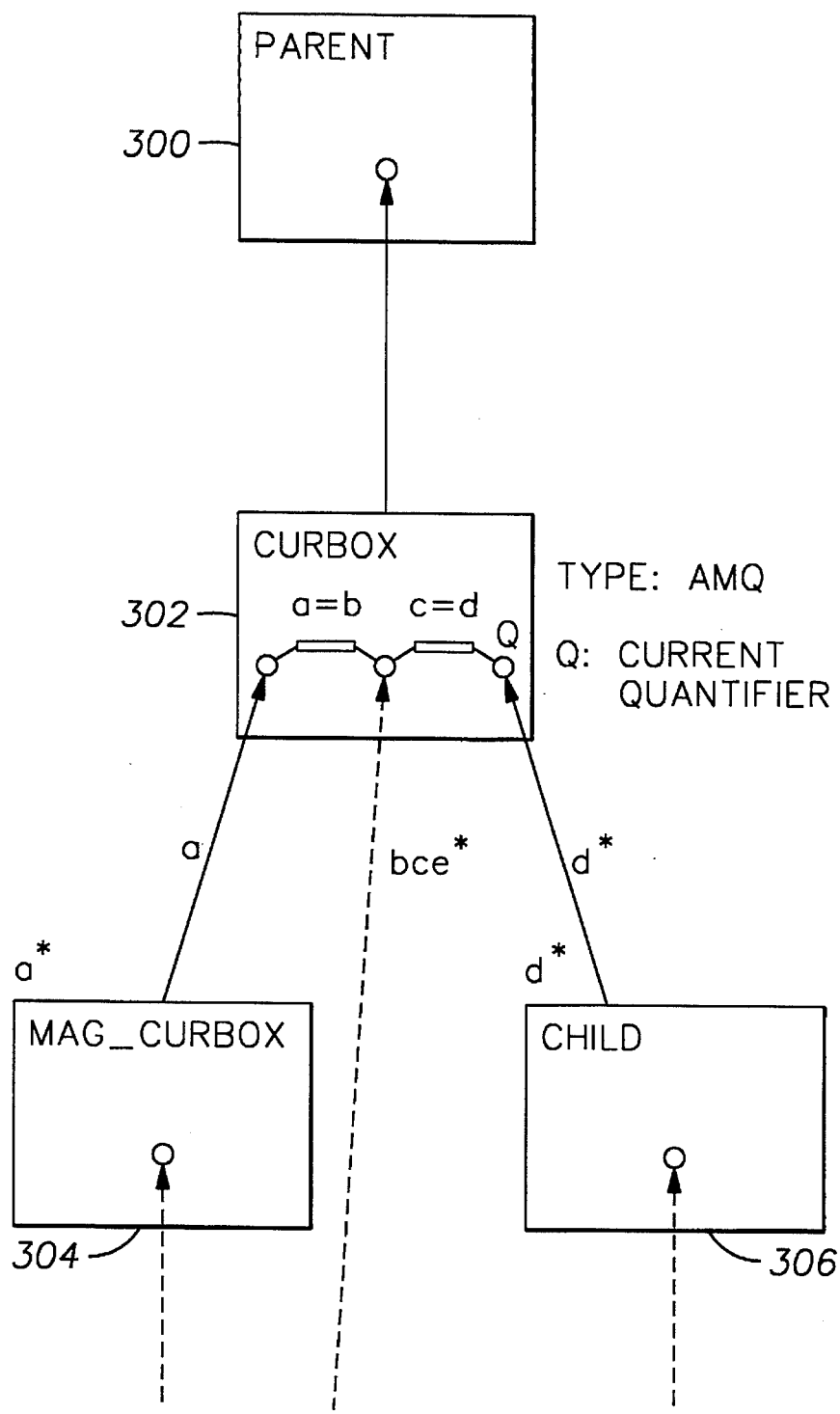
FIGS. 3–8 illustrate a query rewritten by the method of FIG. 2 in various stages of rewriting, in accordance with the QBR format.
Figure 4:
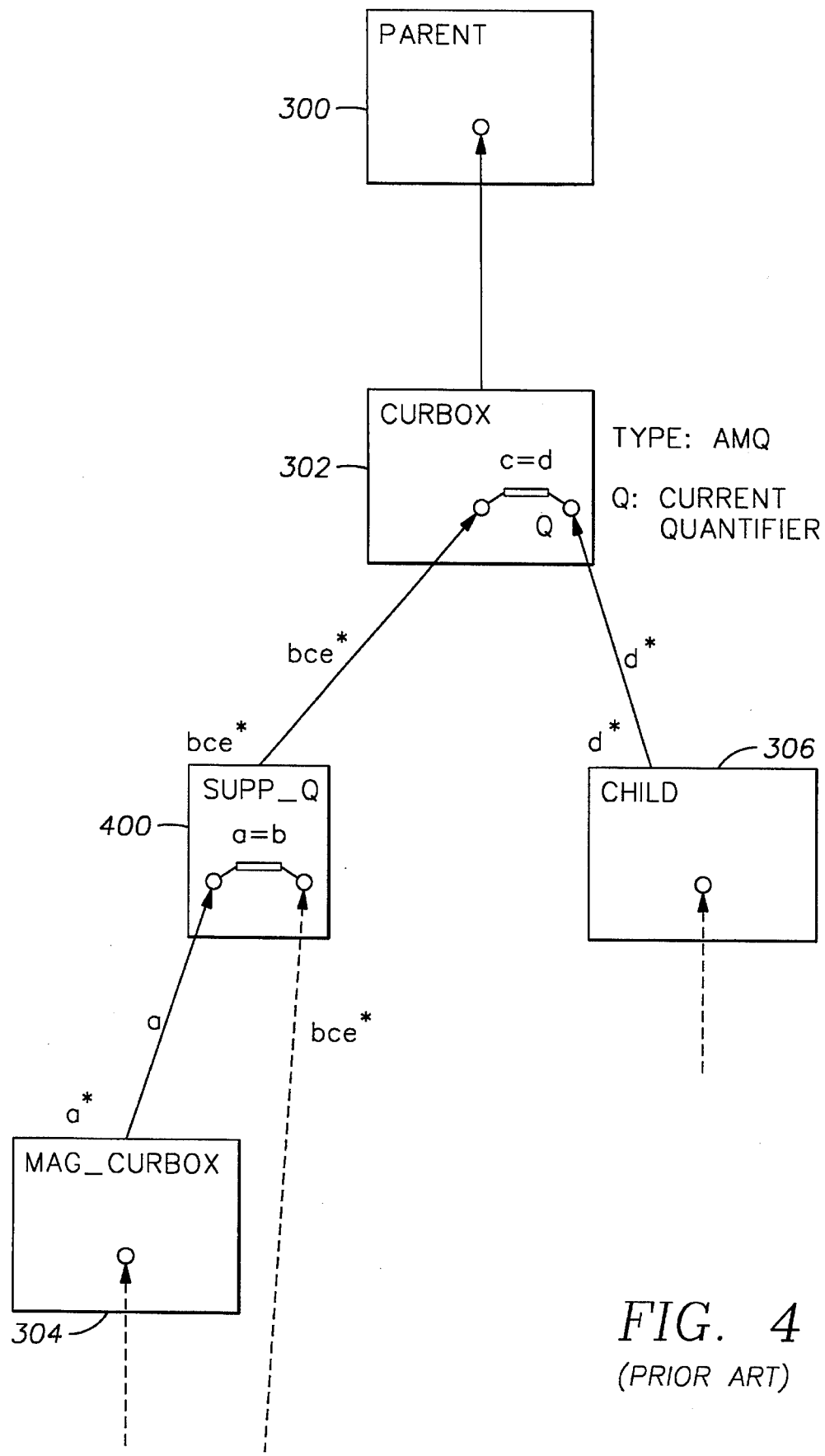
Figure 5:
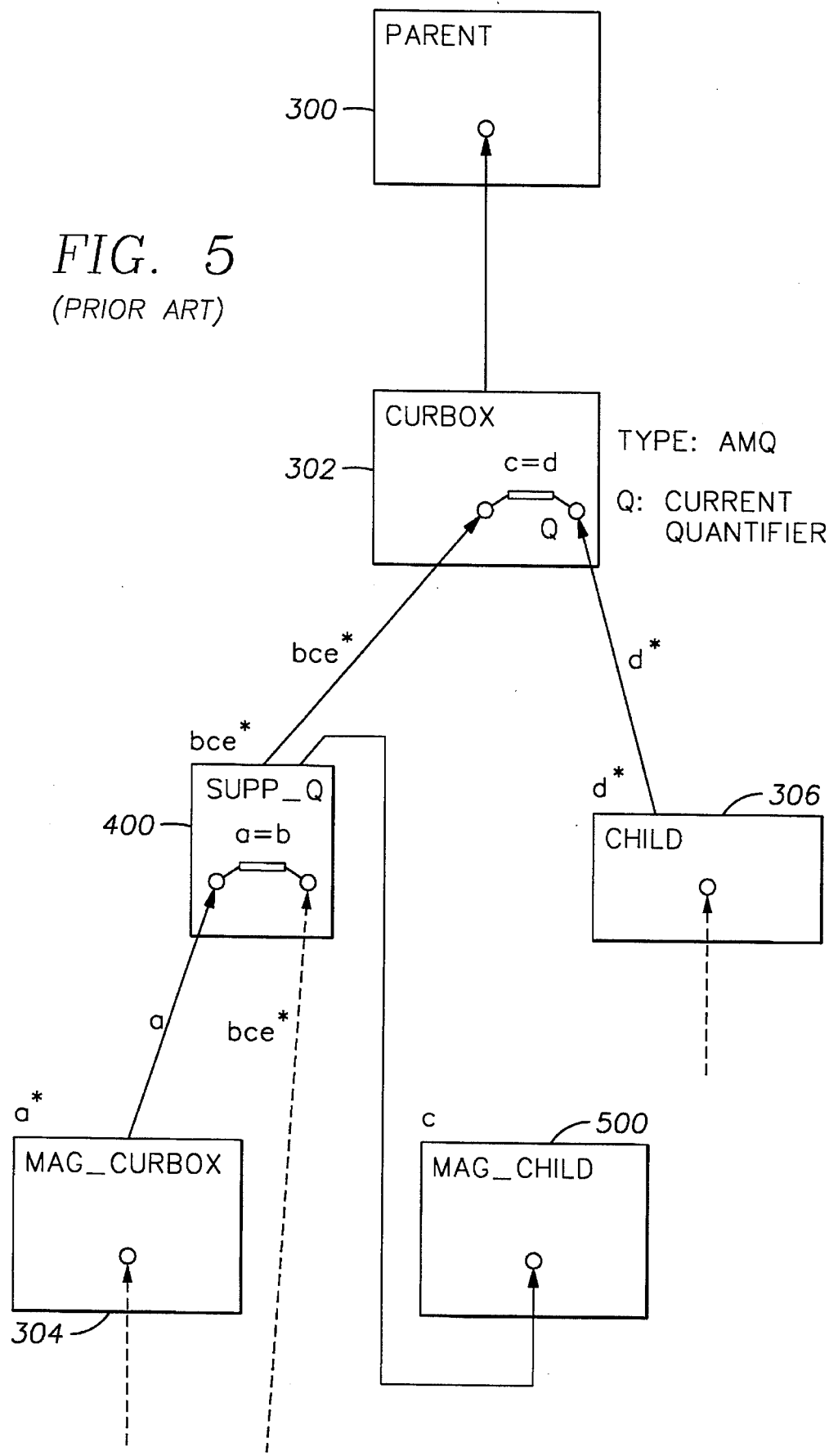
Figure 6:
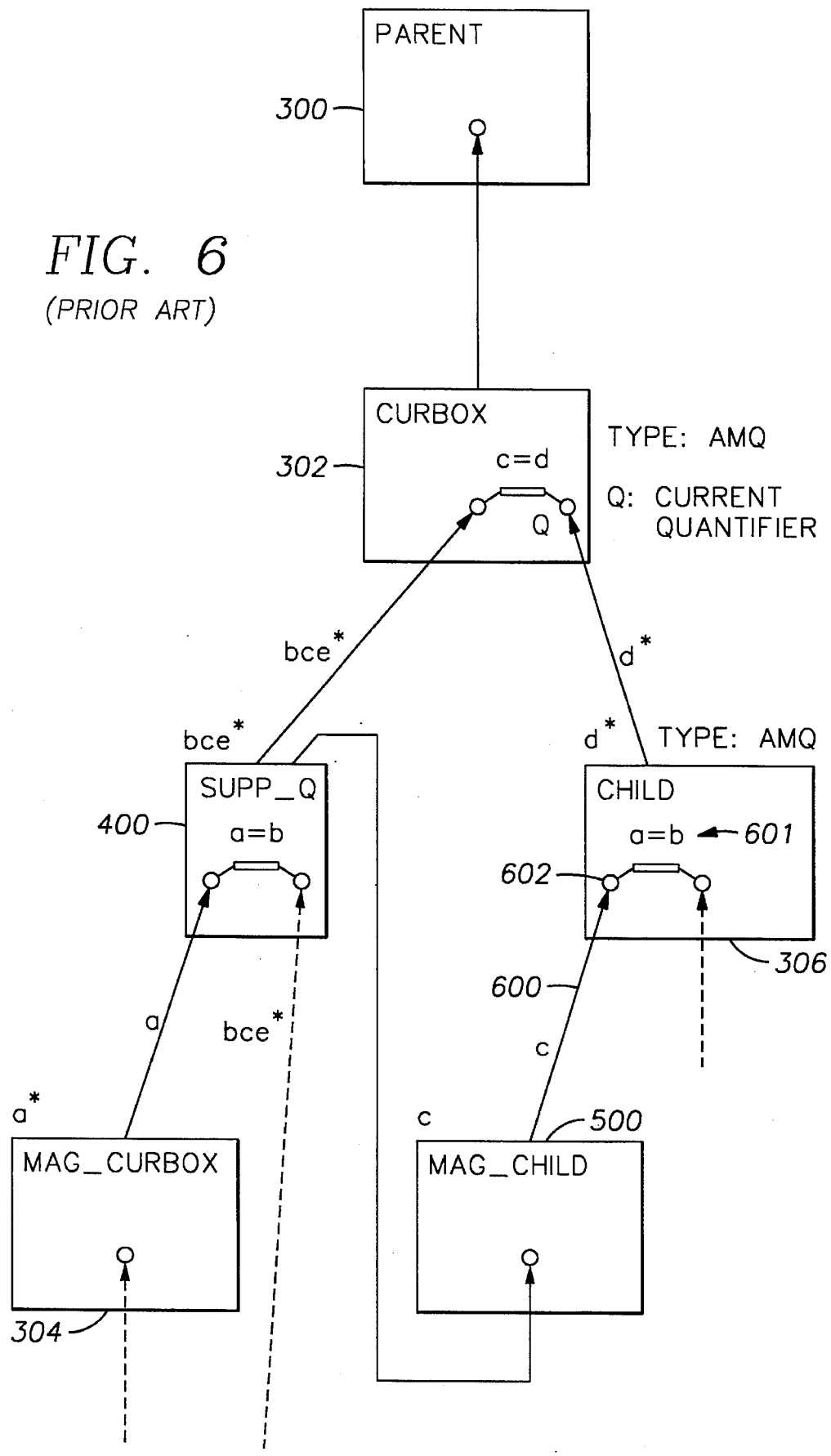
Figure 7:
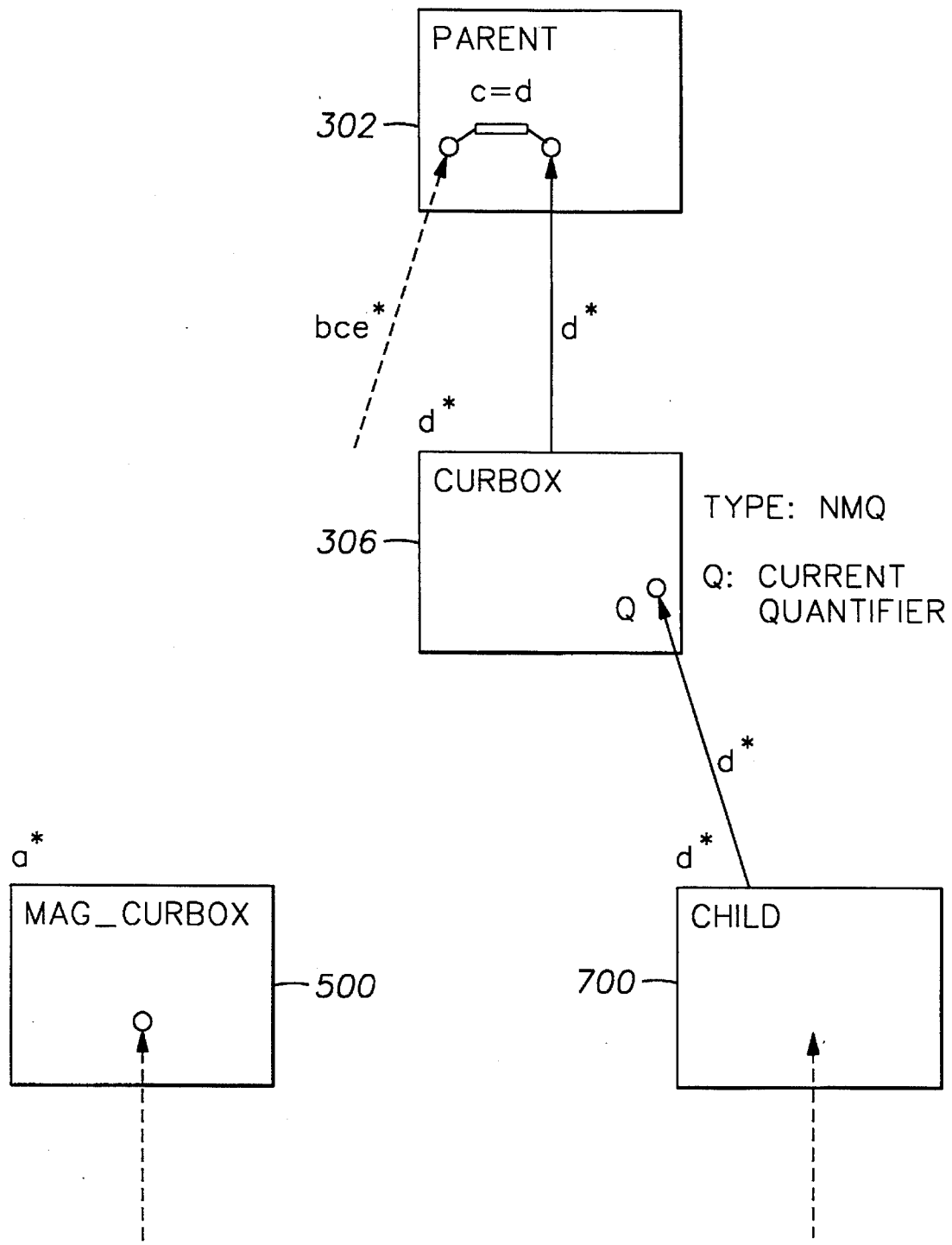
Figure 8:
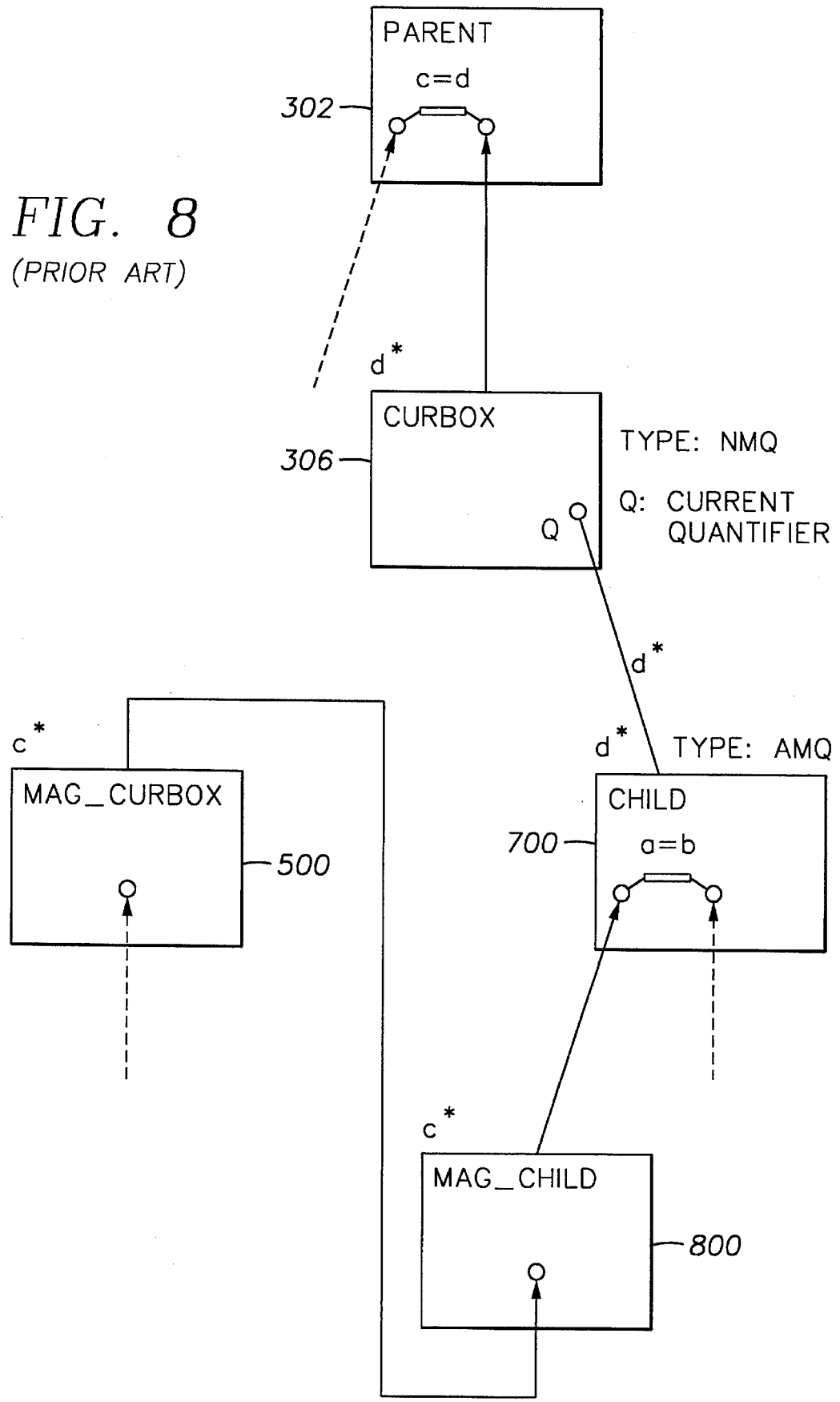

The first step shown in FIG. 16 is similar to the first step of supplementary magic rewriting in FIG. 5. However, the correlation bindings as well as the join bindings are retained in the magic set for the child. The dotted iterator arc from the child box to the magic box represents the fact that if the child were an AMQ box, then an iterator over the magic box of the child would be added to it; however this does not affect the FEED stage of the decorrelation method.

So far, the correlation predicate has not been affected. Next, a new single predicate join box called the Decorrelated Output Box ("DCO box") is introduced immediately above the child, to provide a decorrelated view of the child to the parent (see FIG. 17). The DCO box has an iterator Q1 over the magic box of the child, an iterator Q2 over the child, and natural join predicates on any common columns. The correlation predicate from the descendant is modified, so the it receives its bindings from the iterator Q 1 instead. In this manner, the subquery child and the rest of the QBR below are decorrelated as far as the curbox is concerned. This is illustrated in FIG. 17.

At this stage, however, the QBR is not consistent, because the curbox needs a correlated view of the subquery to retain the association between the correlation values and the answers from the subquery. A Correlated Input Box ("CI box") is introduced immediately above the DCO box, with correlation predicates that provide this view to the curbox. This is shown in FIG. 18. This last step is important for the query to achieve correct results, to avoid losing the correspondence enforced by the correlation predicate in the original query. It would be incorrect to introduce a join predicate in the curbox instead, because the iterator over the child box may be universal or existential involving arbitrary Boolean expressions, and may preclude the addition of any predicates to it. The FEED stage ensures that if the child can decorrelate on some columns, then the bindings for those columns are available in its magic table. At this stage, the QBR is consistent, and this maintains the incremental nature of the present invention's method.

ABSORB

When the rewrite rule is applied on the child box (which is now treated as the curbox), there is a Decorrelated Output Box ("DCO box") immediately above the curbox with an iterator over its magic box. During the ABSORB stage, the curbox needs to absorb the correlation bindings that are available in the magic box, and decorrelate on the corresponding columns. The strategy used differs depending on whether the curbox is an AMQ box or an NMQ box. This phase of transformation is shown in FIGS. 25–28 and 30–33 for the AMQ and NMQ cases, respectively. The starting point is the same as the last step of the FEED stage. For the AMQ case, in addition, the iterator from the current box to its magic box is shown.

AMQ Box

FIG. 25 illustrates the initial state when curbox is an AMQ box. The AMQ box already has an iterator over its magic box, and hence is capable of accessing all its correlation columns via that iterator. It is therefore efficient for the AMQ box to decorrelate at this stage, before beginning to provide magic sets to its children. As the first step of decorrelation, the magic iterator is modified so that the correlation bindings as well as the join bindings are accessed along it. All correlation expressions in its descendants that have the DCO box as the source of their correlations are changed, so that the source of the correlation is now the magic iterator in the curbox. This is illustrated in FIG. 26.

As the next step, the curbox actually decorrelates, so that the correlation bindings from the iterator over the magic set appear in the output of the curbox. In this case, the column "e" is added to the output. The iterator over the magic set in the DCO box is now redundant and can be removed, leaving the curbox decorrelated as in FIG. 27. Normal magic processing on curbox now begins. Importantly, the decorrelation is performed before performing any magic processing for the subqueries of the curbox. This is possible in an AMQ box because it already has an iterator over its magic box, and this greatly simplifies the method of the invention.

Figure 28:
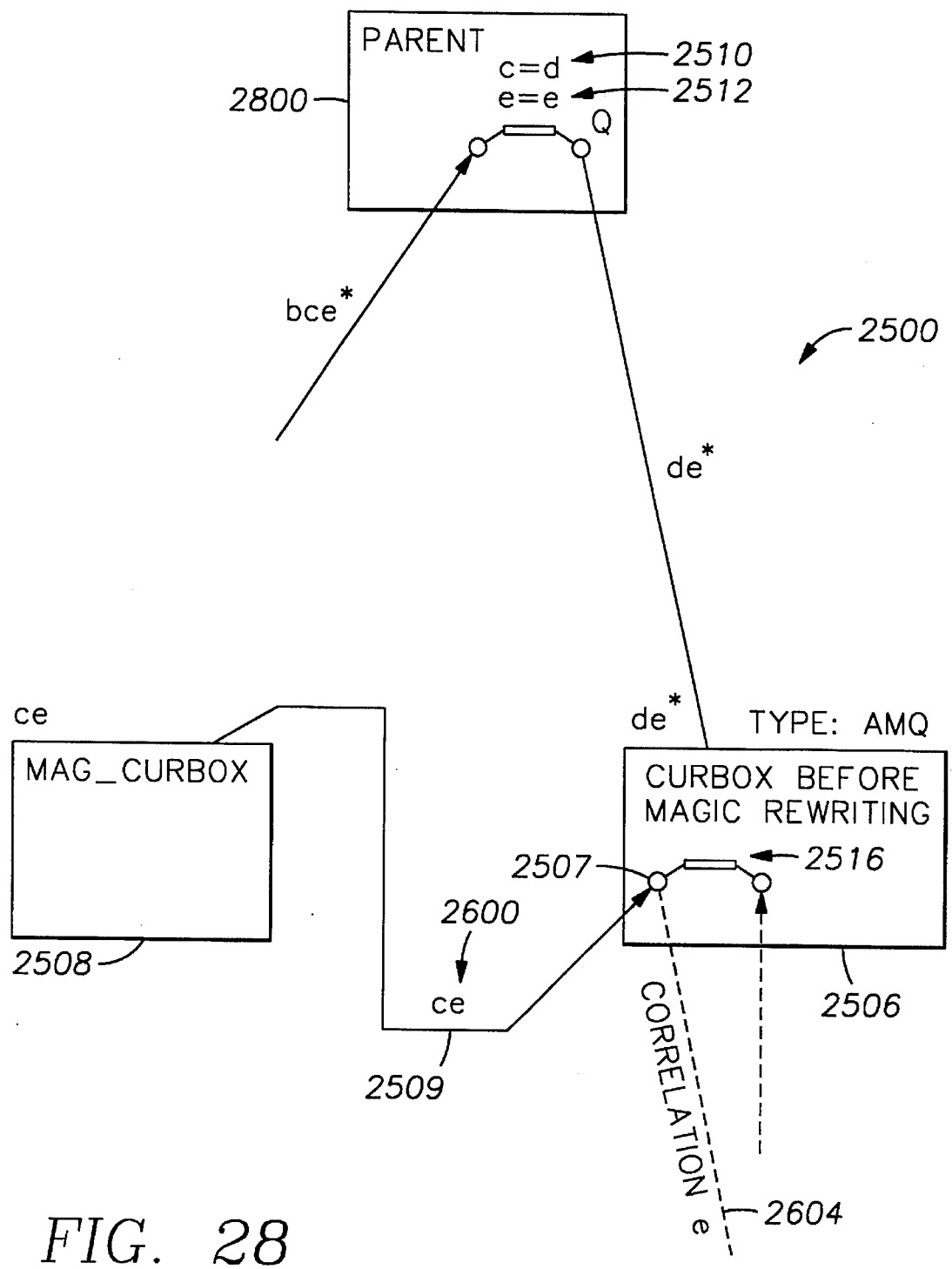

FIG. 28 shows how the query is transformed when the redundant DCO box, and possibly the CI box can be eliminated. In an illustrative embodiment of the invention, a rewrite merge rule independent of the magic decorrelation process may automatically perform merging whenever possible. Hence, the magic decorrelation method does not need to perform such merging at this point.

NMQ Box

Figure 31:
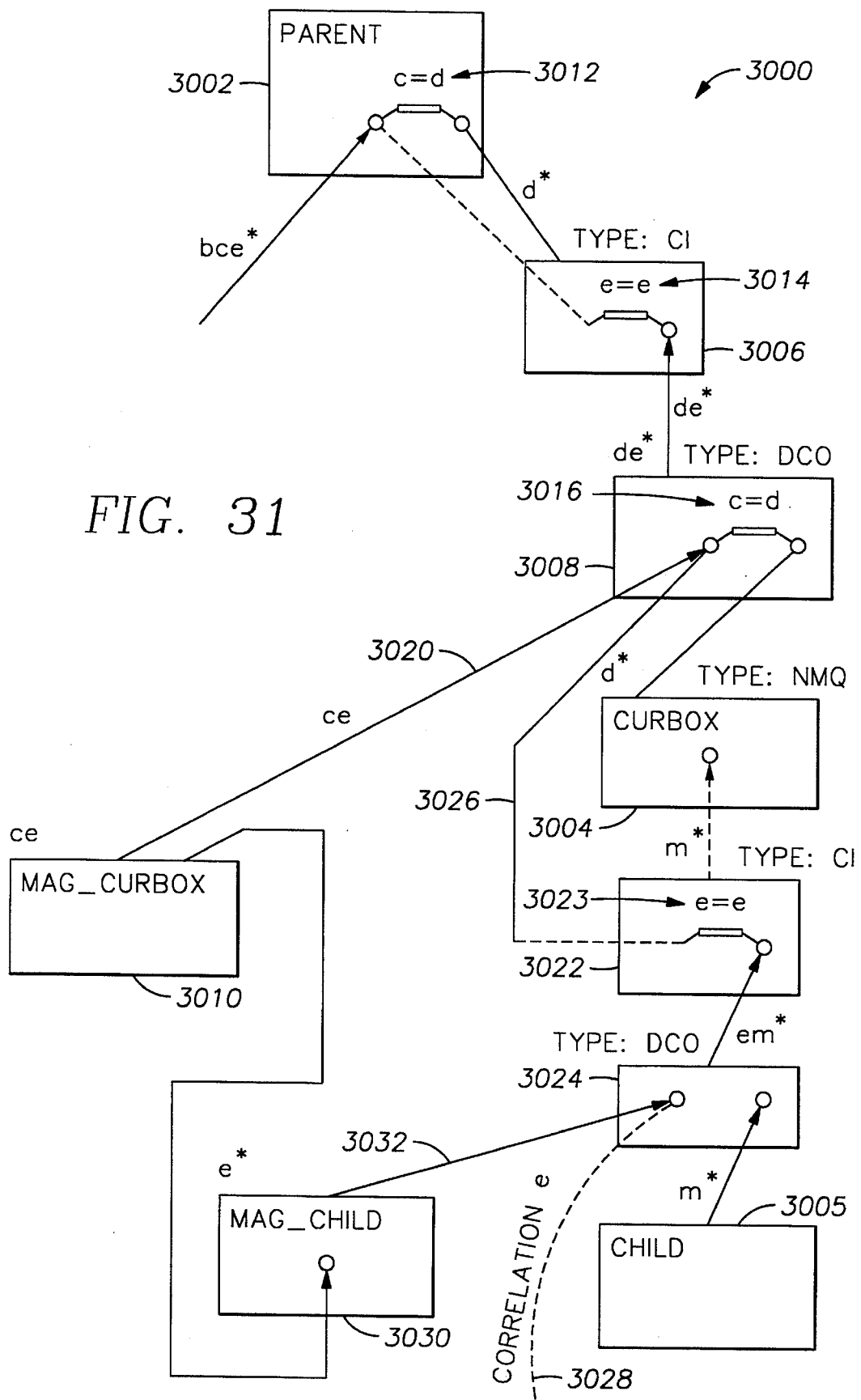

If the curbox is an NMQ box, decorrelation is more complicated, since it does not have an iterator over its magic box. As a result, it does not have a handle on the correlation bindings. The only way it can get these bindings is if they are available from its children. The decorrelation of an NMQ box is performed after magic processing. The FIG. 30 shows the initial state of the QBR. The FEED stage of the magic processing of the NMQ box results in the introduction of a CI box and a DCO box beneath it, as shown in FIG. 31, if the child box can decorrelate on the desired columns. If not, the curbox nonetheless has to receive the decorrelation bindings along its iterators, to be able to decorrelate. This is accomplished by introducing a Decorrelated Input Box ("DCI box") instead of a DCO box. This uses the magic box of the curbox to provide the bindings desired. However, this DCI box will not be eliminated while subsequently processing the child box. This variation is illustrated in FIG. 32. Although introducing the DCI box adds to the cost of executing the query, the gain from removing correlations will amply compensate for the extra overhead. Once all the children of the curbox have been processed, the curbox is able to decorrelate because it can now access the correlation bindings along its iterators. FIG. 33 shows the final stage after the decorrelation of the curbox.

Further Details

Additional description is now provided to illustrate how correlation information is collected, and how various special cases are handled so that the method works correctly on arbitrary queries.

Computing Correlation Information

At various stages of the magic decorrelation method, different properties of boxes are used. Each box encapsulator must provide the following correlation information:

1. a list of its ancestors;
2. a list of its descendants and the number of paths to each of them;
3. which of its ancestors it is correlated with; and
4. which descendant box caused each correlation.

A box encapsulator must also determine if the associated box is capable of decorrelating, and what decorrelation mechanism is applicable. This decision depends upon which columns are already output from the box, and whether the addition of correlation columns to it will change the output of the query. This depends primarily on the semantics of the box, and on how the outputs of the box are used. If the outputs of a group by box with a count aggregate are used in a predicate "=0", naive decorrelation may lead to the count bug, and therefore, decorrelation requires the introduction of an outer-join.

However, if the predicate were "=1", then naive decorrelation is sufficient. As part of preprocessing, a box is provided the information about the usage of its outputs. Other factors influencing the decorrelation decision include the presence of existential or universal iterators, the ability of the system to index temporary relations, and the cost of possibly introducing additional joins. The decision is therefore encapsulated as part of the behavior of each box so that the magic decorrelation method itself remains unchanged.

Remote Correlations

The decorrelation described above illustrates the condition where a subquery box agrees to decorrelate. However, if the box refuses to decorrelate, then the correlations will persist. If these correlations resulted from direct correlations from the subquery box itself, then the children of the subquery box are not affected by its refusal to decorrelate. However, if the descendants of the box actually contain the correlation predicates, then these descendants now have remote correlations. This implies that when the magic decorrelation method is applied to them, the source of their correlations is not the immediate parent box.

As a concrete example, reference is made to FIGS. 20–23. FIG. 20 shows the initial state of the QBR. The child box has a remote correlation to the parent box of the curbox. The curbox is being processed, and creates a magic box for the child, as shown in FIG. 21. However, the child box is capable of decorrelating on the correlation column "e". Therefore, the source of correlation is added to the FROM clause of the magic box of the child, as illustrated in FIG. 22. Natural join predicates are introduced over the common columns in the two iterators. Now that the correlation columns are available in the magic box, the FEED stage can proceed as before, producing the Decorrelated Output DCO and Correlated Input CI boxes for the child, as shown in FIG. 23. This extension of the method is based on the heuristic principle that decorrelation is advantageous to perform whenever possible.

Variants and Tradeoffs

The present invention additionally contemplates a number of alternative design strategies. In the embodiments discussed above, the decorrelation of an NMQ box is occurs after the magic processing of the box. However, as an alternative, the decorrelation may be performed before doing the magic processing, as for an AMQ box. To do this, an additional Decorrelated Input Box ("DCI box") must be introduced along every child iterator, to join the output of the child with the magic set of the NMQ box. The correlation columns are appended to the output of the DCI box. This allows the NMQ box to decorrelate and leads to a simpler method. This approach may be advantageous for some applications, but when the NMQ box is not directly correlated, it may generate unnecessary DCI boxes that cannot be easily eliminated.

Another alternative design strategy concerns the possibility of lowering the height of all correlations by inserting new CI, DCO, and DCI boxes above and possibly below a box that either does not accept magic iterators, or is unable to decorrelate. However, every time a new DCI or DCO box is introduced with a join in it, there is the additional overhead of executing that join. A CI box may not merge with its parent, and as a result it stays correlated. Execution of such a correlated box may create inefficiency. Further overheads arise from the possibility of the generation of many common subexpressions. This inhibits the merging of boxes, and usually forces the materialization of the subexpression.

This strategy is typically desirable in distributed databases, where execution of operations related by correlations on multiple sites results in poor performance. Therefore, it is important to keep all correlations as localized as possible. For the non-distributed case, or for the distributed case where a portion of a query is executed locally in a node, the associated overheads may not be advantageous. Our method can implement either strategy because the decorrelation decision is made by the box encapsulators outside of the magic decorrelation method.

Another design strategy recognizes that a box that is not directly correlated can agree to decorrelate only if its correlated children will decorrelate too. This strategy ensures that a correlation in the original query will either be completely decorrelated, or will remain untouched in the transformed query. To implement this strategy under the magic decorrelation method of the invention, the box encapsulator must use this guideline when determining if it can decorrelate. This policy does not seek to perform decorrelation wherever possible. Rather, it seeks to minimize the extra operators added. There is a basic trade-off between the previous strategy of lowering the height of correlation, and this policy of minimizing the new operators introduced. The preferred embodiment of the present invention represents a compromise between the two.

In accordance with the present invention, a sample model of the magic decorrelation transformation system of the invention was constructed and tested. Specifically, an illustrative embodiment of the method of the invention was implemented in a 120 megabyte TPC-D database system. This database is described further in Raab, TPC-D Draft 8.2 In Preparation, Information Paradigm, July 1994, which is incorporated herein by reference in its entirety.

The benchmark database schema for the performance experiments under discussion is shown in Table 8 (above), along with the number of tuples in each table. Tables customers, pans and suppliers have their usual meaning. The "partsupp" stores the information on which supplier supplies what pans, and at what cost. Table "lineitem" stores the information on which pans are ordered, and supplied by which supplier. Primary keys are shown in Tables 8 in bold font, and for clarity of illustration, un-used columns are not shown in the schema. The results of the transformation are presented for three sample queries. The first two queries are directly from the TPC-D benchmark quite. The third query demonstrates the decorrelation of a non-linear query with duplicates in the correlation column. The results are summarized in Table 9.

In most queries, it is possible to simplify the result of the magic decorrelation method by applying other query rewrite rules, usually those that merge single predicate join blocks. In generating the performance numbers of Tables 8–9, all such query transformations were permitted to be performed; in other words, optimal versions of the query were compared, with and without the magic decorrelation method.

Query #1

Query # 1 is shown below in Table 10. This is a "small-quantity-order revenue" query which asks for the average yearly loss in revenue if for each part, all orders with a quantity of less than 20% of the average ordered quantity were discarded.

TABLE 8

Performance Results

| Name: Tuples (1000) | Schema |
|---|---|
| customers : 15 | (c_custkey, c_nation, c_region, c_acctbal, c_mktsegment) |
| parts : 20 | (p_partkey, p_brand, p_type, p_size, p_container) |
| supplier : 1 | (s_suppkey, s_name, s_address, s_nation, s_region, s_phone, s_acctbal, s_comment) |
| partsupp : 80 | (ps_partkey, ps_suppkey, ps_supplycost) |
| lineitem : 600 | (l_orderkey, l_partkey, l_suppkey, l_quantity, l_extendedprice) |

TABLE 9

| Query # | Correlated Query | Magic Decorrelation |
|---|---|---|
| 1 | 7.9 | 1.0 |
| 2 | 1.1 | 1.0 |
| 3 | 15.3 | 1.0 |

TABLE 10

SELECT sum(1_extendedprice*1_quantity)/5
FROM LINEITEM, PARTS p
WHERE p_partkey = 1_partkey AND p_brand = 'Brand #23' AND
p_container = '6 PACK' AND
   1_quantity < (SELECT 0.2*avg(i.1_quantity)
     FROM LINEITEM i
     WHERE i.1_partkey = p.p_partkey)

After the magic decorrelation and subsequent transformation, the query appears as shown in Table 11, below:

TABLE 11

CREATE VIEW SUBQUERY1(partkey, avgqty) as
  (SELECT p.p_partkey, 0.2*AVG(i.1_quantity)
  FROM LINEITEM i, PARTS p
  WHERE i.1_partkey = p.p_partkey AND p_brand = 'Brand #23' AND p_container = '6
    PACK'
  GROUP BY p.p_partkey);
SELECT SUM(1_extendedprice*_quantity)/5
FROM LINEITEM, SUBQUERY1 q
WHERE q.partkey = 1_partkey AND 1_quantity < q.avgqty Table 9 shows that the present invention achieves a substantial improvement in elapsed time. The occurs because, in the correlated version of the query there are approximately 300 different invocations of the subquery, each with a different value of the correlation column p_partkey. Since the table in the subquery is extremely large, the repeated subquery invocation results in significant overhead. The decorrelated version invokes the subquery just once, and therefore is more efficient.

Query #2

Query #2 is illustrated below in Table 12. This is a "minimum cost supplier" query which lists those suppliers that offer the desired type and size of parts in a particular nation at the minimum cost.

TABLE 12

SELECT s.s_name, s.s_acctbal, s.s_address, s.s_phone, s.s_comment
FROM PARTS p, SUPPLIERS s, PARTSUPP ps
WHERE p_partkey = ps_partkey AND s_suppkey = ps_suppkey AND
  s_nation = 'FRANCE' AND p_SIZE = 15 AND p_size type =
    'BRASS' AND
  ps_supplycost = (SELECT MIN(ps1.ps_supplycost)
    FROM PARTSUPP ps1, SUPPLIERS s1
    WHERE p.p_partkey = ps1.ps_partkey AND
    s1.s_suppkey = ps1.ps_suppkey
    AND s1.s_nation = s.s_nation;

The transformed query appears in Table 13, below:

TABLE 13

CREATE VIEW SUBQUERY6(p_partkey, mincost) AS
  (SELECT p.p_partkey, MIN(p_supplycost)
  FROM PARTS p, PARTSUPP ps1, SUPPLIERS s1
  WHERE p.p_partkey = ps1.ps_partkey AND
    s1.s_suppkey = ps1.p_suppkey AND p.p_size = 15 AND
    s1.s_nation = 'FRANCE' AND p.p_type = 'BRASS'
  GROUP BY p.p_partkey);

TABLE 13-continued

```
SELECT s.s_name, s.s_acctbal, s.s_address, s.s_phone, s.s_comment
FROM SUPPLIERS s, PARTSUPP ps, SUBQUERY6 q
WHERE q.p_partkey = ps.ps_partkey AND s.s_suppkey = ps.p_suppkey AND
   ps.p_supplycost = q.mincost;
```

The s_nation field does not correspond to a correlation column for the magic decorrelation method, since other rewrite rules are able to determine that the predicate "=FRANCE" can be pushed into the subquery, and this action is performed before the decorrelation.

As Table 9 indicates, the transformation did not benefit or damage the query significantly. One of the reasons is that the correlated version of the query involves only about 50 separate invocations of the subquery (i.e. only about 50 tuples of the PARTS table had type BRASS and size 15). There are no duplicates in the correlation values (since the correlation column is a key of the PARTS table) and all the tables in the subquery are accessed via indices. Therefore, fragmented execution of the subquery does not result-in much redundancy and overhead.

Query #3

Query #3 appears in Table 14, below, This is a "market segment customer" query which lists the European suppliers and the sum of account balances of those customers who belong to two specific market segments and are in the same country as the supplier. To avoid returning many tuples as the answer set, the number of tuples in the answer are counted instead.

The transformation results in more than a an order of magnitude improvement in performance, as shown in Table 9. The drastic improvement is because, first of all, a large number of duplicates are removed (200 values reduced to 5) in the magic table MAGIC8A. Additionally, after the rewrite, the union operator is executed only once. In the correlated version, the work performed in each subquery invocation is relatively small, involving a couple of indexed table accesses followed by a union. However, if the subquery involved a larger amount of work, the effects of the duplicate elimination would be even more significant.

While there have been shown what are presently considered to be preferred embodiments of the invention, it will be apparent to those skilled in the art that various changes and modifications can be made herein without departing from the scope of the invention as defined by the appended claims.

What is claimed is:

1. A method of optimizing an SQL query that includes at least one subquery, wherein said query is executable by a computer to retrieve data from a relational database stored in electronic storage coupled to the computer, the method comprising the steps of:

representing the query in storage as a query box representation comprising a hierarchical assembly of mul-

TABLE 14

```
SELECT COUNT(*)
FROM SUPPLIERS s, DT(sumbal) AS
   (SELECT SUM(bal)
   FROM DDT(bal) AS
      ((SELECT a.c_acctbal
       FROM CUSTOMERS a
       WHERE a.c_mktsegment = 'BUILDING' AND a.c_nation = s.s_nation)
      UNION
       (SELECT b.c_acctbal
       FROM CUSTOMERS b
       WHERE b.c_mktsegment = 'HOUSEHOLD' AND b.c_nation = s.s_nation)))
WHERE s.s_region = 'EUROPE';
```

This is a correlated union query (non-linear) where the correlation column is not a key. The rewritten query is shown in Table 15, below:

tiple data structures corresponding to the at least one subquery, each data structure being referred to as a "box";

TABLE 15

```
CREATE VIEW MAGIC8A(nation) AS
   (SELECT DISTINCT s_nation
   FROM SUPPLIERS
   WHERE s_region = 'EUROPE');
CREATE VIEW MAGIC8C(nation, sumbal) AS
   (SELECT nation, sum(bal)
   FROM MAGIC8B(nation, bal) AS
      ((SELECT m1.nation, a.c_acctbal
       FROM CUSTOMERS a, MAGIC8A m1
       WHERE a.c_mktsegment = 'BUILDING' AND b.c_nation = m2.nation))
   GROUP BY nation);
SELECT COUNT(8)
FROM SUPPLIERS, MAGIC8C dt
WHERE s_nation = dt.nation AND s_region = 'EUROPE';
``` examining each box individually, the box under examination being referred to as the current box, to determine whether the current box has any correlated descendant box that receives correlation bindings from an original source comprising the current box or an ancestor box of the current box; and determining whether the correlated descendant box can be decorrelated, and if so creating an optimized query by applying a magic decorrelation process to create a different source for the correlation bindings and substitute the different source for the original source, said different source being hierarchically inferior to the current box.

2. The method of claim 1, wherein the query box representation includes a child box of the current box, the child box itself having at least one child referred to as at least one grandchild box, wherein the magic decorrelation process comprises the steps of:

performing a feed process to provide the different source for the correlation bindings;

determining whether the child box is AMQ or NMQ type; and decorrelating the correlated descendant box by performing steps comprising:

if the child box is AMQ type, performing an AMQ absorb process to decorrelate the correlated descendant box using the correlation bindings obtained from the different source, and then performing the feed process to the at least one grandchild box; and if the child box is NMQ type, performing the feed process to the at least one grandchild box to provide the different source of the correlation bindings, and then performing an NMQ absorb process to decorrelate the correlated descendant box using correlation bindings from the different source.

3. The method of claim 2, wherein the feed process comprises the steps of:

determining whether the correlated descendant box is locally or remotely correlated;

if the correlated descendant box is remotely correlated, performing a remote feed process; and if the descendant is locally correlated, performing a local feed process.

4. The method of claim 2, wherein the feed process comprises the steps of:

providing a decorrelated view of the correlated descendant box to the current box, said decorrelated view including a decorrelation output box interposed between the current box and the child box, said decorrelation output box including a quantifier carrying the correlation bindings, said decorrelated view also including a correlation input box to partition bindings provided by the decorrelation output box to the current box; and modifying the correlated descendant box to receive correlation bindings from the quantifier instead of the original source.

5. The method of claim 3, wherein the correlated descendant box receives the correlation bindings from an ancestor box that receives correlation bindings from a supplementary ancestor box, and the remote feed process comprises the steps of:

applying supplementary magic to the current box to create a supplementary magic box and a magic child box;

routing output including the correlation bindings from the supplementary ancestor box to the magic child box by creating a quantifier in the magic child box ranging over the supplementary ancestor box;

in the magic child box, creating natural join predicates over common columns between the supplementary ancestor box and the supplementary magic box;

creating a decorrelation output box between the child box and the current box to provide a decorrelated view of the correlated descendant box to the current box;

directing the correlation bindings from the magic child box to the decorrelation output box by creating a quantifier in the decorrelation output box ranging over the magic child box;

creating natural join predicates in the decorrelation output box ranging over common columns between the magic child box and the child box;

providing an output of the correlation bindings at the decorrelation output box and substituting the decorrelation output box instead of the original source as the source of the correlated descendant box's correlation bindings; and creating a correlation input box with a correlation predicate between the original source and the correlation bindings supplied by the decorrelation output box.

6. The method of claim 3, wherein the correlated descendant box receives the correlation bindings from the current box, and the local feed process comprises steps of:

applying supplementary magic to the current box to create a supplementary magic box and a magic child box;

routing the correlation bindings from the supplementary magic box to the magic child box;

creating a decorrelation output box between the child box and the current box to provide a decorrelated view of the correlated descendant box to the current box;

directing the correlation bindings from the magic child box to the decorrelation output box by creating a quantifier in the decorrelation output box ranging over the magic child box;

creating natural join predicates in the decorrelation output box ranging over common columns between the magic child box and the child box;

providing an output of the correlation bindings at the decorrelation output box and substituting the decorrelation output box, instead of the original source, as the source of the correlated descendant box's correlation bindings; and creating a correlation input box with a correlation predicate between the original source and the correlation bindings supplied by the decorrelation output box.

7. The method of claim 2, wherein the child box has a parent box that comprises a decorrelation output box, said decorrelation output box having a parent box that comprises a correlation input box, said decorrelation output box including a first quantifier ranging over a magic child box associated with the child box, wherein the magic child box comprises a source of the correlation bindings, and wherein the AMQ absorb process comprises the steps of:

routing the correlation bindings from the magic child box to the child box and creating an output column in the child box to provide an output of the correlation bindings;

substituting the first quantifier in place of the decorrelation output box as the source of the correlated descendant box's correlation bindings; and deleting natural join predicates from the decorrelation output box and the first quantifier.

8. The method of claim 7, further comprising the steps of:

removing the decorrelation output box.

9. The method of claim 7, further comprising the steps of:

determining whether the correlation input box and the current box can be merged, and if so, performing said merging.

10. The method of claim 2, wherein the child box has a parent box that comprises a first decorrelation output box, said first decorrelation output box having a parent that comprises a first correlation input box, said first decorrelation output box including a first quantifier ranging over a magic child box associated with the child box, said first decorrelation output box also including a first natural join predicate, wherein the magic box comprises a source of the correlation bindings, and wherein the NMQ absorb process comprises the steps of:

identifying each child box of the child box, referred to as a grandchild box;

determining whether any of identified correlated grandchild boxes can be decorrelated;

performing a feed process to each grandchild box by performing steps comprising:

providing a decorrelated view of the grandchild box to the child .box, said decorrelated view including:

a decorrelation box interposed between the child box and the grandchild box, wherein said decorrelation box comprises a second decorrelation output box if the grandchild box can be decorrelated, or a decorrelation input box if the grandchild box cannot be decorrelated, wherein said decorrelation box includes a second quantifier ranging over a magic box associated with the grandchild box to carry the correlation bindings;

said decorrelated view also including a second correlation input box to partition bindings provided by the decorrelation box to the current box, said second correlation input box including a second correlation predicate whose correlation source is the decorrelation box; and modifying the correlated descendant box to receive the correlation bindings from the second quantifier instead of the original source;

eliminating the natural join predicate of the first decorrelation output box;

eliminating the second correlation predicate;

providing an output of the correlation bindings in the second correlation input box by adding an extra column in the second correlation input box; and providing an output of the correlation bindings in the child box by adding at least one additional column in the child box.

11. The method of claim 10, further comprising eliminating the first decorrelation output box.

12. The method of claim 11, further comprising:

determining whether the second correlation input box and any other box can be merged, and if so, performing said merging.

13. The method of claim 1, wherein the SQL query is initially received interactively from a user.

14. The method of claim 1, wherein the SQL query is initially received in the form of commands embedded in a non-SQL host language.

15. The method of claim 1, further comprising steps of executing the optimized query upon the relational database.

16. For use with a database query processing system in processing a query having a subquery therein, wherein a correlation value from the query outside the subquery is used in a computation of the subquery, thereby providing a correlation between the query and the subquery in terms of a correlation binding including the correlation value, a method for decorrelating the database query from the subquery by performing steps comprising:

determining whether decorrelation of the subquery from the query is possible, and if so, proceeding with steps comprising:

identifying join bindings of the subquery and routing the identified join bindings to the subquery; and obtaining a set of correlation bindings for decorrelating the subquery, by generating a magic set for the subquery wherein the magic set includes both the join bindings and the obtained set of correlation bindings; and decorrelating the subquery using the obtained correlation bindings.

17. A query optimizer for use in a computer that includes a storage device to store a relational database, a digital processing apparatus to manage the relational database, and a fast-access memory, wherein the query optimizer is operable to receive a complex SQL query executable upon the relational database and to optimize said received SQL query, said received SQL query including at least one subquery, wherein said optimizer comprises:

first means for representing the query in the fast-access memory as a query box representation comprising a hierarchical assembly of multiple data structures corresponding to the at least one subquery, each said data structure being referred to as a "box";

second means for individually examining each box, the box under examination being referred to as the current box, to identify any box that receives bindings from a correlated descendant box of the current box, wherein said correlated descendant box receives correlation bindings from an original source comprising the current box or an ancestor of the current box; and third means for determining whether the correlated descendant box can be decorrelated, and if so, creating an optimized query by applying a magic decorrelation process to create a different source for the correlation bindings and substitute the different source for the original source, said different source being hierarchically inferior to the current box.

18. A query optimizer for use in a computer that includes a storage device to store a relational database, a digital processing apparatus to manage the relational database, a query optimizer to receive a complex SQL query intended for the relational database and optimize said SQL queries, said SQL queries being represented in fast-access memory of said digital processing apparatus as a query box representation comprising a hierarchical assembly of multiple data structures corresponding to at least one subquery of the complex SQL query, said data structures being referred to as "boxes", said query optimizer comprising:

second means for individually examining each box, the box under examination being referred to as the current box, to identify any box that receives bindings from a correlated descendant box of the current box, wherein said correlated descendant box receives correlation bindings from an original source comprising the current box or an ancestor of the current box; and third means for determining whether the correlated descendant box can be decorrelated, and if so, creating an optimized query by applying a magic decorrelation process to create a different source for the correlation bindings and substitute the different source for the original source, said different source being hierarchically inferior to the current box.

19. A query optimizer for use in a computer that includes a storage device to store a relational database, a digital processing apparatus to manage the relational database, and a fast-access memory, wherein the query optimizer is operable to receive a complex SQL query executable upon the relational database and to optimize said received SQL query, said query including a subquery, wherein a correlation value from the query outside the subquery is used in a computation of the subquery, thereby providing a correlation between the query and the subquery in terms of a correlation binding including the correlation value, said query optimizer comprising:

means for determining whether decorrelation of the subquery from the query is possible; means for identifying join bindings of the subquery and routing the identified join bindings to the subquery; and means for obtaining a set of correlation bindings for decorrelating the subquery, by generating a magic set for the subquery wherein the magic set includes both the join bindings and the obtained set of correlation bindings; and means for decorrelating the subquery using the obtained correlation bindings.

20. A digital processing apparatus programmed to perform method steps for optimizing an SQL query structured to retrieve data from a relational database stored in an electronic storage device coupled accessible by the digital processing apparatus, wherein said SQL query is represented by a query box representation comprising a hierarchical assembly of multiple data structures corresponding to at least one subquery of the SQL query, said data structures being referred to as "boxes", said method steps comprising:

representing the query in storage as a query box representation comprising a hierarchical assembly of multiple data structures corresponding to the at least one subquery, each data structure being referred to as a "box";

examining each box individually, the box under examination being referred to as the current box, to determine whether the current box receives bindings from a correlated descendant box of the current box, wherein said correlated descendant box receives correlation bindings from an original source comprising the current box or an ancestor box of the current box; and determining whether the correlated descendant box can be decorrelated, and if so creating an optimized query by applying a magic decorrelation process to create a different source for the correlation bindings and substitute the different source for the original source, said different source being hierarchically lower than the current box.

21. The apparatus of claim 20, wherein the digital processing apparatus is further programmed to construct the query box representation representing the SQL query.

22. A digital processing apparatus programmed to perform method steps for optimizing an SQL query structured to retrieve data from a relational database stored in an electronic storage device coupled accessible by the digital processing apparatus, wherein a correlation value from the query outside the subquery is used in a computation of the subquery, thereby providing a correlation between the query and the subquery in terms of a correlation binding including the correlation value, said method steps comprising:

determining whether decorrelation of the subquery from the query is possible, and if so, proceeding with steps comprising:

identifying join bindings of the subquery and routing the identified join bindings to the subquery; and obtaining a set of correlation bindings for decorrelating the subquery, by generating a magic set for the subquery wherein the magic set includes both the join bindings and the obtained set of correlation bindings; and decorrelating the subquery using the obtained correlation bindings.

23. A program storage device readable by a digital processing apparatus and tangibly embodying a program of instructions executable by the digital processing apparatus to perform method steps for optimizing an SQL query that includes at least one subquery, said method steps comprising:

representing the query in storage as a query box representation comprising a hierarchical assembly of multiple data structures corresponding to the at least one subquery, each data structure being referred to as a "box";

examining each box individually, the box under examination being referred to as the current box, to determine whether the current box receives bindings from a correlated descendant box of the current box, wherein said correlated descendant box receives correlation bindings from an original source comprising the current box or an ancestor box of the current box; and determining whether the correlated descendant box can be decorrelated, and if so creating an optimized query by applying a magic decorrelation process to create a different source for the correlation bindings and substitute the different source for the original source, said different source being hierarchically lower than the current box.

24. A program storage device readable by a digital processing apparatus and tangibly embodying a program of instructions executable by the digital processing apparatus to perform method steps for optimizing an SQL query, wherein said SQL query is represented in fast-access memory of the digital processing apparatus as a query box representation comprising a hierarchical assembly of multiple data structures corresponding to subqueries of the complex SQL query, said data structures being referred to as 37 boxes", said method steps comprising:

examining each box individually, the box under examination being referred. to as the current box, to determine whether the current box receives bindings from a correlated descendant box of the current box, wherein said correlated descendant box receives correlation bindings from an original source comprising the current box or an ancestor box of the current box; and determining whether the correlated descendant box can be decorrelated, and if so creating an optimized query by applying a magic decorrelation process to create a different source for the correlation bindings and substitute the different source for the original source, said different source being hierarchically lower than the current box.

25. The device of claim 24, wherein the current box includes a child box and the magic decorrelation process comprises the steps of:

performing a feed process to provide the different source for the correlation bindings;

determining whether the child box is AMQ or NMQ type; and decorrelating the correlated descendant box by performing steps comprising:

if the child box is AMQ type, performing an AMQ absorb process to decorrelate the correlated descendant box using the correlation bindings obtained from the different source, and then performing the feed process to children of the child box; and if the child box is NMQ type, performing the feed process to children of the child box to provide the different source of the correlation bindings, and then performing an NMQ absorb process to decorrelate the correlated descendant box using correlation bindings from the different source.

26. The device of claim 25, wherein the feed process comprises the steps of:

determining whether the correlated descendant box is locally or remotely correlated;

if the correlated descendant box is remotely correlated, performing a remote feed process; and if the descendant is locally correlated, performing a local feed process.

27. The device of claim 25, wherein the feed process comprises the steps of:

providing a decorrelated view of the correlated descendant box to the current box, said decorrelated view including a decorrelation output box interposed between the current box and the child box, said decorrelation output box including a quantifier ranging over the correlation bindings, said decorrelated view also including a correlation input box to partition bindings provided by the decorrelation output box to the current box; and modifying the correlated descendant box to receive correlation bindings from the quantifier instead of the original source.

28. The device of claim 26, wherein the correlated descendant box receives the correlation bindings from an ancestor box that receives correlation bindings from a supplementary ancestor box, and the remote feed process comprises the steps of:

applying supplementary magic to the current box to create a supplementary magic box and a magic child box;

routing the correlation bindings from the supplementary ancestor box to the magic child box by creating a quantifier in the magic child box ranging over the supplementary ancestor box;

in the magic child box, creating natural join predicates over common columns between the supplementary ancestor box and the supplementary magic box; creating a decorrelation output box between the child box and the current box to provide a decorrelated view of the correlated descendant box to the current box;

directing the correlation bindings from the magic child box to the decorrelation output box by creating a quantifier in the decorrelation output box ranging over the magic child box;

creating natural join predicates in the decorrelation output box ranging over common columns between the magic child box and the child box;

providing an output of the correlation bindings at the decorrelation output box and substituting the decorrelation output box instead of the original source as the source of the correlated descendant box's correlation bindings; and creating a correlation input box with a correlation predicate between the original source and the correlation bindings supplied by the decorrelation output box.

29. The device of claim 26, wherein the correlated descendant box receives the correlation bindings from the current box, and the local feed process comprises steps of:

applying supplementary magic to the current box to create a supplementary magic box and a magic child box;

routing the correlation bindings from the supplementary magic box to the magic child box;

creating a decorrelation output box between the child box and the current box to provide a decorrelated view of the correlated descendant box to the current box;

directing the correlation bindings from the magic child box to the decorrelation output box by creating a quantifier in the decorrelation output box ranging over the magic child box;

creating natural join predicates in the decorrelation output box ranging over common columns between the magic child box and the child box;

providing an output of the correlation bindings at the decorrelation output box and substituting the decorrelation output box, instead of the original source, as the source of the correlated descendant box's correlation bindings; and creating a correlation input box with a correlation predicate between the original source and the correlation bindings supplied by the decorrelation output box.

30. The device of claim 25, wherein the child box has a parent box that comprises a decorrelation output box, said decorrelation output box having a parent that comprises a correlation input box, said decorrelation output box including a first quantifier ranging over a magic child box associated with the child box, wherein the magic child box comprises a source of the correlation bindings, and wherein the AMQ absorb process comprises the steps of:

routing the correlation bindings from the magic child box to the child box and creating an output column in the child box to provide an output of the correlation bindings;

substituting the first quantifier in place of the decorrelation output box as the source of the correlated descendant box's correlation bindings; and deleting natural join predicates from the decorrelation output box and the first quantifier.

31. The device of claim 30, wherein the method steps further comprise the steps of: removing the decorrelation output box.

32. The device of claim 30, wherein the method steps further comprise the steps of: merging the correlated output box and the current box.

33. The device of claim 25, wherein the child box has a parent box that comprises a first decorrelation output box, said decorrelation output box having a parent that comprises a first correlation input box, said decorrelation output box including a first quantifier ranging over a magic child box associated with the child box, wherein the magic box comprises a source of the correlation bindings, and wherein the NMQ absorb process comprises the steps of:

identifying each correlated grandchild box of the current box;

determining whether any of identified correlated grandchild boxes can be decorrelated;

performing a feed process to each grandchild box by performing steps comprising:
  providing a decorrelated view of the grandchild box to the child box, said decorrelated view including:
    a decorrelation box interposed between the child box and the grandchild box, wherein said decorrelation box comprises a second decorrelation output box if the grandchild box can be decorrelated, or a decorrelation input box if the grandchild box cannot be decorrelated, wherein said decorrelation box includes a second quantifier ranging over a magic box associated with the grandchild box to carry the correlation bindings;
    said decorrelated view also including a correlation input box to partition bindings provided by the decorrelation box to the current box, said correlation input box including a second correlation predicate whose correlation source is the decorrelation box; and
  modifying the correlated descendant box to receive the correlation bindings from the second quantifier instead of the original source;
eliminating the first correlation predicate;
eliminating the second correlation predicate;
providing an output of the correlation bindings in the second correlation input box by adding an extra column in the second correlation input box; and
providing an output of the correlation bindings in the current box by adding at least one additional column in the current box.

34. The device of claim 33, wherein the method steps further comprise the steps of eliminating the first decorrelation output box.

35. The device of claim 33, wherein the method steps further comprise the steps of eliminating the second decorrelation output box.

36. The device of claim 34, wherein the method steps further comprise the steps of: determining whether the first correlation input box and the current box can be merged, and if so, performing said merging.

37. The device of claim 24, wherein the SQL query is initially received interactively from a user.

38. The device of claim 24, wherein the SQL query is initially received in the form of commands embedded in a non-SQL host language.

39. The device of claim 24, wherein the method steps further comprise the steps of executing the optimized query upon the relational database.

* * * * *

UNITED STATES PATENT AND TRADEMARK OFFICE
CERTIFICATE OF CORRECTION

PATENT NO. : 5,548,755
DATED : August 20, 1996
INVENTOR(S) : Leung et al

Figure 13A:
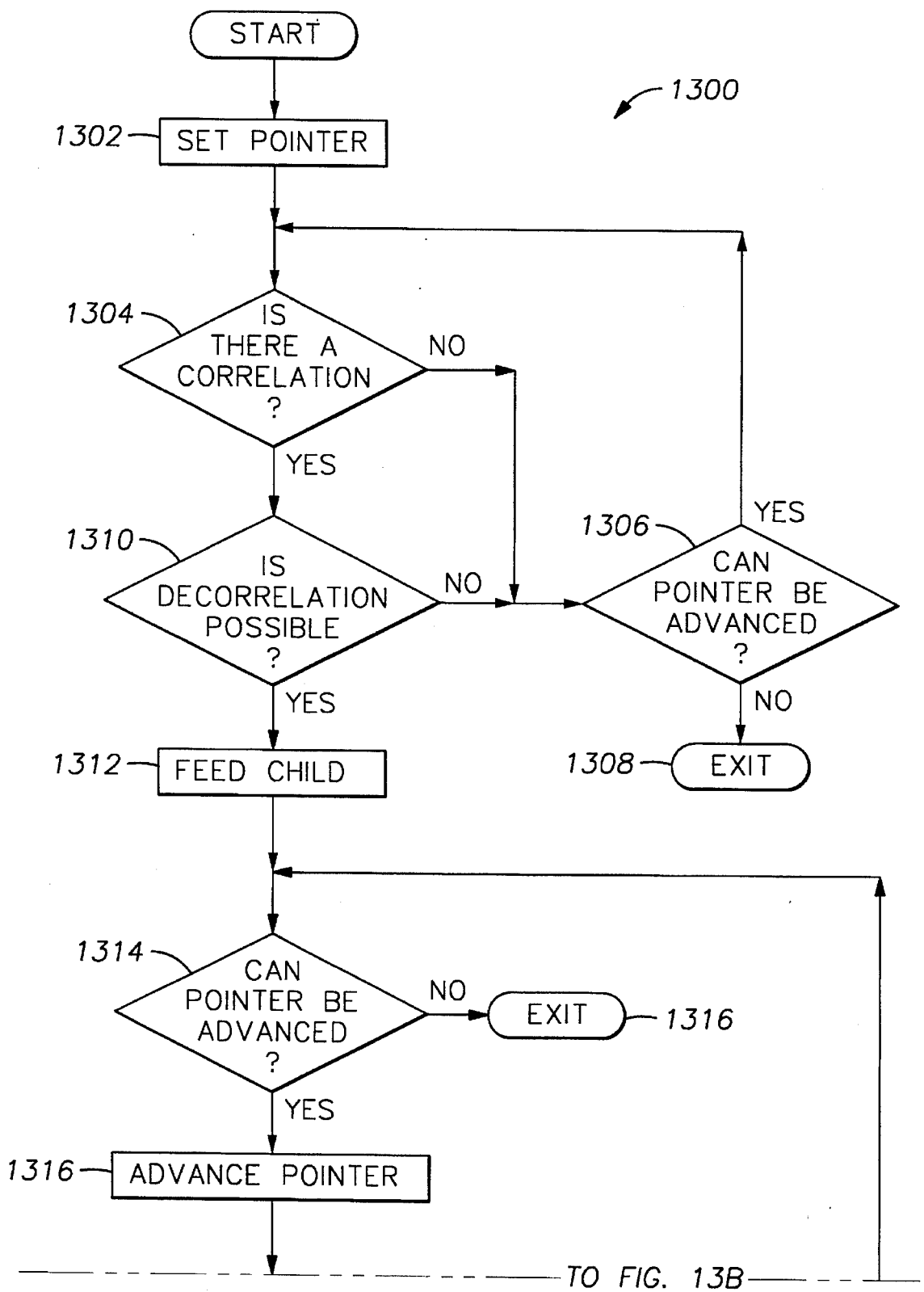
FIG. 13 is a flowchart depicting an illustrative optimization sequence in accordance with the invention.
Figure 13B:
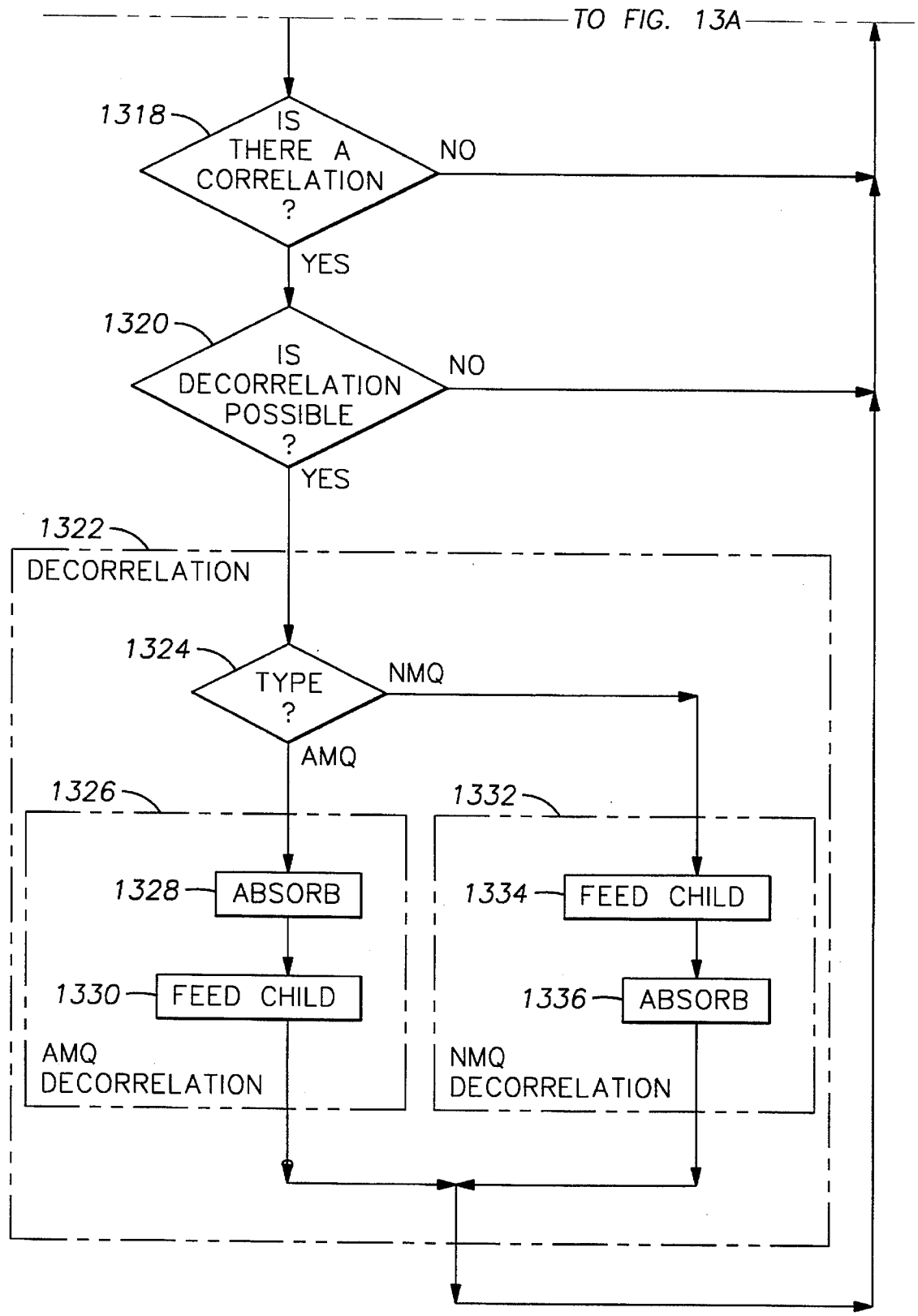

It is certified that error appears in the above-indentified patent and that said Letters Patent is hereby corrected as shown below:

```
Column  2, line 24, change "(QBR")" to --("QBR")--
Column 11, line 21, change "Fig. 13 is a flowchart" to --Figures 13A-
           13B are flowcharts--
Column 16, line  3, change "FIG.17." to --FIG. 17,--
Column 16, line 31, change "FIG. 13" to --FIG. 13B--
Column 18, line 33, change "FIG. 13" to --FIG. 13B--
Column 18, line 64, change "FIG. 13" to --FIB. 13B--
Column 19, line 13, change "FIG. 13" to --FIG. 13B--
Column 19, line 35, change "FIG. 13" to --FIG. 13B--
Column 19, line 63, change "an" to --and--
Column 20, line 18, change "FIG 13" to --FIG. 13B--
Column 20, line 43, change "FIG 13" to --FIG. 13B--
Column 29, line 26, change "below," to --below.--
Column 30, line  9, change "more than a an order" to --more than an
           order--
Column 33, line 26, change "child .box" to --child box--
Column 36, line 49, change "37 boxes" to  "   --"boxes"--
```

Signed and Sealed this

Twenty-fifth Day of March, 1997

Attest:

BRUCE LEHMAN

Attesting Officer

Commissioner of Patents and Trademarks